United States Patent
Argyros et al.

(10) Patent No.: US 12,442,009 B2
(45) Date of Patent: Oct. 14, 2025

(54) SULFITE TOLERANCE IN RECOMBINANT YEAST HOST CELLS

(71) Applicant: Lallemand Hungary Liquidity Management LLC, Budapest (HU)

(72) Inventors: Aaron Argyros, Lebanon, NH (US);
Charles F. Rice, Plainfield, NH (US);
Trisha Barrett, Bradford, VT (US);
Michelle Oeser, Croydon, NH (US);
Janet Fisher, Norwich, VT (US)

(73) Assignee: DANSTAR FERMENT AG, Zug (CH)

( * ) Notice: Subject to any disclaimer, the term of this patent is extended or adjusted under 35 U.S.C. 154(b) by 961 days.

(21) Appl. No.: 16/472,742

(22) PCT Filed: Dec. 22, 2017

(86) PCT No.: PCT/EP2017/084540
§ 371 (c)(1),
(2) Date: Jun. 21, 2019

(87) PCT Pub. No.: WO2018/115513
PCT Pub. Date: Jun. 28, 2018

(65) Prior Publication Data
US 2022/0090102 A1     Mar. 24, 2022

Related U.S. Application Data

(60) Provisional application No. 62/438,391, filed on Dec. 22, 2016.

(51) Int. Cl.
| | | |
|---|---|---|
| C12N 1/20 | (2006.01) | |
| C12N 1/18 | (2006.01) | |
| C12N 15/81 | (2006.01) | |
| C12R 1/865 | (2006.01) | |

(52) U.S. Cl.
CPC ............. *C12N 15/81* (2013.01); *C12N 1/185* (2021.05); *C12R 2001/865* (2021.05)

(58) Field of Classification Search
CPC .... C12P 7/06; Y02E 50/10; C12Y 101/01177; C12Y 602/01001; C12Y 602/01003; C12N 1/16; C12N 1/185; C12N 15/11; C12N 9/16; C12N 9/60
USPC ...................................................... 435/252.2
See application file for complete search history.

(56) References Cited

U.S. PATENT DOCUMENTS 8,956,851 B2    2/2015  Argyros et al.

FOREIGN PATENT DOCUMENTS

| WO | 2011/140386 A2 | 11/2011 |
|---|---|---|
| WO | 2011/153516 A2 | 12/2011 |
| WO | 2012/138942 A1 | 10/2012 |
| WO | 2014/144210 A2 | 9/2014 |
| WO | 2015/023989 A1 | 2/2015 |
| WO | 2017/037614 A1 | 3/2017 |

OTHER PUBLICATIONS

Davos et al., (Proteins: Structure, Function and Genetics, 2000, vol. 41: 98-107.*
Wristlock et al., (Quarterly Reviews of Biophysics 2003, vol. 36 (3): 307-340.*
Kwiatkowski et al., (Biochemistry 38:11643-11650, 1999.*
Kisselev L., (Structure, 2002, vol. 10: 8-9.*
Avram et al., "Fzf1p of *Saccharomyces cerevisiae* is a Positive Regulator of SSU1 Transcription and Its First Zinc Finger Region is Required for DNA Binding," Yeast 15:473-480, 1999.
Avram et al., "SSU1 Encodes a Plasma Membrane Protein with a Central Role in a Network of Proteins Conferring Sulfite Tolerance in *Saccharomyces cerevisiae*," *Journal of Bacteriology* 179(18):5971-5974, 1997.
Nardi et al., "A sulphite-inducible form of the sulphite efflux gene SSU1 in a *Saccharomyces cerevisiae* wine yeast," *Microbiology* 156:1686-1696, 2010.
Nevoigt, "Progress in Metabolic Engineering of *Saccharomyces cerevisiae*," *Microbiology and Molecular Biology Reviews* 72(3):379-412, 2008.
Pagliardini et al., "The metabolic costs of improving ethanol yield by reducing glycerol formation capacity under anaerobic conditions in *Saccharomyces cerevisiae*," *Microbial Cell Factories* 12:29, 2013, 14 pages.
Park et al., "SSU1 mediates sulphite efflux in *Saccharomyces cerevisiae*," *Yeast* 16:881-888, 2000.

* cited by examiner

*Primary Examiner* — Tekchand Saidha
*Assistant Examiner* — Mohammad Y Meah
(74) *Attorney, Agent, or Firm* — Seed Intellectual Property Law Group LLP

(57) ABSTRACT

The present disclosure concerns the use of specific genetic modification(s) for improving sulfite tolerance in recombinant yeast host cells. The genetic modification(s) is (are) designed to allow the expression of an heterologous transcription factor favoring the expression of a SSU1 polypeptide and/or the expression of an heterologous SSU1 polypeptide in the recombinant yeast host cell(s).

14 Claims, 25 Drawing Sheets

Specification includes a Sequence Listing.

```
                    410         420         430         440         450         460
                ....|....|....|....|....|....|....|....|....|....|....|....|....|
S.cerevisiae ssu1  VCWSILCLLCTLHEYSKKMHAARKSSLFSESG---TEKTIVSPYNSIESVEESNSALDFTRLA---
S.paradoxus  ssu1  FCWSILCLLCTLHEYSKKILHAARKSSLFSESN---TEKTIVSPYNSIESVEESNSALDFTRLA---
S.mikatae    ssu1  VCWIICLSCTLYEYTKKALHAAHKSSLFSEAG---TEKTFTSPYNSTESVEESNSALDFTRLA---
S.uvarum     ssu1  VCWSILCLSCTLYGVIKTALRAARKPSFISEEG---TEKTASSPFNSIESVEESNSALDSTYLA---
S.kudriazevi ssu1  VCWSILCLSFTLYEVIKKVMHAARKSSFFSEAA---AEKTITSPY-STESVEESNSALDFTRLA---
S.castelli   ssu1  IILCLLGTYVLMPFIQRYRHRKLLKGDCDIDSESTLPTTNKNELPSTTNSTSMQTRFESH
```

Figure 7C (continued)

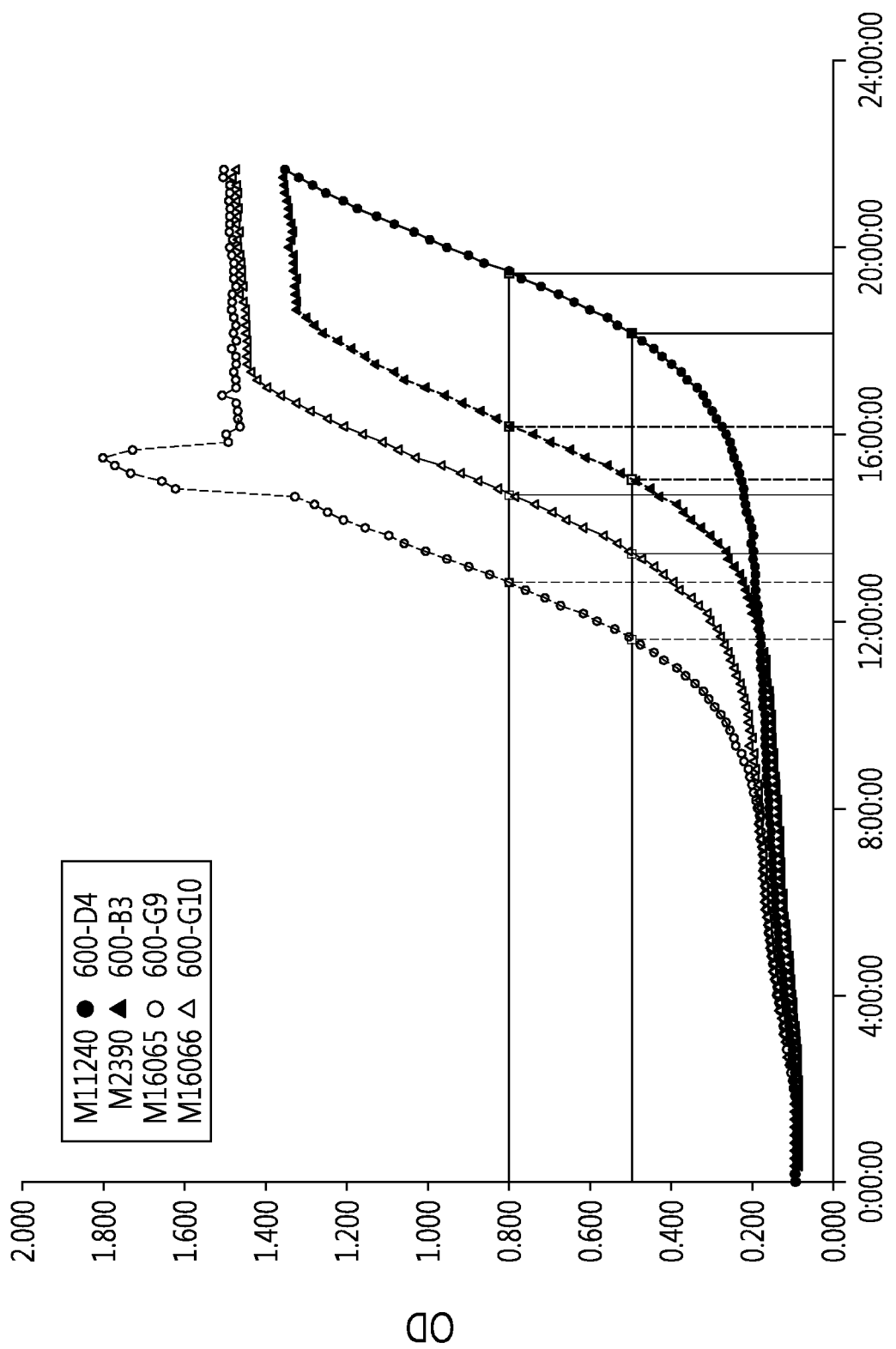

SULFITE TOLERANCE IN RECOMBINANT YEAST HOST CELLS

CROSS-REFERENCE TO RELATED APPLICATIONS AND DOCUMENTS

This is application claims priority from U.S. provisional patent application 62/438,391 filed on Dec. 22, 2016 and herewith incorporated in its entirety. This application is concurrently filed with a sequence listing in electronic format which is incorporated in its entirety.

STATEMENT REGARDING SEQUENCE LISTING

The Sequence Listing associated with this application is provided in text format in lieu of a paper copy, and is hereby incorporated by reference into the specification. The name of the text file containing the Sequence Listing is 580127_405USPC_SEQUENCE_LISTING.txt. The text file is 107 KB, was created on Jun. 18, 2019, and is being submitted electronically via EFS-Web.

TECHNOLOGICAL FIELD

The present disclosure relates to improving sulfite tolerance in recombinant yeast host cells to favor their growth and ultimately the production of one or more fermentation product, such as, for example, ethanol.

BACKGROUND

*Saccharomyces cerevisiae* is the primary biocatalyst used in the commercial production of fuel ethanol. This organism is proficient in fermenting glucose to ethanol, often to concentrations greater than 20% w/v. However, in the presence of some contaminants, *S. cerevisiae* can exhibit slower fermentation kinetics, increase its glycerol production and, in some instances, even lack the ability to complete fermentation by becoming dormant (e.g., stuck fermentation).

It would be highly desirable to be provided with a recombinant yeast host cell which is less susceptible to stuck fermentation by increasing its tolerance to the presence of contaminant(s) in the fermentation medium.

BRIEF SUMMARY

The present disclosure relates to the overexpression of sulfite efflux pumps to improve sulfite tolerance in recombinant yeast host cells. The overexpression of such sulfite efflux pumps in the recombinant yeast host cells can restore/favor their growth and ultimately the production of one or more fermentation product, such as, for example, ethanol.

In a first aspect, the present disclosure provides a recombinant yeast host cell comprising: (i) a first genetic modification for reducing the production of one or more native enzymes that function to produce glycerol or regulate glycerol synthesis and/or allowing the production of an heterologous glucoamylase; and (ii) a second genetic modification allowing the expression of an heterologous transcription factor favoring the expression of a SSU1 polypeptide and/or allowing the expression of an heterologous SSU1 polypeptide. In an embodiment, the recombinant yeast host cell has the second genetic modification allowing the expression of the heterologous transcription factor favoring the expression of the SSU1 polypeptide. In still another embodiment, the heterologous transcription factor is a FZF1 polypeptide or a polypeptide encoded by a fzf1 gene ortholog. In yet another embodiment, the FZF1 polypeptide or the polypeptide encoded by the fzf1 gene ortholog is expressed under the control of a constitutive, a glucose-regulated (such as, for example the promoter of a hxt7 gene (hxt7p)) or a sulfite-regulated promoter (such as, for example, the promoter of a gpd2 gene (gpd2p), the promoter of a fzf1 gene (fzf1p), the promoter of a ssu1 gene (ssu1p) or the promoter of a ssu1-r gene (ssur1-rp)). In yet another embodiment, the FZF1 polypeptide is from the genus *Saccharomyces* sp. In still another embodiment, the FZF1 polypeptide has the amino acid sequence of any one of SEQ ID NO: 1 to 6, 21 or 22, is a variant of the amino acid sequence of any one of SEQ ID NO: 1 to 6, 21 or 22 or is a fragment of the amino acid sequence of any one of SEQ ID NO: 1 to 6, 21 or 22. In still another embodiment, the recombinant yeast host cell has the second genetic modification allowing the expression of the heterologous SSU1 polypeptide. In an embodiment, the heterologous SSU1 polypeptide is a polypeptide encoded by a ssu1 gene ortholog. In an embodiment, the heterologous SSU1 polypeptide or the polypeptide encoded by the ssu1 gene ortholog is expressed under the control of a constitutive, a glucose-regulated (such as, for example the promoter of a hxt7 gene (hxt7p)) or a sulfite-regulated promoter (such as, for example, the promoter of a gpd2 gene (gpd2p), the promoter of a fzf1 gene (fzf1p), the promoter of a ssu1 gene (ssu1p) or the promoter of a ssu1-r gene (ssur1-rp)). In a further embodiment, the heterologous SSU1 polypeptide is from the genus *Saccharomyces* sp. In another embodiment, the SSU1 polypeptide has the amino acid sequence of any one of SEQ ID NO: 7 to 12, 23 or 24, is a variant of the amino acid sequence of any one of SEQ ID NO: 7 to 12, 23 or 24 or is a fragment of the amino acid sequence of any one of SEQ ID NO: 7 to 12, 23 or 24. In still another embodiment, the recombinant yeast host cell has the first genetic modification for reducing the production of one or more native enzymes that function to produce glycerol or regulating glycerol synthesis. In still another embodiment, the one or more native enzyme that function to produce glycerol is a GPD2 polypeptide. In a further embodiment, the one or more enzyme that function to regulate glycerol synthesis is a STL1 polypeptide. In another embodiment, the recombinant yeast host cell has the first genetic modification for allowing the production of an heterologous glucoamylase. In an embodiment, the heterologous glucoamylase is from the genus *Saccharomycopsis* sp., such as, for example, from the species Saccharomycopsis fibuligera. In an embodiment, the heterologous glucoamylase has the amino acid sequence of SEQ ID NO: 13, is a variant of the amino acid sequence of SEQ ID NO: 13 or is a fragment of the amino acid sequence of SEQ ID NO: 13. In some embodiment, the recombinant yeast host cell further comprises a third genetic modification for reducing the production of the one or more native enzymes that function to catabolize formate. In still another embodiment, the recombinant yeast host cell lacks the ability to produce a FDH1 polypeptide and a FDH2 polypeptide. In an embodiment, the recombinant yeast host cell is from the genus *Saccharomyces* sp., such as, for example, from the species *Saccharomyces cerevisiae*.

According to a second aspect, the present disclosure provides a method of improving a growth property of a recombinant yeast host cell. Broadly the method comprises (i) providing a first recombinant yeast host cell having the first genetic modification as defined herein; and (ii) introducing the second genetic modification as defined herein in the first recombinant yeast host cell to provide a second recombinant yeast host cell. The growth property of the second recombinant yeast host cell is considered to be improved with respect to the growth property of the first recombinant yeast host cell. In an embodiment, the growth property is a growth rate and the improved growth property is a faster growth rate. In another embodiment, the growth property is a lag period and the improved growth property is a decreased lag period.

According to a third aspect, the present disclosure provides a recombinant yeast host cell obtainable or obtained by the method described herewith.

According to a fourth aspect, the present disclosure provides a method of increasing the production of a fermentation product during a fermentation. Broadly, the method comprises fermenting a medium with at least one recombinant yeast host cell as defined herein. In such embodiment, the increase in the production of a fermentation product can be observed when comparing the results obtained from a recombinant yeast host cell lacking the second genetic modification described herein. In an embodiment, the fermentation product is ethanol. In still another embodiment, the medium comprises starch (which can be, for example, in a gelatinized or a raw form). In still another embodiment, the medium is derived from corn. In yet another embodiment, the medium comprises lignocellulose.

BRIEF DESCRIPTION OF THE DRAWINGS

Having thus generally described the nature of the invention, reference will now be made to the accompanying drawings, showing by way of illustration, a preferred embodiment thereof, and in which:

FIGS. 8A to 8D show the effect of FZF1 or SSU1 overexpression in a glycerol reduction background. (A) Growth rates of strains M2390, M11240 and isolates A, B, C and D in the absence (dark grey bars) or presence (light grey bars) of sulfite. Results are shown as the MaxVlog in function of the strain/isolate tested. (B) Onsite time (as measured as the time to reach OD 600 nm 0.5) of strains M2390, M11240 and isolates A, B, C and D in the absence (dark grey bars) or presence (light grey bars) of sulfite. Results are shown as time (hh:mm:ss) in function of the strain/isolate tested. (C) Growth curves of strains M2390 (Δ), M11240 (●) and isolates M16063 (○) and M16064 (▲). Results are shown as OD at 600 nm in function of time (hh:mm:ss) and of strain/isolate tested. (D) Growth curves of strains M2390 (▲), M11240 (●) and isolates M16065 (○) and M16066 (Δ). Results are shown as OD at 600 nm in function of time (hh:mm:ss) and of strain/isolate tested.

DETAILED DESCRIPTION

The present disclosure relates to the use of recombinant yeast host cells capable exhibiting improved growth during fermentation, even in the presence of contaminants such as sulfites. As indicated in the present disclosure, genetically-modified yeasts are especially sensitive to sulfite contamination (e.g., to a level as low as 50 ppm) which can slow down their growth and, in some embodiments, leads to stuck fermentation. The recombinant yeast host cell of the present disclosure have improved resistance (or decreased sensitivity) to sulfites and comprise a genetic modification allowing the expression of an heterologous transcription factor favoring the expression of a SSU1 polypeptide and/or a genetic modification allowing the expression of an heterologous SSU1 polypeptide. The increased expression of the SSU1 polypeptide (either indirectly via a transcription factor or directly by introducing copies of the gene encoding the heterologous SSU1 polypeptide) is especially useful in recombinant yeast host cells having a genetic modification for reducing the production of one or more native enzymes that function to produce glycerol or regulating glycerol synthesis and/or a genetic modification allowing the production of an heterologous glucoamylase. The increased expression of the SSU1 polypeptide can, in some embodiments, restore the recombinant yeast host cell's growth properties even at high levels of sulfite contamination (e.g., 250 ppm for example).

Sulfite Contamination During Fermentation

Figure 1:
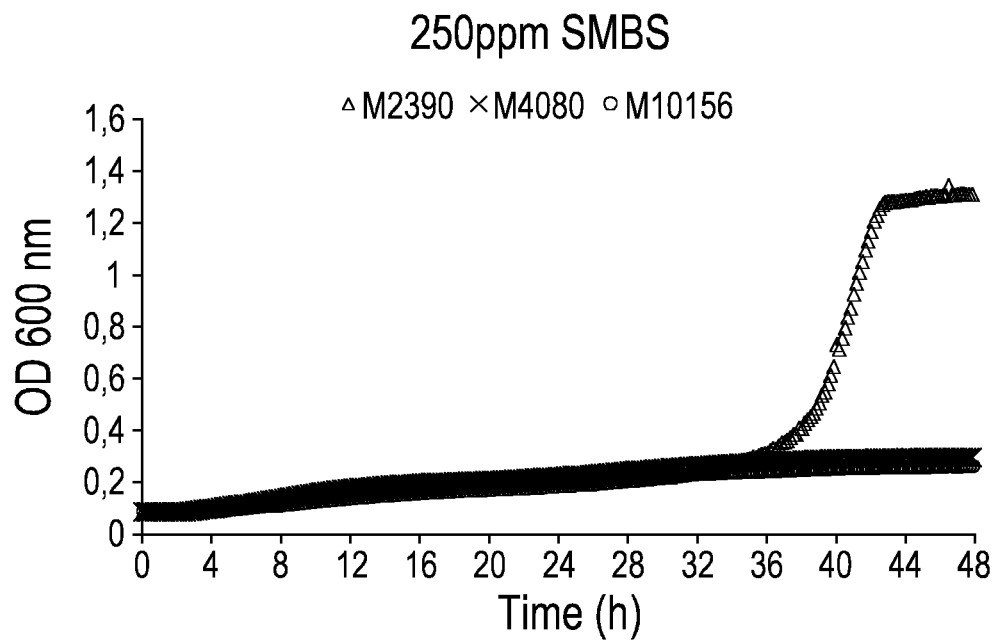
FIG. 1 compares the growth curves of several yeasts strains (M2390: Δ; M4080: X; M10156: ○) in the presence of 250 ppm sulfite. Results are shown as optical density (measured at 600 nm) in function of time (hours). The different strains are described in Table 1.

Sulfite can be added, usually after fermentation, to various fermented food and beverages (like wine) to prevent their oxidization. Sulfites can also be used as a scrubber during fermentation to capture volatile organic compounds and can, by the same token, cause sulfite contamination during fermentation. Sulfite contamination during fermentation can retard or inhibit the growth of the fermenting organisms thereby leading to stuck fermentation, especially when the fermentation occurs under anaerobic conditions. As shown in FIG. 1, three different strains of *S. cerevisiae* were cultured in a medium containing 250 ppm sulfite. The wild-type (e.g., non-genetically modified) strain M2390 was able to grow (albeit at a reduced rate and with a longer lag period, when compared to a wild-type strain grown in the absence of sulfite) and exhibit a logarithmic phase proliferation (see Δ on FIG. 1). However, the genetically modified M4080 (e.g., expressing an heterologous glucoamylase, identified as X on FIGS. 1) and M10156 (e.g., genetically engineered to reduce its glycerol production and expressing an heterologous glucoamylase, identified as ○ on FIG. 1) strains barely grew during the 48 hours period they were placed in the sulfite-containing medium.

Thus the present disclosure makes clear that at least some genetically modified yeast host cell are particularly susceptible to sulfite contamination during fermentation (at levels as low as 50 ppm) and that improving their resistance to sulfites would be beneficial to restore their growth properties (such as increase their growth rate, reduced their lag time, prolong their log growth, etc.).

Recombinant Yeast Host Cell

The present disclosure concerns recombinant yeast host cells that have been genetically engineered. When the genetic modification is aimed at reducing or inhibiting the expression of a specific targeted gene (which is endogenous to the host cell), the genetic modifications can be made in one or both copies of the targeted gene(s). When the genetic modification is aimed at increasing the expression of a specific targeted gene (which is considered heterologous to the host cell), the genetic modification can be made in one or multiple genetic locations. In the context of the present disclosure, when recombinant yeast cell is qualified as being "genetically engineered", it is understood to mean that it has been manipulated to either add at least one or more heterologous or exogenous nucleic acid residue and/or removed at least one endogenous (or native) nucleic acid residue. In some embodiments, the one or more nucleic acid residues that are added can be derived from an heterologous cell or the recombinant host cell itself. In the latter scenario, the nucleic acid residue(s) is (are) added at a genomic location which is different than the native genomic location. The genetic manipulations did not occur in nature and are the results of in vitro manipulations of the yeast.

When expressed in a recombinant yeast host cells, the polypeptides described herein are encoded on one or more heterologous nucleic acid molecule. The term "heterologous" when used in reference to a nucleic acid molecule (such as a promoter or a coding sequence) refers to a nucleic acid molecule that is not natively found in the recombinant host cell. "Heterologous" also includes a native coding region, or portion thereof, that is removed from the source organism and subsequently reintroduced into the source organism in a form that is different from the corresponding native gene, e.g., not in its natural location in the organism's genome. The heterologous nucleic acid molecule is purposively introduced into the recombinant host cell. The term "heterologous" as used herein also refers to an element (nucleic acid or protein) that is derived from a source other than the endogenous source. Thus, for example, a heterologous element could be derived from a different strain of host cell, or from an organism of a different taxonomic group (e.g., different kingdom, phylum, class, order, family genus, or species, or any subgroup within one of these classifications). The term "heterologous" is also used synonymously herein with the term "exogenous".

When an heterologous nucleic acid molecule is present in the recombinant host cell, it can be integrated in the host cell's genome. The term "integrated" as used herein refers to genetic elements that are placed, through molecular biology techniques, into the genome of a host cell. For example, genetic elements can be placed into the chromosomes of the host cell as opposed to in a vector such as a plasmid carried by the host cell. Methods for integrating genetic elements into the genome of a host cell are well known in the art and include homologous recombination. The heterologous nucleic acid molecule can be present in one or more copies in the yeast host cell's genome. Alternatively, the heterologous nucleic acid molecule can be independently replicating from the yeast's genome. In such embodiment, the nucleic acid molecule can be stable and self-replicating.

In the context of the present disclosure, the recombinant host cell is a yeast. Suitable yeast host cells can be, for example, from the genus *Saccharomyces*, *Kluyveromyces*, *Arxula*, *Debaryomyces*, *Candida*, *Pichia*, *Phaffia*, *Schizosaccharomyces*, *Hansenula*, *Kloeckera*, *Schwanniomyces* or *Yarrowia*. Suitable yeast species can include, for example, *S. cerevisiae*, *S. bulderi*, *S. barnetti*, *S. exiguus*, *S. uvarum*, *S. diastaticus*, *K. lactis*, *K. marxianus* or *K. fragilis*. In some embodiments, the yeast is selected from the group consisting of *Saccharomyces cerevisiae*, *Schizzosaccharomyces pombe*, *Candida albicans*, *Pichia pastoris*, *Pichia stipitis*, *Yarrowia lipolytica*, *Hansenula polymorpha*, *Phaffia rhodozyma*, *Candida utilis*, *Arxula adeninivorans*, *Debaryomyces hansenii*, *Debaryomyces polymorphus*, *Schizosaccharomyces pombe* and *Schwanniomyces occidentalis*. In one particular embodiment, the yeast is *Saccharomyces cerevisiae*. In some embodiments, the host cell can be an oleaginous yeast cell. For example, the oleaginous yeast host cell can be from the genus *Blakeslea*, *Candida*, *Cryptococcus*, *Cunninghamella*, *Lipomyces*, *Mortierella*, *Mucor*, *Phycomyces*, *Pythium*, *Rhodosporidium*, *Rhodotorula*, *Trichosporon* or *Yarrowia*. In some alternative embodiments, the host cell can be an oleaginous microalgae host cell (e.g., for example, from the genus *Thraustochytrium* or *Schizochytrium*). In an embodiment, the recombinant yeast host cell is from the genus *Saccharomyces* and, in some embodiments, from the species *Saccharomyces cerevisiae*.

In some embodiments, heterologous nucleic acid molecules which can be introduced into the recombinant host cells are codon-optimized with respect to the intended recipient recombinant yeast host cell. As used herein the term "codon-optimized coding region" means a nucleic acid coding region that has been adapted for expression in the cells of a given organism by replacing at least one, or more than one, codons with one or more codons that are more frequently used in the genes of that organism. In general, highly expressed genes in an organism are biased towards codons that are recognized by the most abundant tRNA species in that organism. One measure of this bias is the "codon adaptation index" or "CAI," which measures the extent to which the codons used to encode each amino acid in a particular gene are those which occur most frequently in a reference set of highly expressed genes from an organism. The CAI of codon optimized heterologous nucleic acid molecule described herein corresponds to between about 0.8 and 1.0, between about 0.8 and 0.9, or about 1.0.

The heterologous nucleic acid molecules of the present disclosure comprise a coding region for the heterologous polypeptide. A DNA or RNA "coding region" is a DNA or RNA molecule which is transcribed and/or translated into a polypeptide in a cell in vitro or in vivo when placed under the control of appropriate regulatory sequences. "Suitable regulatory regions" refer to nucleic acid regions located upstream (5' non-coding sequences), within, or downstream (3' non-coding sequences) of a coding region, and which influence the transcription, RNA processing or stability, or translation of the associated coding region. Regulatory regions may include promoters, translation leader sequences, RNA processing site, effector binding site and stem-loop structure. The boundaries of the coding region are determined by a start codon at the 5' (amino) terminus and a translation stop codon at the 3' (carboxyl) terminus. A coding region can include, but is not limited to, prokaryotic regions, cDNA from mRNA, genomic DNA molecules, synthetic DNA molecules, or RNA molecules. If the coding region is intended for expression in a eukaryotic cell, a polyadenylation signal and transcription termination sequence will usually be located 3' to the coding region. In an embodiment, the coding region can be referred to as an open reading frame. "Open reading frame" is abbreviated ORF and means a length of nucleic acid, either DNA, cDNA or RNA, that comprises a translation start signal or initiation codon, such as an ATG or AUG, and a termination codon and can be potentially translated into a polypeptide sequence.

The nucleic acid molecules described herein can comprise transcriptional and/or translational control regions. "Transcriptional and translational control regions" are DNA regulatory regions, such as promoters, enhancers, terminators, and the like, that provide for the expression of a coding region in a host cell. In eukaryotic cells, polyadenylation signals are control regions.

The heterologous nucleic acid molecule can be introduced in the host cell using a vector. A "vector," e.g., a "plasmid", "cosmid" or "artificial chromosome" (such as, for example, a yeast artificial chromosome) refers to an extra chromosomal element and is usually in the form of a circular double-stranded DNA molecule. Such vectors may be autonomously replicating sequences, genome integrating sequences, phage or nucleotide sequences, linear, circular, or supercoiled, of a single- or double-stranded DNA or RNA, derived from any source, in which a number of nucleotide sequences have been joined or recombined into a unique construction which is capable of introducing a promoter fragment and DNA sequence for a selected gene product along with appropriate 3' untranslated sequence into a cell.

In the heterologous nucleic acid molecule described herein, the promoter and the nucleic acid molecule coding for the heterologous polypeptide are operatively linked to one another. In the context of the present disclosure, the expressions "operatively linked" or "operatively associated" refers to fact that the promoter is physically associated to the nucleotide acid molecule coding for the heterologous polypeptide in a manner that allows, under certain conditions, for expression of the heterologous protein from the nucleic acid molecule. In an embodiment, the promoter can be located upstream (5') of the nucleic acid sequence coding for the heterologous protein. In still another embodiment, the promoter can be located downstream (3') of the nucleic acid sequence coding for the heterologous protein. In the context of the present disclosure, one or more than one promoter can be included in the heterologous nucleic acid molecule. When more than one promoter is included in the heterologous nucleic acid molecule, each of the promoters is operatively linked to the nucleic acid sequence coding for the heterologous protein. The promoters can be located, in view of the nucleic acid molecule coding for the heterologous protein, upstream, downstream as well as both upstream and downstream.

"Promoter" refers to a DNA fragment capable of controlling the expression of a coding sequence or functional RNA. The term "expression," as used herein, refers to the transcription and stable accumulation of sense (mRNA) from the heterologous nucleic acid molecule described herein. Expression may also refer to translation of mRNA into a polypeptide. Promoters may be derived in their entirety from a native gene, or be composed of different elements derived from different promoters found in nature, or even comprise synthetic DNA segments. It is understood by those skilled in the art that different promoters may direct the expression at different stages of development, or in response to different environmental or physiological conditions. Promoters which cause a gene to be expressed in most cells at most times at a substantial similar level are commonly referred to as "constitutive promoters". It is further recognized that since in most cases the exact boundaries of regulatory sequences have not been completely defined, DNA fragments of different lengths may have identical promoter activity. A promoter is generally bounded at its 3' terminus by the transcription initiation site and extends upstream (5' direction) to include the minimum number of bases or elements necessary to initiate transcription at levels detectable above background. Within the promoter will be found a transcription initiation site (conveniently defined for example, by mapping with nuclease S1), as well as protein binding domains (consensus sequences) responsible for the binding of the polymerase.

The promoter can be heterologous to the nucleic acid molecule encoding the heterologous polypeptide. The promoter can be heterologous or derived from a strain being from the same genus or species as the recombinant host cell. In an embodiment, the promoter is derived from the same genus or species of the yeast host cell and the heterologous polypeptide is derived from different genus that the host cell.

First Genetic Modification

The first modification of the recombinant yeast host cell can be a genetic modification leading to the reduction in the production, and in an embodiment to the inhibition in the production, of one or more native enzymes that function to produce glycerol or regulating glycerol synthesis. As used in the context of the present disclosure, the expression "reducing the production of one or more native enzymes that function to produce glycerol or regulating glycerol synthesis" refers to a genetic modification which limits or impedes the expression of genes associated with one or more native polypeptides (in some embodiments enzymes) that function to produce glycerol or regulate glycerol synthesis, when compared to a corresponding yeast strain which does not bear the first genetic modification. In some instances, the first genetic modification reduces but still allows the production of one or more native polypeptides that function to produce glycerol or regulating glycerol synthesis. In other instances, the first genetic modification inhibits the production of one or more native enzymes that function to produce glycerol or regulating glycerol synthesis. In some embodiments, the recombinant yeast host cells bear a plurality of first genetic modifications, wherein at least one reduces the production of one or more native polypeptides and at least another inhibits the production of one or more native polypeptides. As used in the context of the present disclosure, the expression "native polypeptides that function to produce glycerol or regulating glycerol synthesis" refers to polypeptides which are endogenously found in the recombinant yeast host cell. Native enzymes that function to produce glycerol include, but are not limited to, the GPD1 and the GPD2 polypeptide (also referred to as GPD1 and GPD2 respectively) as well as the GPP1 and the GPP2 polypeptides (also referred to as GPP1 and GPP2 respectively). Native enzymes that function to regulating glycerol synthesis include, but are not limited to, the FPS1 polypeptide as well as the STL1 polypeptide. The FPS1 polypeptide is a glycerol exporter and the STL1 polypeptide functions to import glycerol in the recombinant yeast host cell. By either reducing or inhibiting the expression of the FPS1 polypeptide and/or increasing the expression of the STL1 polypeptide, it is possible to control, to some extent, glycerol synthesis. In an embodiment, the recombinant yeast host cell bears a genetic modification in at least one of the gpd1 gene (encoding the GPD1 polypeptide), the gpd2 gene (encoding the GPD2 polypeptide), the gpp1 gene (encoding the GPP1 polypeptide), the gpp2 gene (encoding the GPP2 polypeptide), the fps1 gene (encoding the FPS1 polypeptide) or orthologs thereof. In another embodiment, the recombinant yeast host cell bears a genetic modification in at least two of the gpd1 gene (encoding the GPD1 polypeptide), the gpd2 gene (encoding the GPD2 polypeptide), the gpp1 gene (encoding the GPP1 polypeptide), the gpp2 gene (encoding the GPP2 polypeptide), the fps1 gene (encoding the FPS1 polypeptide) or orthologs thereof. In still another embodiment, the recombinant yeast host cell bears a genetic modification in each of the gpd1 gene (encoding the GPD1 polypeptide), the gpd2 gene (encoding the GPD2 polypeptide) and the fps1 gene (encoding the FPS1 polypeptide) or orthologs thereof. Examples of recombinant yeast host cells bearing such genetic modification(s) leading to the reduction in the production of one or more native enzymes that function to produce glycerol or regulating glycerol synthesis are described in WO 2012/138942. Preferably, the recombinant yeast host cell has a genetic modification (such as a genetic deletion or insertion) only in one enzyme that functions to produce glycerol, in the gpd2 gene, which would cause the host cell to have a knocked-out gpd2 gene. In some embodiments, the recombinant yeast host cell can have a genetic modification in the gpd1 gene, the gpd2 gene and the fps1 gene resulting is a recombinant yeast host cell being knock-out for the gpd1 gene, the gpd2 gene and the fps1 gene. In still another embodiment (in combination or alternative to the "first" genetic modification described above), the recombinant yeast host cell can have a genetic modification in the sil1 gene (e.g., a duplication for example) for increasing the expression of the STL1 polypeptide. In an embodiment, the recombinant yeast host cell can have a genetic modification in the gpd2 genes.

Alternatively or in combination, the first genetic modification can also allow for the production of an heterologous glucoamylase. Many microbes produce an amylase to degrade extracellular starches. In addition to cleaving the last α(1-4) glycosidic linkages at the non-reducing end of amylose and amylopectin, yielding glucose, γ-amylase will cleave α(1-6) glycosidic linkages. The heterologous glucoamylase can be derived from any organism. In an embodiment, the heterologous protein is derived from a γ-amylase, such as, for example, the glucoamylase of Saccharomycoces filbuligera (e.g., encoded by the glu 0111 gene). The GLU0111 polypeptide includes the following amino acids (or correspond to the following amino acids) which are associated with glucoamylase activity and include, but are not limited to amino acids located at positions 41, 237, 470, 473, 479, 485, 487 of SEQ ID NO: 13. Examples of recombinant yeast host cells bearing such first genetic modifications are described in WO 2011/153516 as well as in WO/2017/037614 and herewith incorporated in its entirety.

The heterologous glucoamylase can be a variant of a known glucoamylase, for example a variant of the heterologous glucoamylase having the amino acid sequence of SEQ ID NO: 13, 14, 15, 16, 17, 18 or 19. The glucoamylase variants have at least 50%, 55%, 60%, 65%, 70%, 75%, 80%, 85%, 90%, 95%, 96%, 97%, 98% or 99% identity to the glucoamylases described herein. A variant comprises at least one amino acid difference when compared to the amino acid sequence of the native glucoamylase. The term "percent identity", as known in the art, is a relationship between two or more polypeptide sequences or two or more polynucleotide sequences, as determined by comparing the sequences. The level of identity can be determined conventionally using known computer programs. Identity can be readily calculated by known methods, including but not limited to those described in: Computational Molecular Biology (Lesk, A. M., ed.) Oxford University Press, N.Y. (1988); Biocomputing: Informatics and Genome Projects (Smith, D. W., ed.) Academic Press, NY (1993); Computer Analysis of Sequence Data, Part I (Griffin, A. M., and Griffin, H. G., eds.) Humana Press, NJ (1994); Sequence Analysis in Molecular Biology (von Heinje, G., ed.) Academic Press (1987); and Sequence Analysis Primer (Gribskov, M. and Devereux, J., eds.) Stockton Press, NY (1991). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR Inc., Madison, Wis.). Multiple alignments of the sequences disclosed herein were performed using the Clustal method of alignment (Higgins and Sharp (1989) CABIOS. 5:151-153) with the default parameters (GAP PENALTY=10, GAP LENGTH PEN ALT Y=10). Default parameters for pairwise alignments using the Clustal method were KTUPLB 1, GAP PENALTY=3, WINDOW=5 and DIAGONALS SAVED=5. The variant heterologous glucoamylases described herein may be (i) one in which one or more of the amino acid residues are substituted with a conserved or non-conserved amino acid residue (preferably a conserved amino acid residue) and such substituted amino acid residue may or may not be one encoded by the genetic code, or (ii) one in which one or more of the amino acid residues includes a substituent group, or (iii) one in which the mature polypeptide is fused with another compound, such as a compound to increase the half-life of the polypeptide (for example, polyethylene glycol), or (iv) one in which the additional amino acids are fused to the mature polypeptide for purification of the polypeptide.

A "variant" of the glucoamylase can be a conservative variant or an allelic variant. As used herein, a conservative variant refers to alterations in the amino acid sequence that do not adversely affect the biological functions of the glucoamylase. A substitution, insertion or deletion is said to adversely affect the protein when the altered sequence prevents or disrupts a biological function associated with the glucoamylase (e.g., the hydrolysis of starch). For example, the overall charge, structure or hydrophobic-hydrophilic properties of the protein can be altered without adversely affecting a biological activity. Accordingly, the amino acid sequence can be altered, for example to render the peptide more hydrophobic or hydrophilic, without adversely affecting the biological activities of the glucoamylase.

The heterologous glucoamylase can be a fragment of a known glucoamylase or fragment of a variant of a known glucoamylase (such as, for example, a fragment of the glucoamylase having the amino acid sequence of SEQ ID NO: 13, 14, 15, 16, 17, 18 or 19). Glucoamylase "fragments" have at least at least 100, 200, 300, 400, 500 or more consecutive amino acids of the glucoamylase. A fragment comprises at least one less amino acid residue when compared to the amino acid sequence of the glucoamylase and still possess the enzymatic activity of the full-length glucoamylase. In some embodiments, fragments of the glucoamylases can be employed for producing the corresponding full-length glucoamylase by peptide synthesis. Therefore, the fragments can be employed as intermediates for producing the full-length proteins.

The heterologous nucleic acid molecule encoding the heterologous glucoamylase, variant or fragment can be integrated in the genome of the yeast host cell. The term "integrated" as used herein refers to genetic elements that are placed, through molecular biology techniques, into the genome of a host cell. For example, genetic elements can be placed into the chromosomes of the host cell as opposed to in a vector such as a plasmid carried by the host cell. Methods for integrating genetic elements into the genome of a host cell are well known in the art and include homologous recombination. The heterologous nucleic acid molecule can be present in one or more copies in the yeast host cell's genome. Alternatively, the heterologous nucleic acid molecule can be independently replicating from the yeast's genome. In such embodiment, the nucleic acid molecule can be stable and self-replicating.

In the context of the present disclosure, the recombinant yeast host cell can include at least two "first" genetic modifications, one in leading to the reduction in the production of one or more native enzymes that function to produce glycerol or regulating glycerol synthesis and another one leading to the expression of an heterologous glucoamylase. For example, the recombinant yeast host cell can have a genetic modification in the gpd2 gene and express an heterologous glucoamylase. It is also contemplated that the recombinant yeast host cell can include a single first genetic modification, either for reducing in the production of one or more native enzymes that function to produce glycerol or regulating glycerol synthesis or for expressing an heterologous glucoamylase.

Second Genetic Modification

The second genetic modification of the recombinant yeast host cell is intended to increase its resistance (or decrease its sensibility) towards sulfites. Sulfite contamination can cause a reduced growth rate at concentration as low as 50 ppm. In some embodiment, the second genetic modification of the recombinant yeast host cell increases the resistance (or decreases its sensitivity) at concentration as high as 250 ppm of sulfites. For example, the second genetic modification can be made to allow the expression of an heterologous transcription factor favoring the expression of a SSU1 polypeptide. As used in the context of the present disclosure, the expression "allowing the expression of an heterologous transcription factor favoring the expression of a SSU1 polypeptide" refers to a genetic modification which increases the expression of one or more genes encoding transcription factors capable of increasing the expression of a native or an heterologous SSU1 polypeptide, when compared to a corresponding yeast strain which does not bear the second genetic modification. As used in the context of the present disclosure, the expression "transcription factor favoring the expression of a SSU1 polypeptide" refers to polypeptides capable of binding to (directly or indirectly) to DNA and redirect the transcriptional complex for increasing the expression of the ssu1 gene (or its gene ortholog) encoding the SSU1 polypeptide. In some embodiments, the transcription factor is capable of binding to the promoter of the gene encoding the SSU1 polypeptide. The transcription factor favoring the expression of a SSU1 polypeptide can be, for example, the FZF1 polypeptide encoded by the fzf1 gene or a corresponding gene ortholog. The recombinant yeast host of the present disclosure can be genetically engineered to express the FZF1 polypeptide as nuclear polypeptide (e.g., a polypeptide destined to be located in the nucleus). The FZF1 polypeptide can be encoded by, for example, Gene ID 852638 (*S. cerevisiae*), Gene ID 2888469 (*Candida glabrata*), Gene ID 11493991 (*Naumovozyma dairenensis*), Gene ID 5543723 (*Vanderwaltozyma polyspora*), Gene ID 2896325 (*Kluyveromyces lactis*) or Gene ID 396131 (*Gallus gallus*). In an embodiment, the FZF1 polypeptide (or the gene encoding same) is derived from the genus *Saccharomyces* sp., such as, for example, *S. cerevisae, S. paradoxus, S. mikatea, S. uvarum, S. kudriazevi* or *S. castelli*. In still another embodiment, the FZF1 polypeptide is derived from *S. paradoxus*. In an embodiment, the heterologous FZF1 polypeptide is derived from *Candida* sp. (such as, for example, *Candida glabra*) or *Scheffersomyces* sp. (such as, for example *Scheffersomyces stipitis*). In yet another embodiment, the FZF1 polypeptide comprises the amino acid sequence of SEQ ID NO: 1, 2, 3, 4, 5, 6, 21 or 22. In still another embodiment, the FZF1 polypeptide comprises the amino acid sequence of SEQ ID NO: 2. In yet a further embodiment, the FZF1 polypeptide is a variant or a fragment of the amino acid sequence of SEQ ID NO: 1, 2, 3, 4, 5, 6, 21 or 22. In still another embodiment, the FZF1 polypeptide is a variant or a fragment of the amino acid sequence of SEQ ID NO: 2.

Figure 7A:
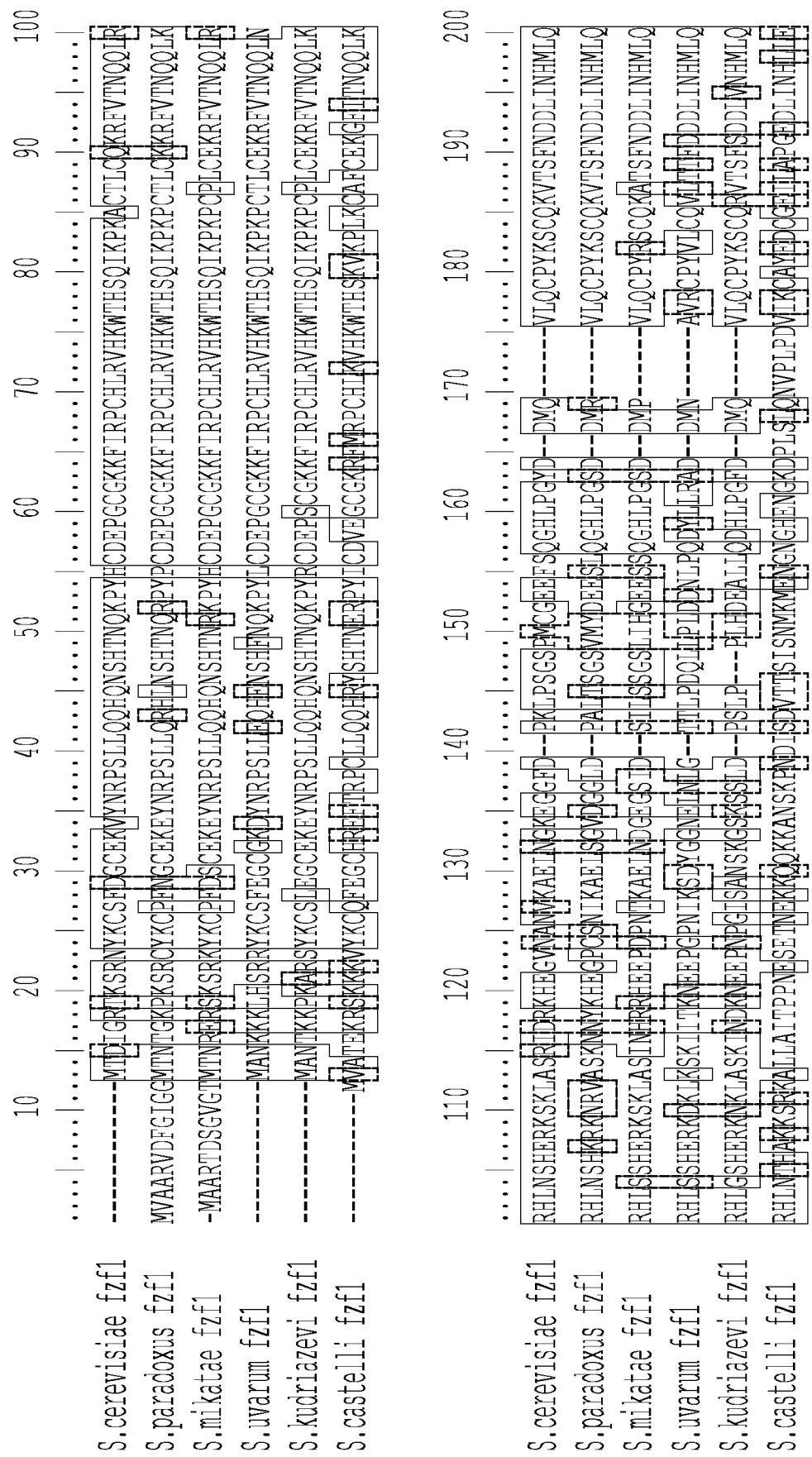
FIGS. 7A to 7D provide an amino acid alignment of (A) Saccharomyces sp. FZF1 (S. cerevisiae corresponds to SEQ ID NO: 1, S. paradoxus corresponds to SEQ ID NO: 2, S. mikatae corresponds to SEQ ID NO: 3, S. uvarum corresponds to SEQ ID NO: 4, S. kudriazevi corresponds to SEQ ID NO: 5 and S. castelii corresponds to SEQ ID NO: 6); (B) polypeptides encoded by fzf1 orthologs (same as panel A, C. glabratra corresponds to SEQ ID NO: 21 and S. stipitis corresponds to SEQ ID NO: 22); (C) Saccharomyces sp. SSU1 (S. cerevisiae corresponds to SEQ ID NO: 7, S. paradoxus corresponds to SEQ ID NO: 8, S. mikatae corresponds to SEQ ID NO: 9, S. uvarum corresponds to SEQ ID NO: 10, S. kudriazevi corresponds to SEQ ID NO: 11 and S. castelii corresponds to SEQ ID NO: 12) and (D) polypeptides encodes by ssu1 orthologs (same as panel C, C. glabratra corresponds to SEQ ID NO: 24 and Z. bailii corresponds to SEQ ID NO: 25).
Figure 7A:
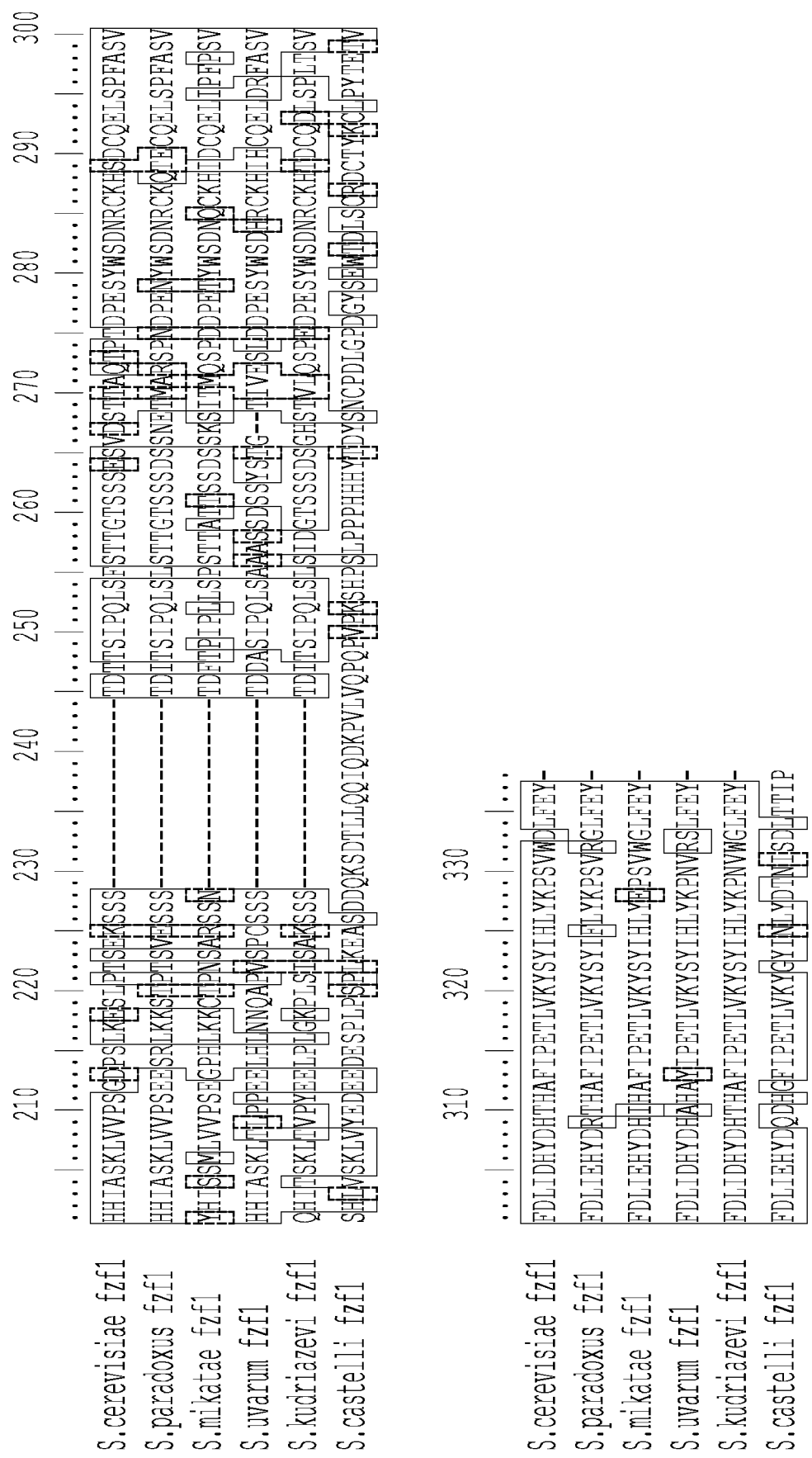

FIG. 7A provides an amino acid alignment of FZF1 polypeptides from various *Saccharomyces* sp. In an embodiment, the heterologous FZF1 polypeptides has the amino acid consensus sequence shown in FIG. 7A (corresponding to SEQ ID NO: 20). In yet another embodiment, the heterologous FZF1 polypeptide has at least one of the following regions corresponding to amino acid residues from the consensus sequence (SEQ ID NO: 20): a first region spanning residues 24 to 115, a second region spanning residues 175 to 213, a third region spanning residues 245 to 265 and/or a fourth region spanning residues 276 to 337. In still another embodiment, the heterologous FZF1 polypeptide has at least one of any one of the following regions corresponding to amino acid residues from the consensus sequence (SEQ ID NO: 20): a first region spanning residues 24 to 115, a second region spanning residues 175 to 213, a third region spanning residues 245 to 265 and/or a fourth region spanning residues 276 to 337. In still another embodiment, the heterologous FZF1 polypeptide has at least three regions of any one of the following regions corresponding to amino acid residue from the consensus sequence (SEQ ID NO: 20): a first region spanning residues 24 to 115, a second region spanning residues 175 to 213, a third region spanning residues 245 to 265 and/or a fourth region spanning residues 276 to 337. According yet to another embodiment, the heterologous FZF1 polypeptide has the four following regions corresponding to amino acid residue from the consensus sequence (SEQ ID NO: 20): a first region spanning residues 24 to 115, a second region spanning residues 175 to 213, a third region spanning residues 245 to 265 and/or a fourth region spanning residues 276 to 337.

Figure 7B:
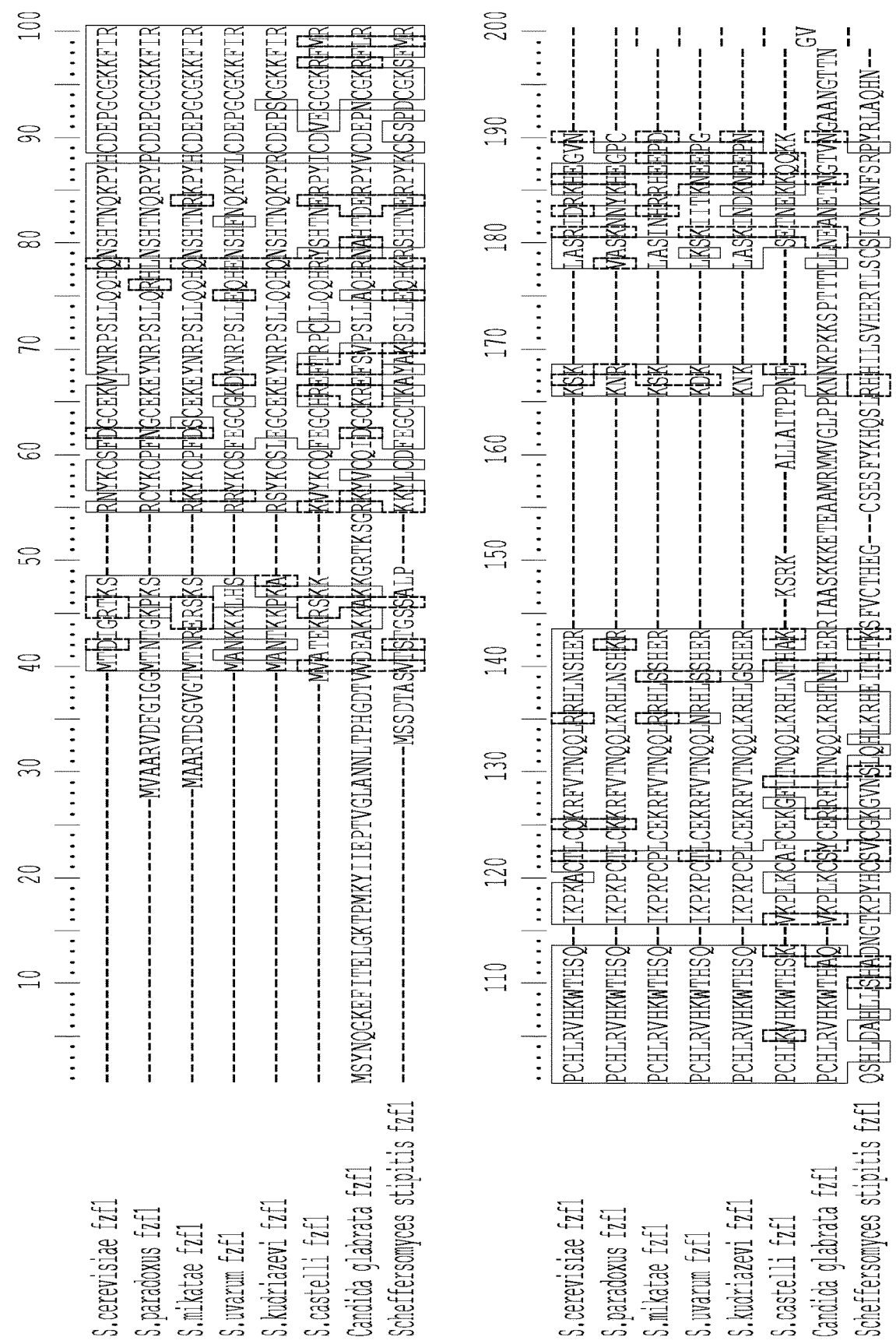
Figure 7B:
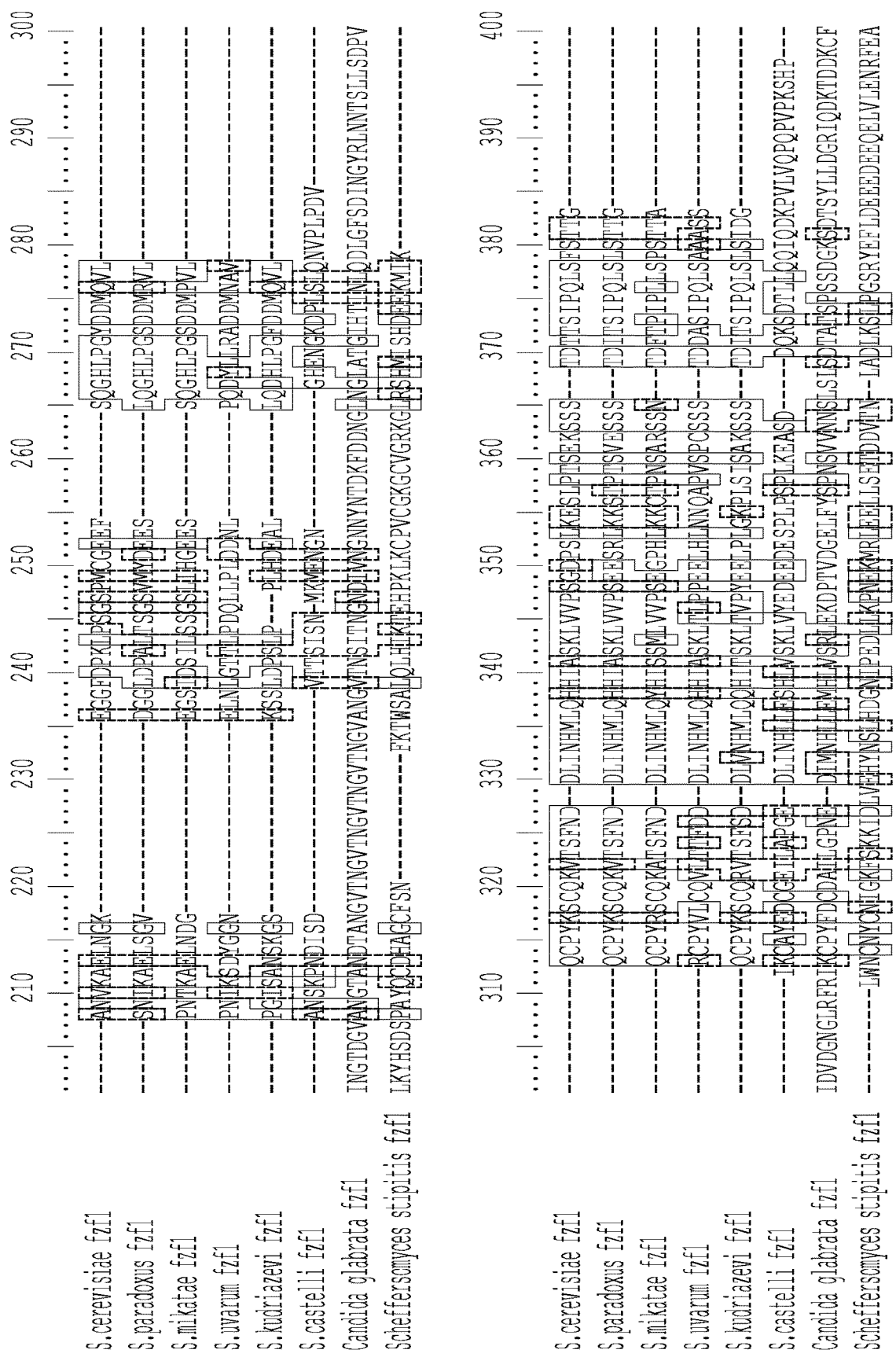
Figure 7B:
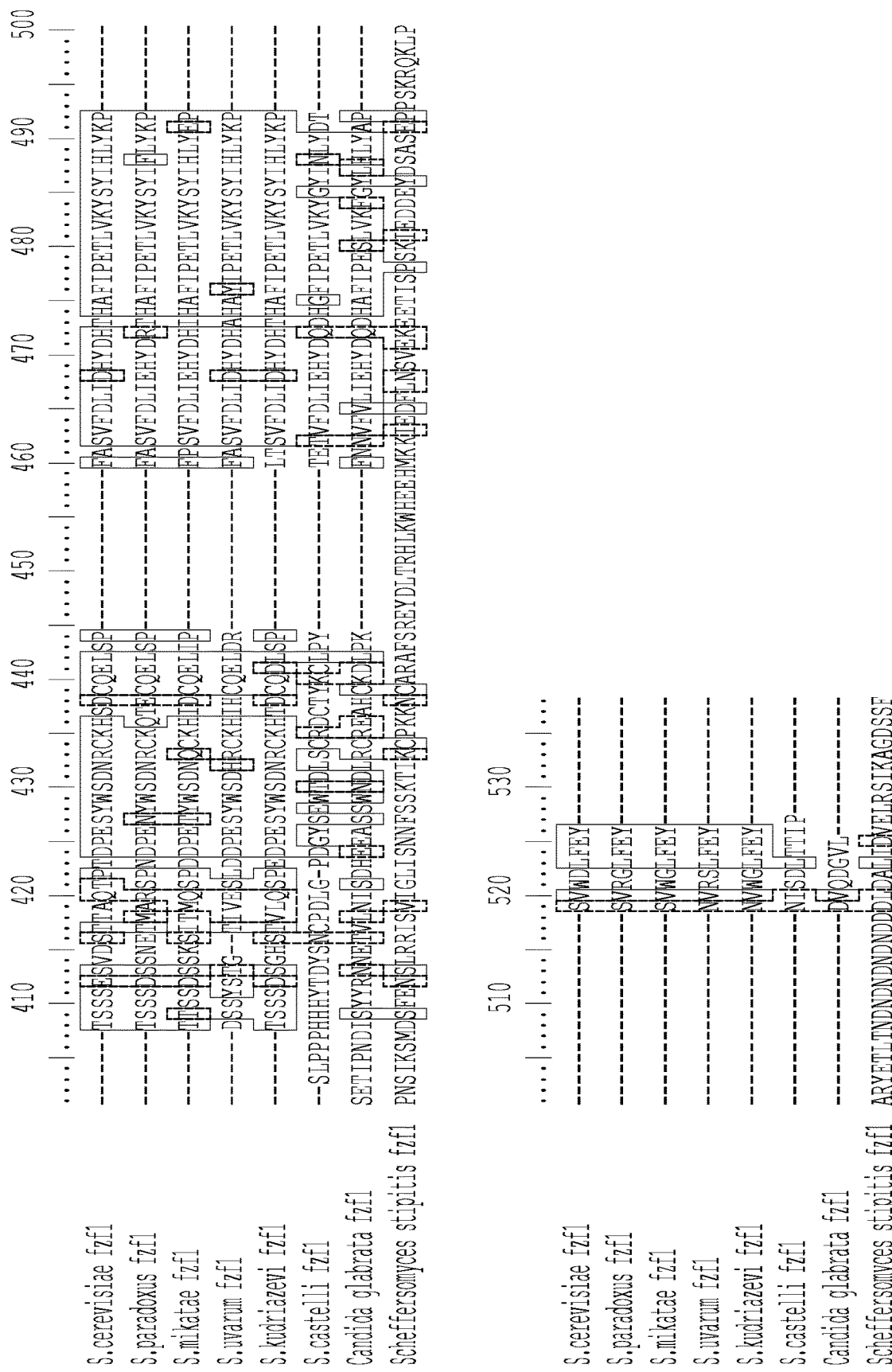

FIG. 7B provides an amino acid alignment of FZF1 polypeptides from various *Saccharomyces* sp. as well as polypeptides encoded by fzf1 orthologs. In an embodiment, the heterologous FZF1 polypeptide has the amino acid of the consensus sequence shown in FIG. 7B.

In another example, the second genetic modification can be made to allow the expression of an heterologous SSU1 polypeptide. As used in the context of the present disclosure, the expression "expression "allowing the expression of an heterologous SSU1 polypeptide" refers to a genetic modification which provides or increases the expression of the ssu1 gene (or its corresponding ortholog) encoding the SSU1 polypeptide, when compared to a corresponding yeast strain which does not bear the second genetic modification. In addition, the term "SSU1 polypeptide" (which is also referred to as LPG16) is plasma membrane sulfite pump involved in sulfite metabolism. More specifically, the SSU1 polypeptide is required for efficient sulfite efflux. The recombinant yeast host of the present disclosure can be genetically engineered to express the SSU1 polypeptide as a plasma membrane protein. The SSU1 polypeptide can be encoded by, for example, Gene ID 856013 (*S. cerevisiae*), Gene ID 2894347 (*Kluyveromyces lactis*), Gene ID 2541392 (*Schizosaccharomyces pombe*) or Gene ID 30035373 (*Sugiyamaella lignohabitans*). The heterologous SSU1 can be derived from the genus *Saccharomyces* and, in some instances, from the species *S. cerevisae, S. paradoxus, S. mikatea, S. uvarum, S. kudriazevi* or *S. eastern*. In still another embodiment, the SSU1 polypeptide can be derived from *S. paradoxus*. In yet another embodiment, the SSU1 polypeptide comprises the amino acid sequence of SEQ ID NO: 7, 8, 9, 10, 11, 12, 24 or 25. In yet another embodiment, the SSU1 polypeptide comprises the amino acid sequence of SEQ ID NO: 8. In yet a further embodiment, the SSU1 polypeptide is a variant or a fragment of the amino acid sequence of SEQ ID NO: 7, 8, 9, 10, 11, 12, 24 or 25. In yet a further embodiment, the SSU1 polypeptide is a variant or a fragment of the amino acid sequence of SEQ ID NO: 8.

Figure 7C:
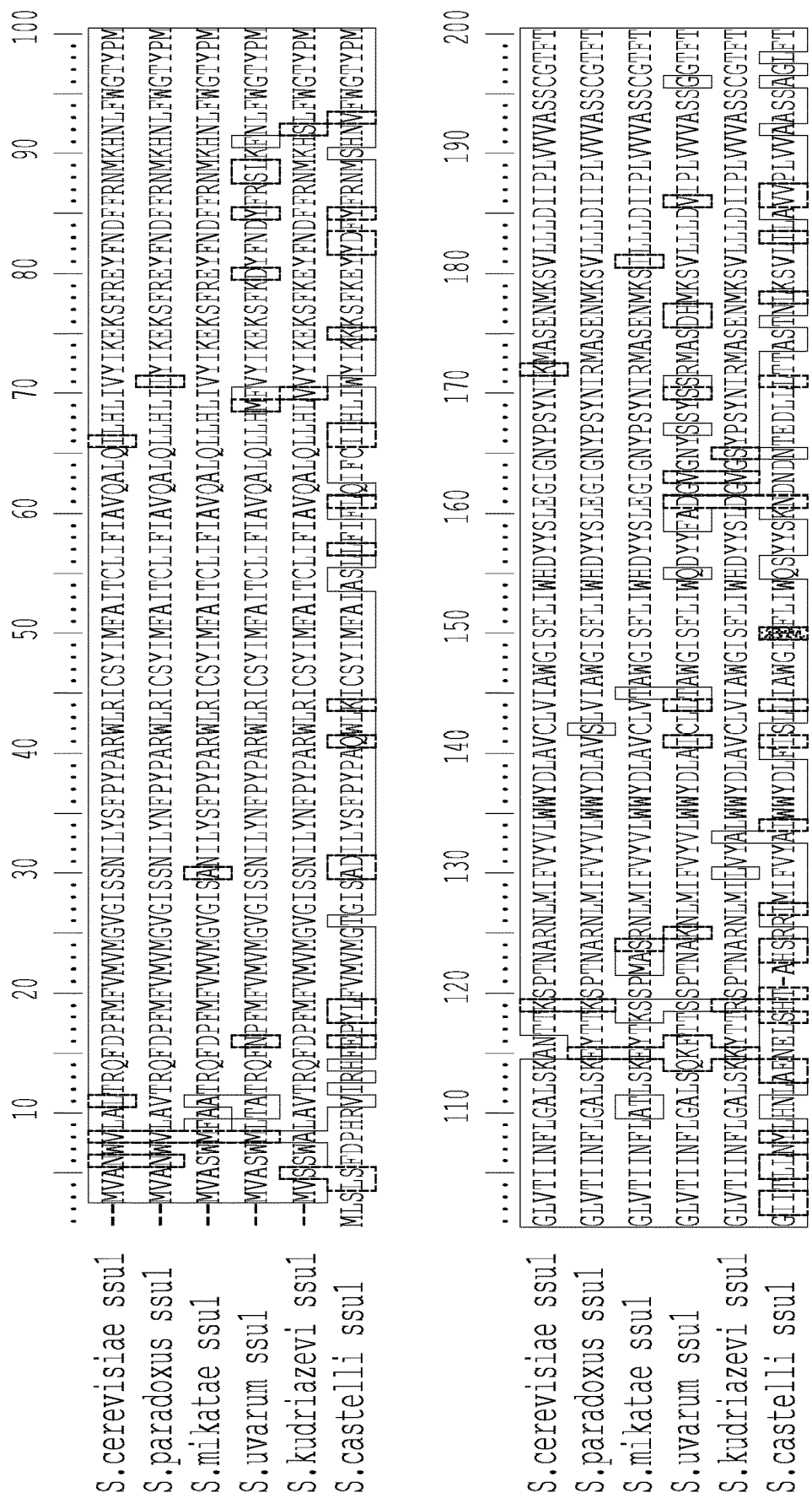
Figure 7C:
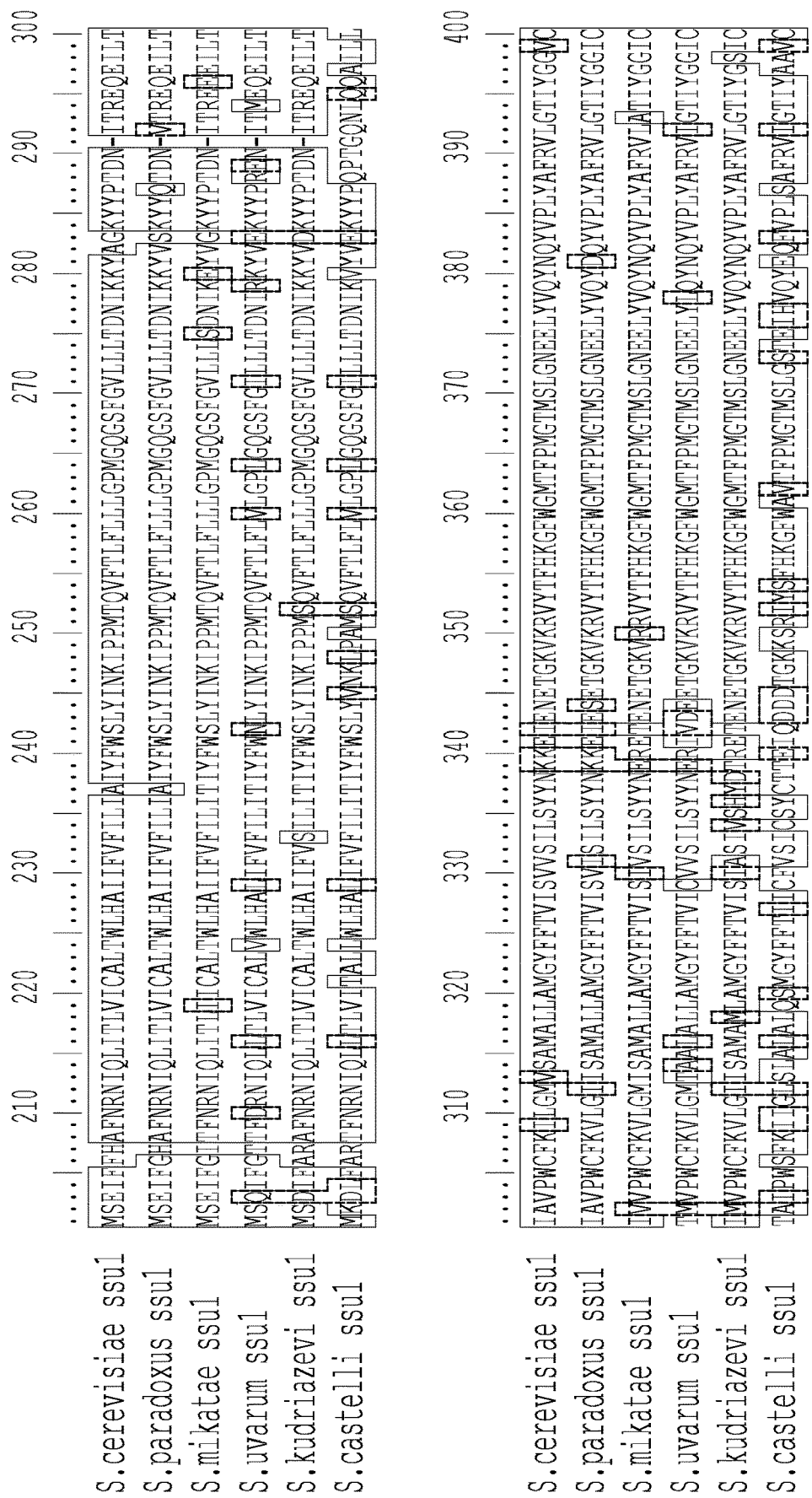

FIG. 7C provides an amino acid alignment of SSU1 polypeptides from various *Saccharomyces* sp. In an embodiment, the heterologous SSU1 polypeptides has the amino acid consensus sequence shown in FIG. 7C (corresponding to SEQ ID NO: 23). In yet another embodiment, the heterologous SSU1 polypeptide has at least one of the following regions corresponding to amino acid residues from the consensus sequence shown in FIG. 7C (SEQ ID NO: 23): a first region spanning residues 12 to 114, a second region spanning residues 120 to 338, a third region spanning residues 346 to 415, a fourth region spanning residues 420 to 431 and/or a fifth region spanning residues 439 to 463. In still another embodiment, the heterologous SSU1 polypeptide has at least one of any one of the following regions corresponding to amino acid residues from the consensus sequence shown in FIG. 7C (SEQ ID NO: 23): a first region spanning residues 12 to 114, a second region spanning residues 120 to 338, a third region spanning residues 346 to 415, a fourth region spanning residues 420 to 431 and/or a fifth region spanning residues 439 to 463. In still another embodiment, the heterologous SSU1 polypeptide has at least three regions of any one of the following regions corresponding to amino acid residue from the consensus sequence shown in FIG. 7C (SEQ ID NO: 23): a first region spanning residues 12 to 114, a second region spanning residues 120 to 338, a third region spanning residues 346 to 415, a fourth region spanning residues 420 to 431 and/or a fifth region spanning residues 439 to 463. According yet to another embodiment, the heterologous SSU1 polypeptide has at least four regions of any one of the following regions corresponding to amino acid residue from the consensus sequence shown in FIG. 7C (SEQ ID NO: 23): a first region spanning residues 12 to 114, a second region spanning residues 120 to 338, a third region spanning residues 346 to 415, a fourth region spanning residues 420 to 431 and/or a fifth region spanning residues 439 to 463. According to yet another embodiment, the heterologous SSU1 polypeptide has the five following regions corresponding to amino acid residues from the consensus sequence shown in FIG. 7C (SEQ ID NO: 23): a first region spanning residues 12 to 114, a second region spanning residues 120 to 338, a third region spanning residues 346 to 415, a fourth region spanning residues 420 to 431 and/or a fifth region spanning residues 439 to 463.

Figure 7D:
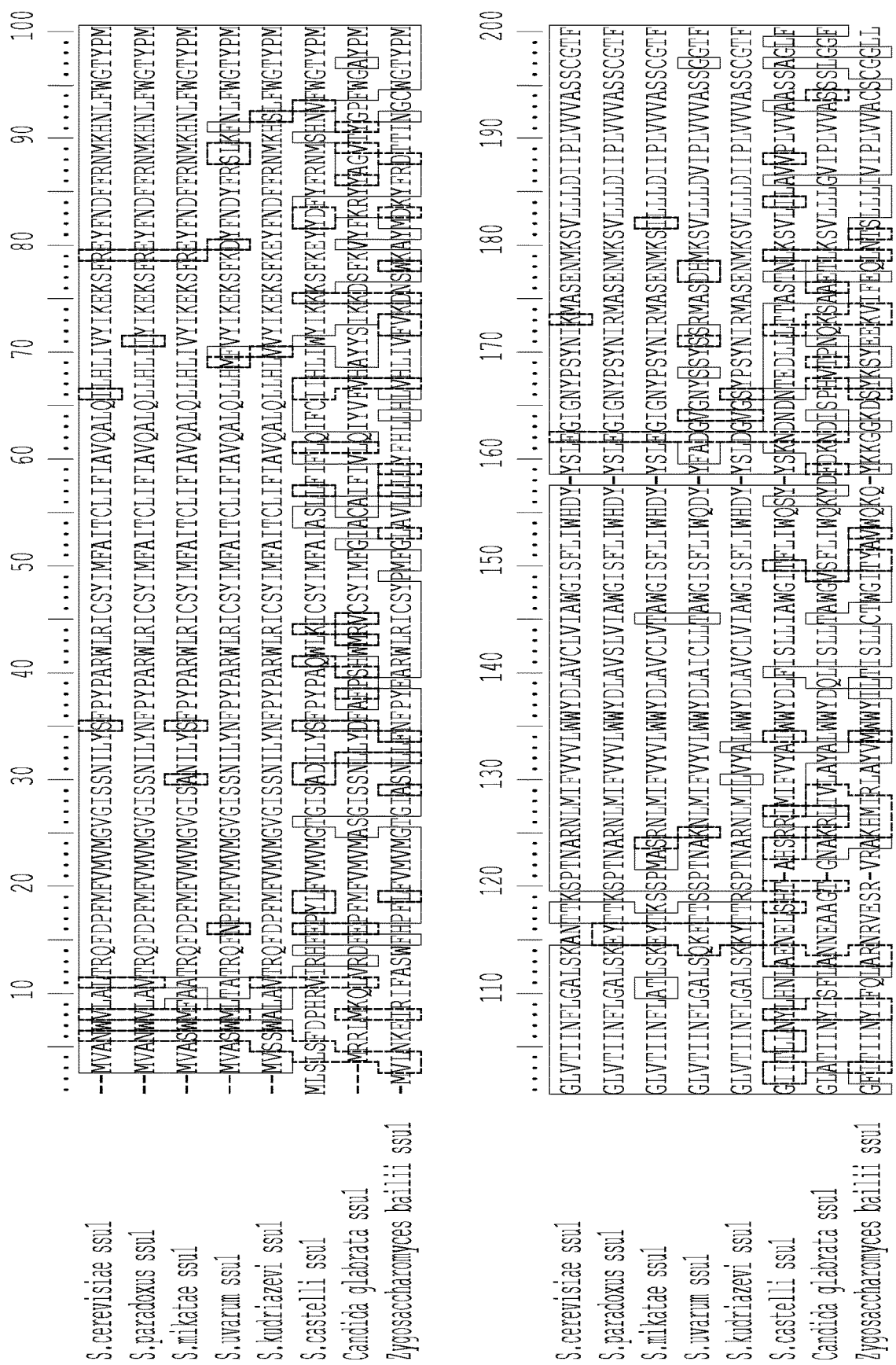
Figure 7D:
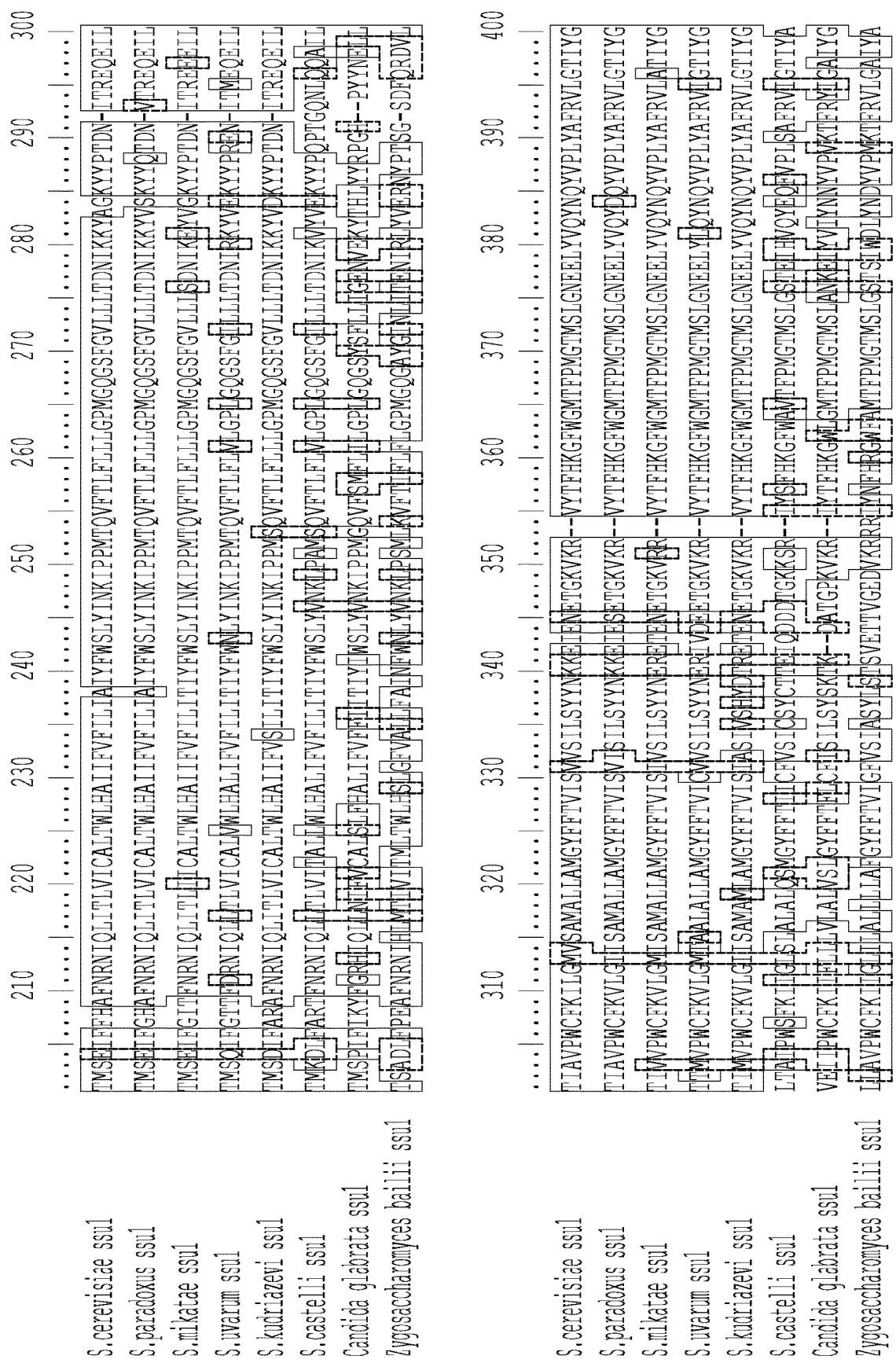
Figure 7D:
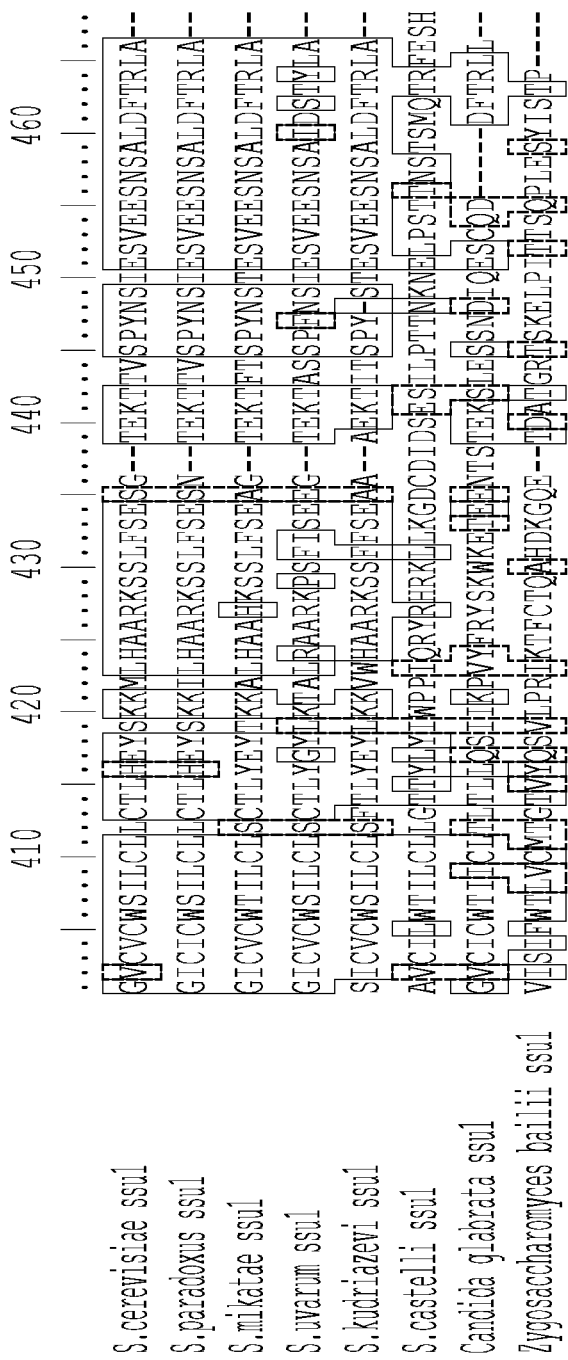

FIG. 7D provides an amino acid alignment of SSU1 polypeptides from various *Saccharomyces* sp. as well as polypeptides encoded by ssu1 orthologs. In an embodiment, the heterologous SSU1 polypeptide has the amino acid of the consensus sequence shown in FIG. 7D.

The heterologous FZF1 and SSU1 polypeptides that can expressed by the recombinant yeast host cell can be provided from any heterologous organism. The term "heterologous" when used in reference to a nucleic acid molecule (such as a promoter or a coding sequence) refers to a nucleic acid is not natively found in the host yeast. "Heterologous" also includes a native coding region, or portion thereof, that is removed from the source organism and subsequently reintroduced into the source organism in a form that is different from the corresponding native gene, e.g., not in its natural location in the organism's genome. In the context of the present disclosure, the heterologous nucleic acid molecule is purposively introduced into the yeast. A "heterologous" nucleic acid molecule may be derived from any source, e.g., eukaryotes (yeasts, plants, animals), prokaryotes (bacteria), viruses, etc. In an embodiment, the heterologous nucleic acid molecule may be derived from an eukaryote (such as, for example, another yeast) or a prokaryote (such as, for example, a bacteria). The term "heterologous" as used herein also refers to an element (nucleic acid or protein) that is derived from a source other than the endogenous source. Thus, for example, a heterologous element could be derived from a different strain of host cell, or from an organism of a different taxonomic group (e.g., different kingdom, phylum, class, order, family genus, or species, or any subgroup within one of these classifications). The term "heterologous" is also used synonymously herein with the term "exogenous".

The heterologous FZF1 and SSU1 polypeptides can be a variant of a known FZF1 or SSU1 polypeptides, for example a variant of the polypeptides having the amino acid sequence of SEQ ID NO: 1, 2, 3, 4, 5, 6, 7, 8, 9, 10, 11, 12, 21, 22, 24 or 25. The polypeptide variants have at least 50%, 55%, 60%, 65%, 70%, 75%, 80%, 85%, 90%, 95%, 96%, 97%, 98% or 99% identity to the FZF1 and SSU1 polypeptides described herein. A variant comprises at least one amino acid difference when compared to the amino acid sequence of the native FZF1 or SSU1 polypeptide. The term "percent identity", as known in the art, is a relationship between two or more polypeptide sequences or two or more polynucleotide sequences, as determined by comparing the sequences. The level of identity can be determined conventionally using known computer programs. Identity can be readily calculated by known methods, including but not limited to those described in: Computational Molecular Biology (Lesk, A.

M., ed.) Oxford University Press, NY (1988); Biocomputing: Informatics and Genome Projects (Smith, D. W., ed.) Academic Press, NY (1993); Computer Analysis of Sequence Data, Part I (Griffin, A. M., and Griffin, H. G., eds.) Humana Press, NJ (1994); Sequence Analysis in Molecular Biology (von Heinje, G., ed.) Academic Press (1987); and Sequence Analysis Primer (Gribskov, M. and Devereux, J., eds.) Stockton Press, NY (1991). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR Inc., Madison, Wis.). Multiple alignments of the sequences disclosed herein were performed using the Clustal method of alignment (Higgins and Sharp (1989) CABIOS. 5:151-153) with the default parameters (GAP PENALTY=10, GAP LENGTH PEN ALT Y=10). Default parameters for pairwise alignments using the Clustal method were KTUPLB 1, GAP PENALTY=3, WINDOW=5 and DIAGONALS SAVED=5.

The variant heterologous FZF1 or SSU1 polypeptides described herein may be (i) one in which one or more of the amino acid residues are substituted with a conserved or non-conserved amino acid residue (preferably a conserved amino acid residue) and such substituted amino acid residue may or may not be one encoded by the genetic code, or (ii) one in which one or more of the amino acid residues includes a substituent group, or (iii) one in which the mature polypeptide is fused with another compound, such as a compound to increase the half-life of the polypeptide (for example, polyethylene glycol), or (iv) one in which the additional amino acids are fused to the mature polypeptide for purification of the polypeptide.

A "variant" of the FZF1 or SSU1 polypeptides can be a conservative variant or an allelic variant. As used herein, a conservative variant refers to alterations in the amino acid sequence that do not adversely affect the biological functions of the FZF1 (transcription factor capable of favoring the expression of the SSU1 polypeptide) or of the SSU1 (sulfite efflux pump) polypeptides. A substitution, insertion or deletion is said to adversely affect the polypeptide when the altered sequence prevents or disrupts a biological function associated with the FZF1 or the SSU1 polypeptide. For example, the overall charge, structure or hydrophobic-hydrophilic properties of the protein can be altered without adversely affecting a biological activity. Accordingly, the amino acid sequence can be altered, for example to render the peptide more hydrophobic or hydrophilic, without adversely affecting the biological activities of the FZF1 or the SSU1 polypeptide.

The heterologous FZF1 and SSU1 polypeptides can be a fragment of a known FZF1 or SSU1 polypeptide or fragment of a variant of a known FZF1 or SSU1 polypeptide (such as, for example, a fragment of the FZF1 or SSU1 polypeptide having the amino acid sequence of any one of SEQ ID NO: 1, 2, 3, 4, 5, 6, 7, 8, 9, 10, 11, 12, 21, 22, 24 or 25). FZF1 "fragments" have at least at least 100, 110, 120, 130, 140, 150, 160, 170, 180, 190, 200, 210 or 220 or more consecutive amino acids residues of the FZF1 polypeptide. SSU1 "fragments" have at least 100, 150, 200, 250, 300, 350, 400, 450 or more consecutive amino acid residues of the SSU1 polypeptide. A fragment comprises at least one less amino acid residue when compared to the amino acid sequence of the FZF1 or the SSU1 polypeptide and still possess the biological activity of the full-length FZF1 or SSU1 polypeptide. In some embodiments, fragments of the FZF1 or SSU1 polypeptides can be employed for producing the corresponding full-length FZF1 or SSU1 polypeptides by peptide synthesis. Therefore, the fragments can be employed as intermediates for producing the full-length proteins.

The heterologous nucleic acid molecule encoding the heterologous FZF1 and SSU1 polypeptides, variant or fragment can be integrated in the genome of the yeast host cell. The term "integrated" as used herein refers to genetic elements that are placed, through molecular biology techniques, into the genome of a host cell. For example, genetic elements can be placed into the chromosomes of the host cell as opposed to in a vector such as a plasmid carried by the host cell. Methods for integrating genetic elements into the genome of a host cell are well known in the art and include homologous recombination. The heterologous nucleic acid molecule can be present in one or more copies in the yeast host cell's genome. Alternatively, the heterologous nucleic acid molecule can be independently replicating from the yeast's genome. In such embodiment, the nucleic acid molecule can be stable and self-replicating.

The present disclosure also provides nucleic acid molecules for modifying the yeast host cell so as to allow the expression of the heterologous FZF1 and/or SSU1 polypeptides, variants or fragments. The nucleic acid molecule may be DNA (such as complementary DNA, synthetic DNA or genomic DNA) or RNA (which includes synthetic RNA) and can be provided in a single stranded (in either the sense or the antisense strand) or a double stranded form. The contemplated nucleic acid molecules can include alterations in the coding regions, non-coding regions, or both. Examples are nucleic acid molecule variants containing alterations which produce silent substitutions, additions, or deletions, but do not alter the properties or activities of the encoded FZF1 and/or SSU1 polypeptides, variants or fragments.

The present disclosure also provides nucleic acid molecules that are hybridizable to the complement nucleic acid molecules encoding the heterologous polypeptides as well as variants or fragments. A nucleic acid molecule is "hybridizable" to another nucleic acid molecule, such as a cDNA, genomic DNA, or RNA, when a single stranded form of the nucleic acid molecule can anneal to the other nucleic acid molecule under the appropriate conditions of temperature and solution ionic strength. Hybridization and washing conditions are well known and exemplified, e.g., in Sambrook, J., Fritsch, E. F. and Maniatis, T. MOLECULAR CLONING: A LABORATORY MANUAL, Second Edition, Cold Spring Harbor Laboratory Press, Cold Spring Harbor (1989), particularly Chapter 11 and Table 11.1 therein. The conditions of temperature and ionic strength determine the "stringency" of the hybridization. Stringency conditions can be adjusted to screen for moderately similar fragments, such as homologous sequences from distantly related organisms, to highly similar fragments, such as genes that duplicate functional enzymes from closely related organisms. Post-hybridization washes determine stringency conditions. One set of conditions uses a series of washes starting with 6×SSC, 0.5% SDS at room temperature for 15 min, then repeated with 2×SSC, 0.5% SDS at 45° C. for 30 min, and then repeated twice with 0.2×SSC, 0.5% SDS at 50° C. for 30 min. For more stringent conditions, washes are performed at higher temperatures in which the washes are identical to those above except for the temperature of the final two 30 min washes in 0.2×SSC, 0.5% SDS are increased to 60° C. Another set of highly stringent conditions uses two final washes in 0.1×SSC, 0.1% SDS at 65° C.

An additional set of highly stringent conditions are defined by hybridization at 0.1×SSC, 0.1% SDS, 65° C. and washed with 2×SSC, 0.1% SDS followed by 0.1×SSC, 0.1% SDS.

Hybridization requires that the two nucleic acid molecules contain complementary sequences, although depending on the stringency of the hybridization, mismatches between bases are possible. The appropriate stringency for hybridizing nucleic acids depends on the length of the nucleic acids and the degree of complementation, variables well known in the art. The greater the degree of similarity or homology between two nucleotide sequences, the greater the value of Tm for hybrids of nucleic acids having those sequences. The relative stability (corresponding to higher Tm) of nucleic acid hybridizations decreases in the following order: RNA: RNA, DNA:RNA, DNA:DNA. For hybrids of greater than 100 nucleotides in length, equations for calculating Tm have been derived. For hybridizations with shorter nucleic acids, i.e. e., oligonucleotides, the position of mismatches becomes more important, and the length of the oligonucleotide determines its specificity. In one embodiment the length for a hybridizable nucleic acid is at least about 10 nucleotides. Preferably a minimum length for a hybridizable nucleic acid is at least about 15 nucleotides; more preferably at least about 20 nucleotides; and most preferably the length is at least 30 nucleotides. Furthermore, the skilled artisan will recognize that the temperature and wash solution salt concentration may be adjusted as necessary according to factors such as length of the probe.

The nucleic acid molecules of the present disclosure can comprise a coding region for the heterologous FZF1 and/or SSU1 polypeptides as well as its variants and fragments. A DNA or RNA "coding region" is a DNA or RNA molecule which is transcribed and/or translated into a polypeptide in a cell in vitro or in vivo when placed under the control of appropriate regulatory sequences. "Suitable regulatory regions" refer to nucleic acid regions located upstream (5' non-coding sequences), within, or downstream (3' non-coding sequences) of a coding region, and which influence the transcription, RNA processing or stability, or translation of the associated coding region. Regulatory regions may include promoters, translation leader sequences, RNA processing site, effector binding site and stem-loop structure. The boundaries of the coding region are determined by a start codon at the 5' (amino) terminus and a translation stop codon at the 3' (carboxyl) terminus. A coding region can include, but is not limited to, prokaryotic regions, cDNA from mRNA, genomic DNA molecules, synthetic DNA molecules, or RNA molecules. If the coding region is intended for expression in a eukaryotic cell, a polyadenylation signal and transcription termination sequence will usually be located 3' to the coding region. In an embodiment, the coding region can be referred to as an open reading frame. "Open reading frame" is abbreviated ORF and means a length of nucleic acid, either DNA, cDNA or RNA, that comprises a translation start signal or initiation codon, such as an ATG or AUG, and a termination codon and can be potentially translated into a polypeptide sequence.

The nucleic acid molecules described herein can comprise transcriptional and/or translational control regions. "Transcriptional and translational control regions" are DNA regulatory regions, such as promoters, enhancers, terminators, and the like, that provide for the expression of a coding region in a host cell. In eukaryotic cells, polyadenylation signals are control regions.

The promoter can be heterologous to the nucleic acid molecule encoding the heterologous protein. The promoter can be heterologous or derived from a strain being from the same genus or species as the recombinant yeast host cell. In an embodiment, the promoter is derived from the same genera or species of the yeast host cell and the heterologous protein is derived from different genera that the yeast host cell.

In the context of the present disclosure, the promoter controlling the expression of the heterologous FZF1 and/or SSU1 polypeptides can be constitutive promoters (such as, for example, tef2p (e.g., the promoter of the tef2 gene), cwp2p (e.g., the promoter of the cwp2 gene), ssa1p (e.g., the promoter of the ssa1 gene), eno1p (e.g., the promoter of the eno1 gene) and pgk1p (e.g., the promoter of the pgk1 gene). However, is some embodiments, it is preferable to limit the expression of the FZF1 and/or the SSU1 polypeptides when sulfite contamination occurs or is most likely going to be present. As such, the promoter controlling the expression of the heterologous FZF1 and/or the SSU1 polypeptides can be an inducible promoter such as, for example, a glucose-regulated promoter (e.g., the promoter of the hxt7 gene (referred to as hxt7p)) or a sulfite-regulated promoter (e.g., the promoter of the gpd2 gene (referred to as gpd2p or the promoter of the fzf1 gene (referred to as the fzf1p)), the promoter of the ssu1 gene (referred to as ssu1p), the promoter of the ssu1-r gene (referred to as ssur1-rp and described in Nardi et al., 2010)). In an embodiment, the promoter used to allow the expression of the heterologous polypeptides are selected from the group consisting of gpd2p and ssu1-rp. One or more promoters can be used to allow the expression of each heterologous polypeptides in the recombinant yeast host cell. The promoter(s) regulating the expression of the heterologous FZF1 polypeptide can be the same or different from the promoter(s) regulating the expression of the heterologous SSU1 polypeptide. In an embodiment, the promoter that can be used to allow the expression of the FZF1 and/or the SSU1 polypeptides excludes anaerobic-regulated promoters, such as, for example tdh1p (e.g., the promoter of the tdh1 gene), pau5p (e.g., the promoter of the pau5 gene), hor7p (e.g., the promoter of the hor7 gene), adh1p (e.g., the promoter of the adh1 gene), tdh2p (e.g., the promoter of the tdh2 gene), tdh3p (e.g., the promoter of the tdh3 gene), gpd1p (e.g., the promoter of the gdp1 gene), cdc19p (e.g., the promoter of the cdc19 gene), eno2p (e.g., the promoter of the eno2 gene), pdc1p (e.g., the promoter of the pdc1 gene), hxt3p (e.g., the promoter of the hxt31 gene) and tpi1p (e.g., the promoter of the tpi1 gene).

Additional Genetic Modifications

In some instances, the recombinant yeast host cell can include a further genetic modification for reducing the production of one or more native enzyme that function to catabolize (breakdown) formate. As used in the context of the present disclosure, the expression "native polypeptides that function to catabolize formate" refers to polypeptides which are endogenously found in the recombinant yeast host cell. Native enzymes that function to catabolize formate include, but are not limited to, the FDH1 and the FDH2 polypeptides (also referred to as FDH1 and FDH2 respectively). In an embodiment, the recombinant yeast host cell bears a genetic modification in at least one of the fdh1 gene (encoding the FDH1 polypeptide), the fdh2 gene (encoding the FDH2 polypeptide) or orthologs thereof. In another embodiment, the recombinant yeast host cell bears genetic modifications in both the fdh1 gene (encoding the FDH1 polypeptide) and the fdh2 gene (encoding the FDH2 polypeptide) or orthologs thereof. Examples of recombinant yeast host cells bearing such genetic modification(s) leading to the reduction in the production of one or more native enzymes that function to catabolize formate are described in WO 2012/138942. Preferably, the recombinant yeast host cell has genetic modifications (such as a genetic deletion or insertion) in the fdh1 gene and in the fdh2 gene which would cause the host cell to have knocked-out fdh1 and fdh2 genes.

In some embodiments, the recombinant yeast host cell can include a further genetic modification for increasing the production of an heterologous enzyme that function to anabolize (form) formate. As used in the context of the present disclosure, "an heterologous enzyme that function to anabolize formate" refers to polypeptides which may or may not be endogeneously found in the recombinant yeast host cell and that are purposefully introduced into the recombinant yeast host cells. In some embodiments, the heterologous enzyme that function to anabolize formate is an heterologous pyruvate formate lyase (PFL), an heterologous acetaldehyde dehydrogenases, an heterologous alcohol dehydrogenases, and/or and heterologous bifunctional acetylaldehyde/alcohol dehydrogenases (AADH) such as those described in U.S. Pat. No. 8,956,851 and WO 2015/023989. More specifically, PFL and AADH enzymes for use in the recombinant yeast host cells can come from a bacterial or eukaryotic source. Heterologous PFL of the present disclosure include, but are not limited to, the PFLA polypeptide, a polypeptide encoded by a pfla gene ortholog, the PFLB polypeptide or a polypeptide encoded by a pflb gene ortholog. Heterologous AADHs of the present disclosure include, but are not limited to, the ADHE polypeptides or a polypeptide encoded by an adhe gene ortholog. In an embodiment, the recombinant yeast host cell of the present disclosure comprises at least one of the following heterologous enzymes that function to anabolize formate: the PFLA polypeptide, the PFLB polypeptide and/or the ADHE polypeptide. In an embodiment, the recombinant yeast host cell of the present disclosure comprises at least two of the following heterologous enzymes that function to anabolize formate: the PFLA polypeptide, the PFLB polypeptideand/or the ADHE polypeptide. In another embodiment, the recombinant yeast host cell of the present disclosure comprises the following heterologous enzymes that function to anabolize formate: the PFLA polypeptide, the PFLB polypeptide and the ADHE polypeptide.

The recombinant yeast host cell can be further genetically modified to allow for the production of additional heterologous proteins. In an embodiment, the recombinant yeast host cell can be used for the production of an enzyme, and especially an enzyme involved in the cleavage or hydrolysis of its substrate (e.g., a lytic enzyme and, in some embodiments, a saccharolytic enzyme). In still another embodiment, the enzyme can be a glycoside hydrolase. In the context of the present disclosure, the term "glycoside hydrolase" refers to an enzyme involved in carbohydrate digestion, metabolism and/or hydrolysis, including amylases, cellulases, hemicellulases, cellulolytic and amylolytic accessory enzymes, inulinases, levanases, trehalases, pectinases, and pentose sugar utilizing enzymes. In another embodiment, the enzyme can be a protease. In the context of the present disclosure, the term "protease" refers to an enzyme involved in protein digestion, metabolism and/or hydrolysis. In yet another embodiment, the enzyme can be an esterase. In the context of the present disclosure, the term "esterase" refers to an enzyme involved in the hydrolysis of an ester from an acid or an alcohol, including phosphatases such as phytases.

The additional heterologous protein can be an "amylolytic enzyme", an enzyme involved in amylase digestion, metabolism and/or hydrolysis. The term "amylase" refers to an enzyme that breaks starch down into sugar. All amylases are glycoside hydrolases and act on α-1,4-glycosidic bonds. Some amylases, such as γ-amylase (glucoamylase), also act on α-1,6-glycosidic bonds. Amylase enzymes include α-amylase (EC 3.2.1.1), β-amylase (EC 3.2.1.2), and γ-amylase (EC 3.2.1.3). The α-amylases are calcium metalloenzymes, unable to function in the absence of calcium. By acting at random locations along the starch chain, α-amylase breaks down long-chain carbohydrates, ultimately yielding maltotriose and maltose from amylose, or maltose, glucose and "limit dextrin" from amylopectin. Because it can act anywhere on the substrate, α-amylase tends to be faster-acting than β-amylase. In an embodiment, the heterologous protein is derived from a α-amylase such as, for example, from the α-amylase of Bacillus amyloliquefacens. Another form of amylase, β-amylase is also synthesized by bacteria, fungi, and plants. Working from the non-reducing end, β-amylase catalyzes the hydrolysis of the second α-1,4 glycosidic bond, cleaving off two glucose units (maltose) at a time. Another amylolytic enzyme is α-glucosidase that acts on maltose and other short malto-oligosaccharides produced by α-, β-, and γ-amylases, converting them to glucose. Another amylolytic enzyme is pullulanase. Pullulanase is a specific kind of glucanase, an amylolytic exoenzyme, that degrades pullulan. Pullulan is regarded as a chain of maltotriose units linked by alpha-1,6-glycosidic bonds. Pullulanase (EC 3.2.1.41) is also known as pullulan-6-glucanohydrolase (debranching enzyme). Another amylolytic enzyme, isopullulanase, hydrolyses pullulan to isopanose (6-alpha-maltosylglucose). Isopullulanase (EC 3.2.1.57) is also known as pullulan 4-glucanohydrolase. An "amylase" can be any enzyme involved in amylase digestion, metabolism and/or hydrolysis, including α-amylase, β-amylase, glucoamylase, pullulanase, isopullulanase, and alpha-glucosidase.

The additional heterologous protein can be a "cellulolytic enzyme", an enzyme involved in cellulose digestion, metabolism and/or hydrolysis. The term "cellulase" refers to a class of enzymes that catalyze cellulolysis (i.e. the hydrolysis) of cellulose. Several different kinds of cellulases are known, which differ structurally and mechanistically. There are general types of cellulases based on the type of reaction catalyzed: endocellulase breaks internal bonds to disrupt the crystalline structure of cellulose and expose individual cellulose polysaccharide chains; exocellulase cleaves 2-4 units from the ends of the exposed chains produced by endocellulase, resulting in the tetrasaccharides or disaccharide such as cellobiose. There are two main types of exocellulases (or cellobiohydrolases, abbreviate CBH)—one type working processively from the reducing end, and one type working processively from the non-reducing end of cellulose; cellobiase or beta-glucosidase hydrolyses the exocellulase product into individual monosaccharides; oxidative cellulases that depolymerize cellulose by radical reactions, as for instance cellobiose dehydrogenase (acceptor); cellulose phosphorylases that depolymerize cellulose using phosphates instead of water. In the most familiar case of cellulase activity, the enzyme complex breaks down cellulose to beta-glucose. A "cellulase" can be any enzyme involved in cellulose digestion, metabolism and/or hydrolysis, including an endoglucanase, glucosidase, cellobiohydrolase, xylanase, glucanase, xylosidase, xylan esterase, arabinofuranosidase, galactosidase, cellobiose phosphorylase, cellodextrin phosphorylase, mannanase, mannosidase, xyloglucanase, endoxylanase, glucuronidase, acetylxylanesterase, arabinofuranohydrolase, swollenin, glucuronyl esterase, expansin, pectinase, and feruoyl esterase protein.

The additional heterologous protein can have "hemicellulolytic activity", an enzyme involved in hemicellulose digestion, metabolism and/or hydrolysis. The term "hemicellulase" refers to a class of enzymes that catalyze the hydrolysis of cellulose. Several different kinds of enzymes are known to have hemicellulolytic activity including, but not limited to, xylanases and mannanases.

The additional heterologous protein can have "xylanolytic activity", an enzyme having the is ability to hydrolyze glycosidic linkages in oligopentoses and polypentoses. The term "xylanase" is the name given to a class of enzymes which degrade the linear polysaccharide beta-1,4-xylan into xylose, thus breaking down hemicellulose, one of the major components of plant cell walls. Xylanases include those enzymes that correspond to Enzyme Commission Number 3.2.1.8. The heterologous protein can also be a "xylose metabolizing enzyme", an enzyme involved in xylose digestion, metabolism and/or hydrolysis, including a xylose isomerase, xylulokinase, xylose reductase, xylose dehydrogenase, xylitol dehydrogenase, xylonate dehydratase, xylose transketolase, and a xylose transaldolase protein. A "pentose sugar utilizing enzyme" can be any enzyme involved in pentose sugar digestion, metabolism and/or hydrolysis, including xylanase, arabinase, arabinoxylanase, arabinosidase, arabinofuranosidase, arabinoxylanase, arabinosidase, and arabinofuranosidase, arabinose isomerase, ribulose-5-phosphate 4-epimerase, xylose isomerase, xylulokinase, xylose reductase, xylose dehydrogenase, xylitol dehydrogenase, xylonate dehydratase, xylose transketolase, and/or xylose transaldolase.

The additional heterologous protein can have "mannanic activity", an enzyme having the is ability to hydrolyze the terminal, non-reducing β-D-mannose residues in β-D-mannosides. Mannanases are capable of breaking down hemicellulose, one of the major components of plant cell walls. Xylanases include those enzymes that correspond to Enzyme Commission Number 3.2.25.

The additional heterologous protein can be a "pectinase", an enzyme, such as pectolyase, pectozyme and polygalacturonase, commonly referred to in brewing as pectic enzymes. These enzymes break down pectin, a polysaccharide substrate that is found in the cell walls of plants.

The additional heterologous protein can have "phytolytic activity", an enzyme catalyzing the conversion of phytic acid into inorganic phosphorus. Phytases (EC 3.2.3) can be belong to the histidine acid phosphatases, β-propeller phytases, purple acid phosphastases or protein tyrosine phosphatase-like phytases family.

The additional heterologous protein can have "proteolytic activity", an enzyme involved in protein digestion, metabolism and/or hydrolysis, including serine proteases, threonine proteases, cysteine proteases, aspartate proteases, glutamic acid proteases and metalloproteases.

When the recombinant yeast host cell expresses an heterologous protein, it can be further modified to increase its robustness at high temperatures. Genetic modifications for increasing the robustness of a genetically-modified recombinant yeast host cell are described in WO 2017/037614.

Methods of Using the Recombinant Yeast Host Cell

The genetic modifications allowing the expression of an heterologous transcription factor favoring the expression of a SSU1 polypeptide and/or allowing the expression of an heterologous SSU1 polypeptide can be used to improve a growth property of a recombinant yeast host cell. For example, the heterologous transcription factor favoring the expression of SSU1 and/or the heterologous SSU1 polypeptide can be used to increase the growth rate (e.g., the rate at which the recombinant yeast host cell completes a cell cycle) and/or decrease the lag period (e.g., the time from the start of the culture to the beginning of the logarithmic growth phase) of the recombinant yeast host cell growth in the presence of sulfites. The heterologous transcription factor favoring the expression of SSU1 and/or the heterologous SSU1 polypeptide can be expressed, for example, in a recombinant yeast host cell having genetic modification for reducing the production of one or more native enzymes that function to produce glycerol or regulating glycerol synthesis and/or a genetic modification allowing the production of an heterologous glucoamylase.

Because, the heterologous heterologous transcription factor favoring the expression of SSU1 and/or the heterologous SSU1 polypeptide improve the growth properties of recombinant yeast host cells in the presence of sulfites, they can be used to increase the production of a fermentation product (such as ethanol) during fermentation. In such embodiment, the fermentation medium (also referred to as a substrate) is susceptible to be contaminated by sulfites or already comprises sulfites. The method comprises combining a fermentation medium with the recombinant yeast host cells. In an embodiment, the fermentation is conducted under anaerobic conditions and in yet additional embodiments, in total anaerobic conditions. In an embodiment, the substrate to be hydrolyzed is a lignocellulosic biomass (e.g., a medium comprising lignocellulose) and, in some embodiments, it comprises starch (in a gelatinized or raw form). In other embodiments, the substrate to be hydrolyzed comprises maltodextrin. In some circumstances, it may be advisable to supplement the medium with one or more saccharolytic enzymes in a purified form.

The production of ethanol can be performed at temperatures of at least about 25° C., about 28° C., about 30° C., about 31° C., about 32° C., about 33° C., about 34° C., about 35° C., about 36° C., about 37° C., about 38° C., about 39° C., about 40° C., about 41° C., about 42° C., or about 50° C. In some embodiments, when a thermotolerant yeast cell is used in the process, the process can be conducted at temperatures above about 30° C., about 31° C., about 32° C., about 33° C., about 34° C., about 35° C., about 36° C., about 37° C., about 38° C., about 39° C., about 40° C., about 41° C., about 42° C., or about 50° C.

In some embodiments, the process can be used to produce ethanol at a particular rate. For example, in some embodiments, ethanol is produced at a rate of at least about 0.1 mg per hour per liter, at least about 0.25 mg per hour per liter, at least about 0.5 mg per hour per liter, at least about 0.75 mg per hour per liter, at least about 1.0 mg per hour per liter, at least about 2.0 mg per hour per liter, at least about 5.0 mg per hour per liter, at least about 10 mg per hour per liter, at least about 15 mg per hour per liter, at least about 20.0 mg per hour per liter, at least about 25 mg per hour per liter, at least about 30 mg per hour per liter, at least about 50 mg per hour per liter, at least about 100 mg per hour per liter, at least about 200 mg per hour per liter, or at least about 500 mg per hour per liter.

Ethanol production can be measured using any method known in the art. For example, the quantity of ethanol in fermentation samples can be assessed using HPLC analysis. Many ethanol assay kits are commercially available that use, for example, alcohol oxidase enzyme based assays.

The present invention will be more readily understood by referring to the following examples which are given to illustrate the invention rather than to limit its scope.

Example I—Description of the *Saccharomyces cerevesiae* Strains and Methodology Used

| Desig'nation | Gene inactivated | Gene overexpressed/*S. cerevisiae* promoter used |
|---|---|---|
| M2390 (wild-type) | None | None |
| M10156 | Δgpd2 | gene encoding MP775 (SEQ ID NO: 17) |
| | Δfdh1 | gene encoding MP9 (SEQ ID NO: 13) |
| | Δfdh2 | pfla |
| | Δfcy1 | pflb |
| | | adhe |
| M4080 | Δfcy1 | gene encoding MP9 (SEQ ID NO: 13) |
| M11240 | Δgpd1 | pfla |
| | Δgpd2 | pflb |
| | Δfdh1 | adhe |
| | Δfdh2 | |
| M16063 | Same as M11240 | Same as M11240 and *S. paradoxus* FZF1 (SEQ ID NO: 2) under the control of the TDH1 promoter (tdh1p) |
| M16064 | Same as M11240 | Same as M11240 and *S. paradoxus* SSU1 (SEQ ID NO: 8) under the control of the TDH1 promoter (tdh1p) |
| M16065 | Same as M11240 | Same as M11240 and *S. cerevisiae* FZF1 (SEQ ID NO: 1) under the control of the TDH1 promoter (tdh1p) |
| M16066 | Same as M11240 | Same as M11240 and under the control of the TDH1 promoter (tdh1p) |
| M13565 | Same as M10156 | Same as M10156 and *S. cerevisiae* FZF1 (SEQ ID NO: 1) under the control of the HOR7 promoter (hor7p) |
| T3206 | Same as M10156 | Same as M10156 and *S. paradoxus* FZF1 (SEQ ID NO: 2) under the control of the HOR7 promoter (hor7p) |
| T3207 | Same as M10156 | Same as M10156 and *S. mikatae* FZF1 (SEQ ID NO: 3) under the control of the HOR7 promoter (hor7p) |
| T3208 | Same as M10156 | Same as M10156 and *S. uvarum* FZF1 (SEQ ID NO: 4) under the control of the HOR7 promoter (hor7p) |
| T3209 | Same as M10156 | Same as M10156 and *S. kudriazevi* FZF1 (SEQ ID NO: 5) under the control of the HOR7 promoter (hor7p) |
| T3210 | Same as M10156 | Same as M10156 and *S. castellii* FZF1 (SEQ ID NO: 6) under the control of the HOR7 promoter (hor7p) |
| T3211 | Same as M10156 | Same as M10156 and *S. paradoxus* SSU1 (SEQ ID NO: 8) under the control of the HOR7 promoter (hor7p) |
| T3212 | Same as M10156 | Same as M10156 and *S. mikatae* SSU1 (SEQ ID NO: 9) under the control of the HOR7 promoter (hor7p) |
| T3213 | Same as M10156 | Same as M10156 and *S. uvarum* SSU1 (SEQ ID NO: 10) under the control of the HOR7 promoter (hor7p) |
| T3214 | Same as M10156 | Same as M10156 and *S. kudriazevi* SSU1 (SEQ ID NO: 11) under the control of the HOR7 promoter (hor7p) |
| T3215 | Same as M10156 | Same as M10156 *S. castellii* SSU1 (SEQ ID NO: 12) under the control of the HOR7 promoter (hor7p) |
| M14162 | None | *S. paradoxus* FZF1 (SEQ ID NO: 2) under the control of the PAU5 promoter (PAU5p) |

-continued

| Desig'nation | Gene inactivated | Gene overexpressed/S. cerevisiae promoter used |
|---|---|---|
| M14163 | None | S. paradoxus FZF1 (SEQ ID NO: 2) under the control of the FZF1 promoter (fzfl1p) |
| M14164 | None | S. paradoxus FZF1 (SEQ ID NO: 2) under the control of the SSU1 promoter (ssu1p) |
| M14165 | None | S. paradoxus FZF1 (SEQ ID NO: 2) under the control of the HXT7 promoter (htx7p) |
| M14166 | None | S. paradoxus FZF1 (SEQ ID NO: 2) under the control of the GPD2 promoter (gpd2p) |
| M14167 | None | S. paradoxus FZF1 (SEQ ID NO: 2) under the control of the SSU1-R promoter (as described in Nardi et al.) |
| M14168 | Same as M4080 | Same as M4080 and S. paradoxus FZF1 (SEQ ID NO: 2) under the control of the PAU5 promoter (pau5p) |
| M14169 | Same as M4080 | Same as M4080 and S. paradoxus FZF1 (SEQ ID NO: 2) under the control of the FZF1 promoter (fzf1p) |
| M14170 | Same as M4080 | Same as M4080 and S. paradoxus FZF1 (SEQ ID NO: 2) under the control of the SSU1 promoter (ssu1p) |
| M14171 | Same as M4080 | Same as M4080 and S. paradoxus FZF1 (SEQ ID NO: 2) under the control of the HXT7 promoter (htx7p) |
| M14172 | Same as M4080 | Same as M4080 and S. paradoxus FZF1 (SEQ ID NO: 2) under the control of the GPD2 promoter (gpd2p) |
| M14173 | Same as M4080 | Same as M4080 and S. paradoxus FZF1 (SEQ ID NO: 2) under the control of the SSU1-R promoter (as described in Nardi et al.) |
| M14174 | Same as M10156 | Same as M10156 and S. paradoxus FZF1 (SEQ ID NO: 2) under the control of the PAU5 promoter (pau5p) |
| M14175 | Same as M10156 | Same as M10156 and S. paradoxus FZF1 (SEQ ID NO: 2) under the control of the FZF1 promoter (fzf1p) |
| M14176 | Same as M10156 | Same as M10156 and S. paradoxus FZF1 (SEQ ID NO: 2) under the control of the SSU1 promoter (ssu1p) |
| M14177 | Same as M10156 | Same as M10156 and S. paradoxus FZF1 (SEQ ID NO: 2) under the control of the HXT7 promoter (hxt7p) |
| M14178 | Same as M10156 | Same as M10156 and S. paradoxus FZF1 (SEQ ID NO: 2) under the control of the GPD2 promoter (gpd2p) |
| M14179 | Same as M10156 | Same as M10156 and S. paradoxus FZF1 (SEQ ID NO: 2) under the control of the SSU1-R promoter (as described in Nardi et al.) |

Growth assays were performed using a BioTek plate reader to kinetically monitor OD 600 nm. Cells were cultured overnight in YPD and diluted approximately 1:1000 in fresh media to achieve a starting OD of 0.01. Cells were grown in YPD medium (pH 4.5) supplemented (when necessary) with 50 mM citrate with 250 ppm sodium metabisulfite (SMBS). Growth rate was determined by measuring absorbance at a wavelength of 600 nm. Onset time (lag assay) was measured in a similar fashion until the reading of OD of 0.5 was obtained.

Example II—Increased Sulfite Toxicity

The sensitivity/tolerance of various S. cerevisiae yeast strains was measured in the presence of 250 ppm sulfite. As shown in FIG. 1, the growth of genetically-modified yeast strains (M4080 and M10156) was strongly inhibited in the presence of sulfite, when compared to their wild-type counterpart (M2390).

Example III—Growth Assays

Figure 2:
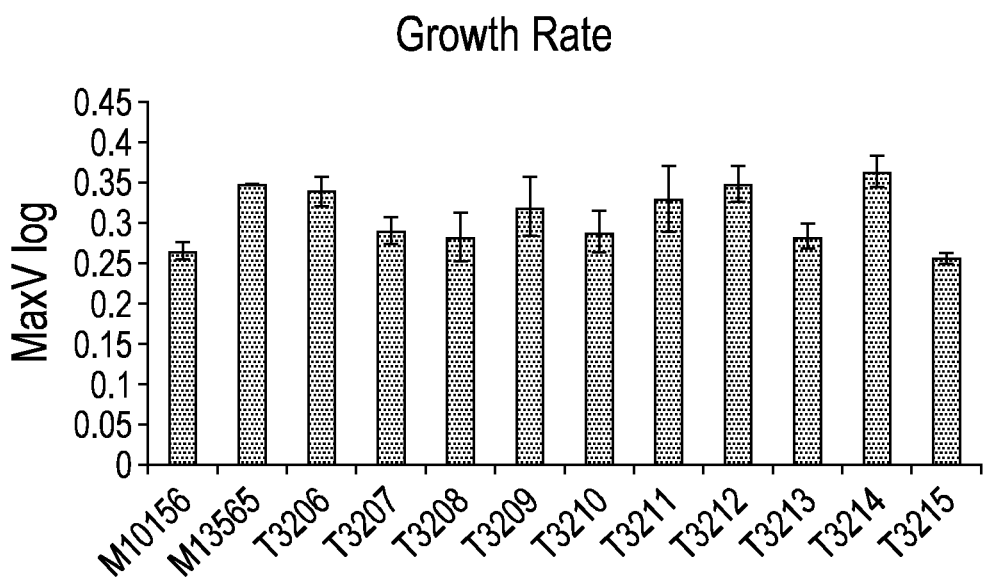
FIG. 2 compares the growth rates of several yeast strains genetically engineered to overexpress different FZF1 and SSU1 polypeptides. Results are provided as the (MaxV log) in function of the different strains/isolates tested (from left to right M10156, M13565, T3206, T3207, T3208, T3209, T3210, T3211, T3212, T3213, T3214 and T3215). The different strains/isolates are described in Table 1.
Figure 3:
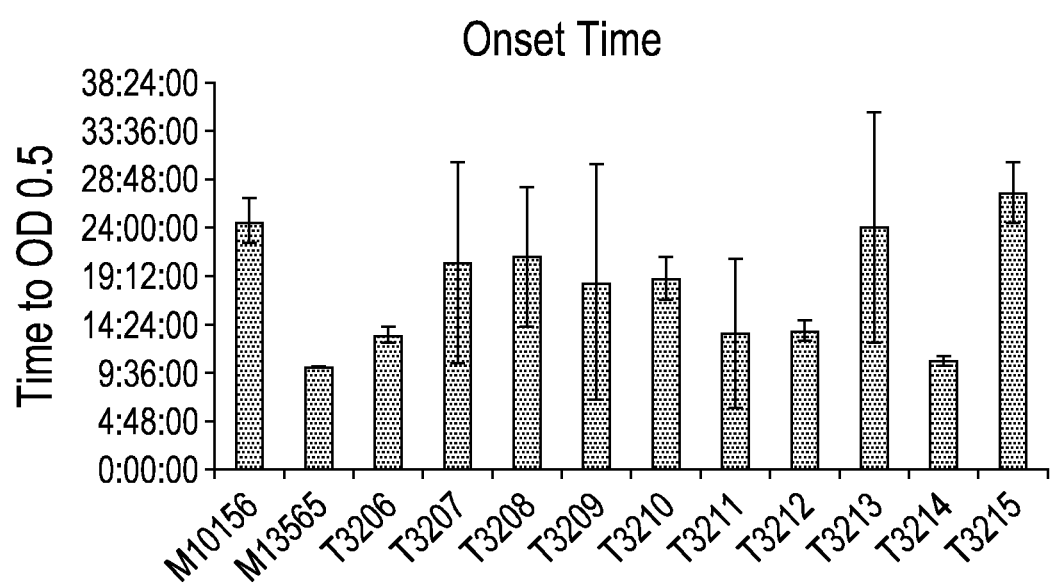
FIG. 3 compares the lag time (onset time) expressed as the amount of time it takes for a strain to reach an OD of 0.5 in the assay. Results are provided as time (hh:mm:ss) in function of the different strains/isolates tested (from left to right M10156, M13565, T3206, T3207, T3208, T3209, T3210, T3211, T3212, T3213, T3214 and T3215). The different strains/isolates are described in Table 1.
Figure 4A:
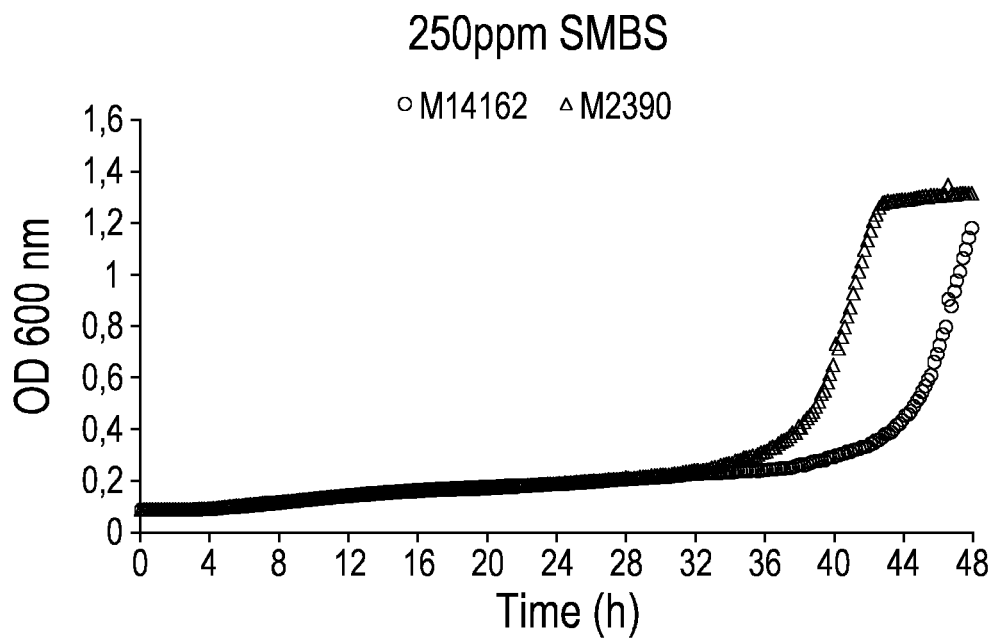
FIGS. 4A to 4F compare the growth profiles of the (A) M14162, (B) M14163, (C) M14164, (D) M14165, (E) M14166 and (F) M14167 strains (all identified as ○) with reference strain M2390 (identified as Δ). Results are provided as the optical density (measured at 600 nm (OD600 nm)) in function of time (hours). The different strains are described in Table 1.
Figure 4B:
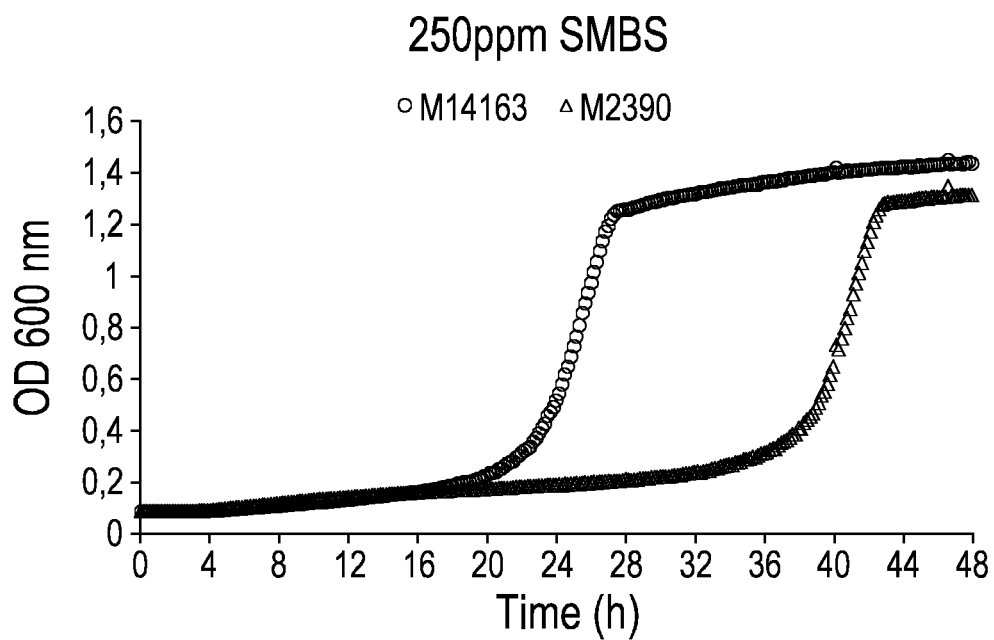
Figure 4C:
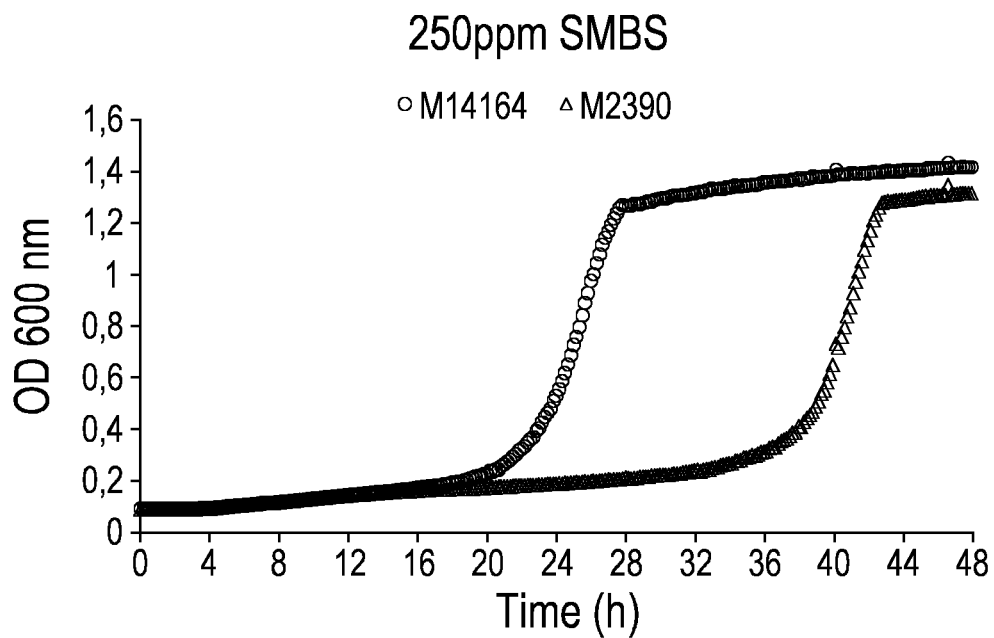
Figure 4D:
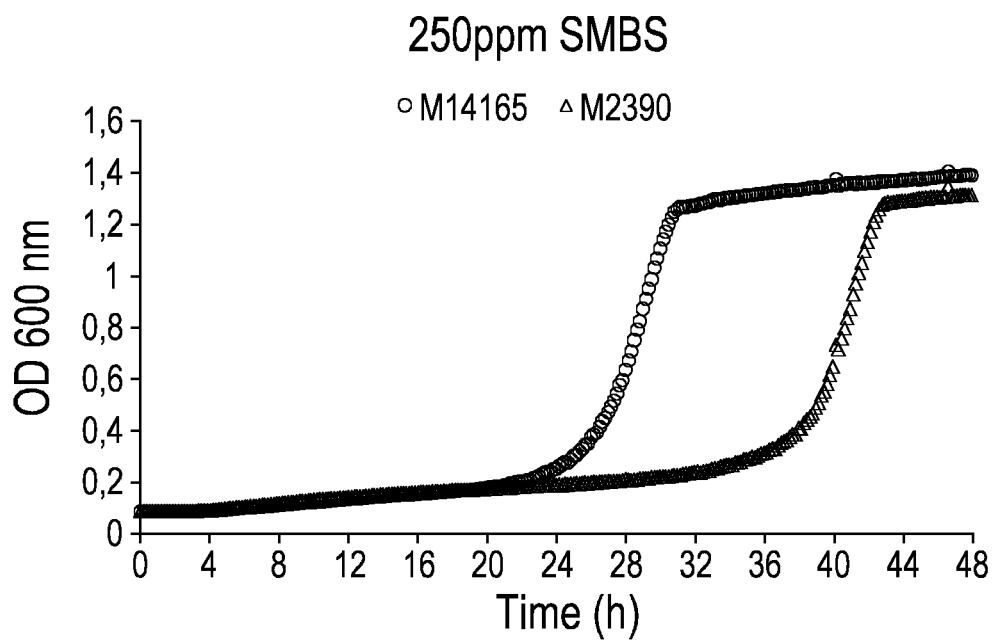
Figure 4E:
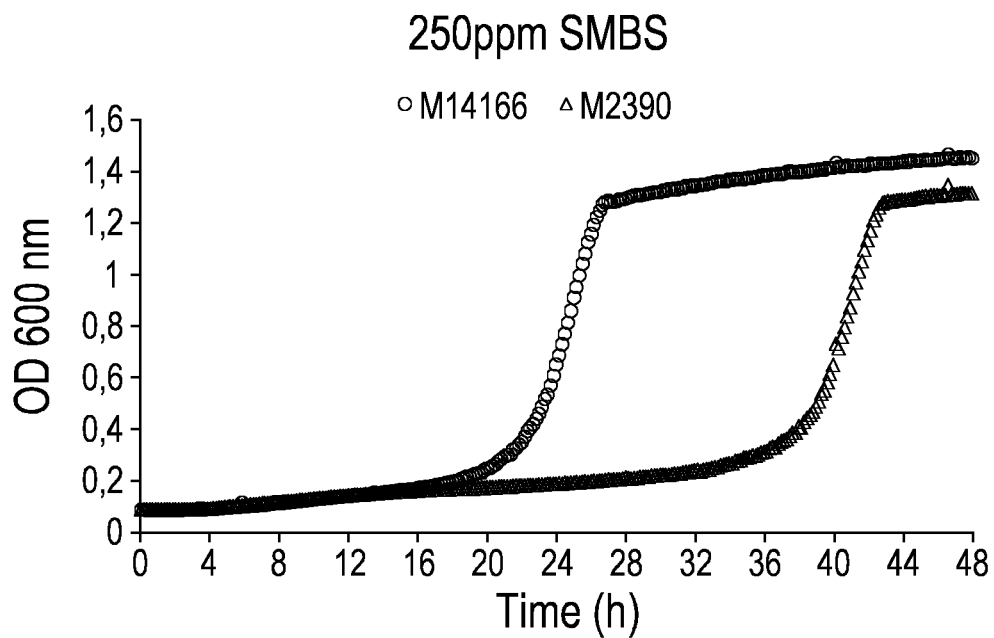
Figure 4F:
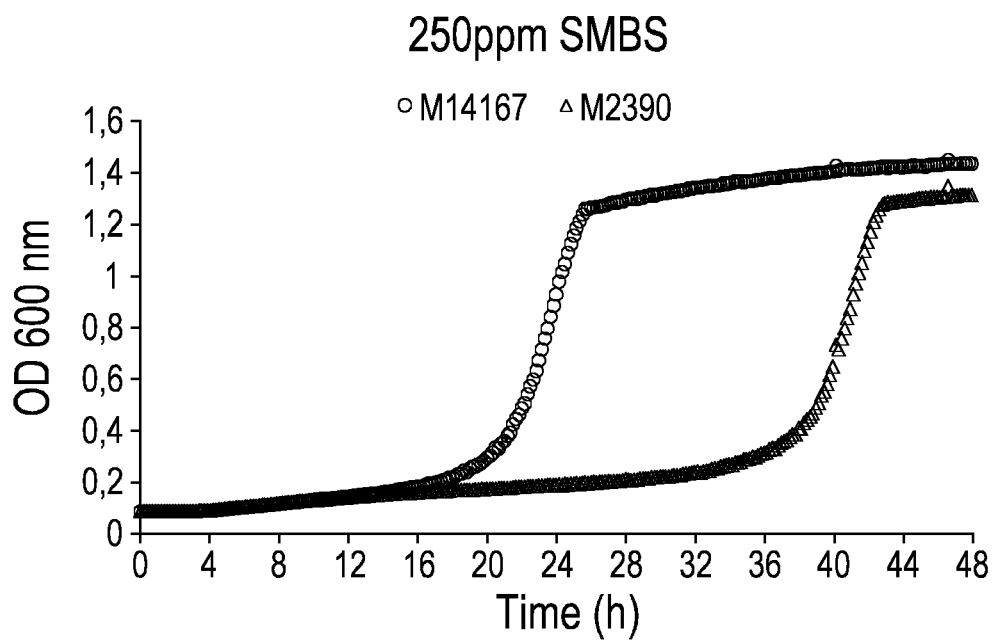
Figure 5A:
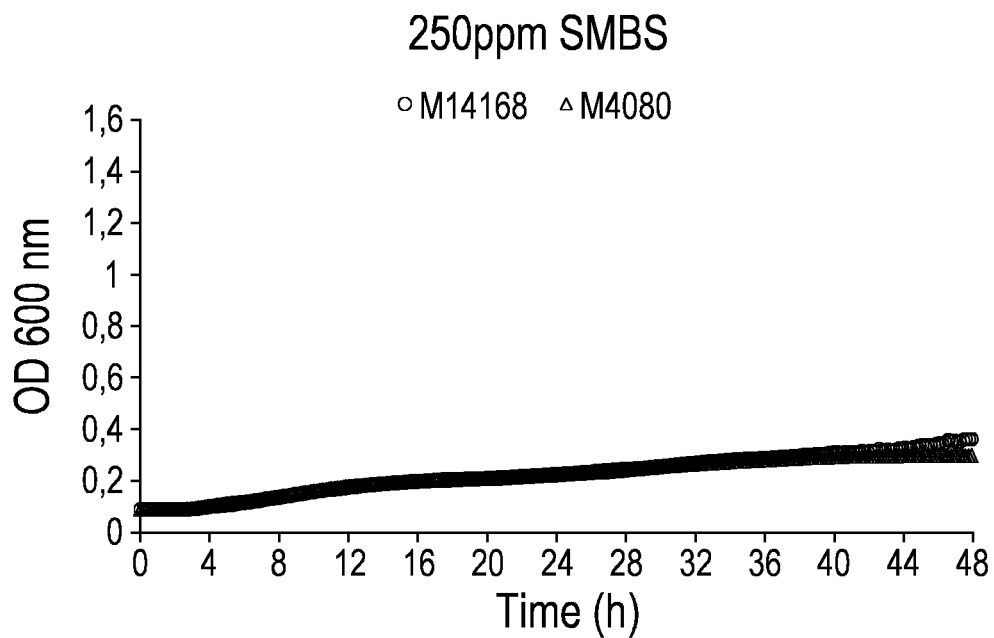
FIGS. 5A to 5F compare the growth profiles of the (A) M14168, (B) M14169, (C) M14170, (D) M14171, (E) M14172 and (F) M14173 (all identified as ○) with the reference strain M4080 (identified as Δ). Results are provided as the optical density (measured at 600 nm (OD 600 nm)) in function of time (hours). The different strains are described in Table 1.
Figure 5B:
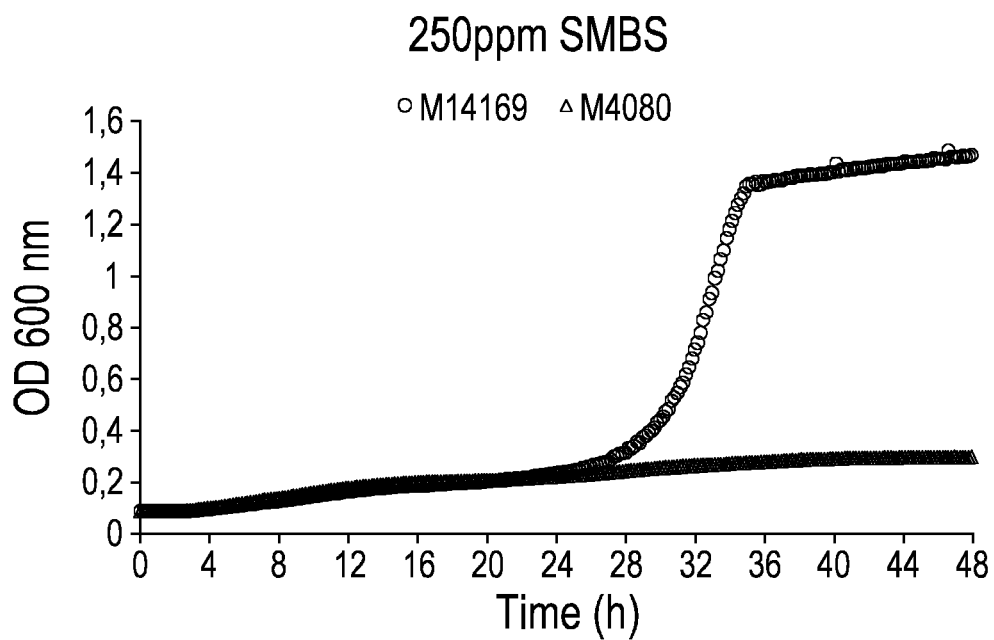
Figure 5C:
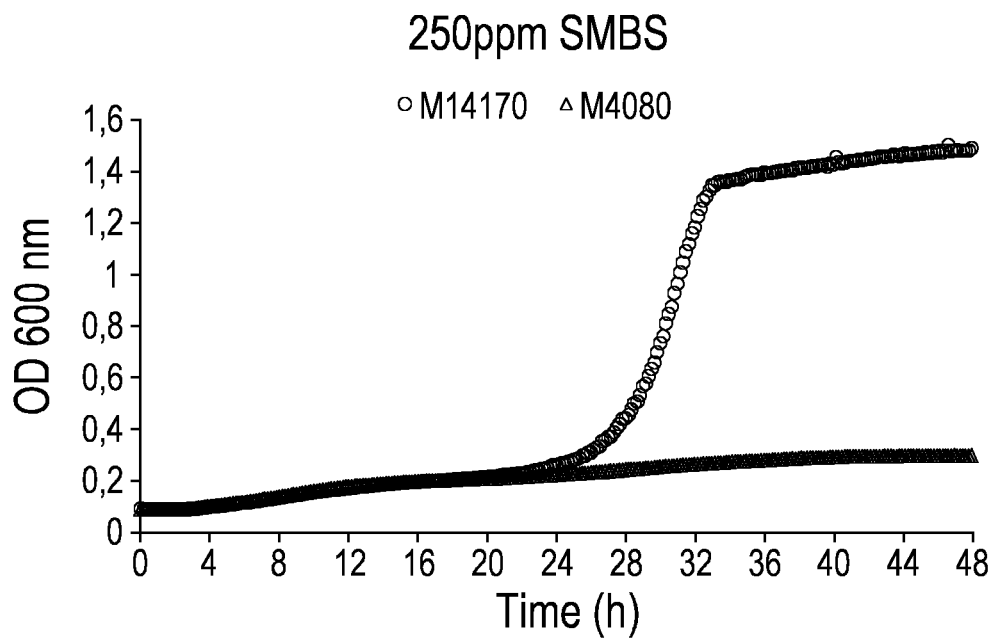
Figure 5D:
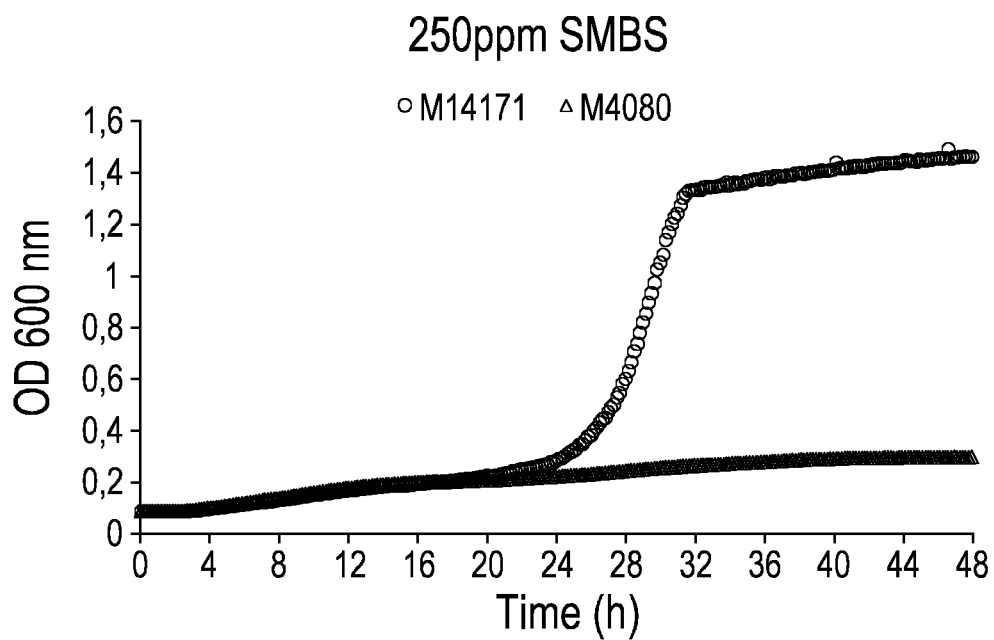
Figure 5E:
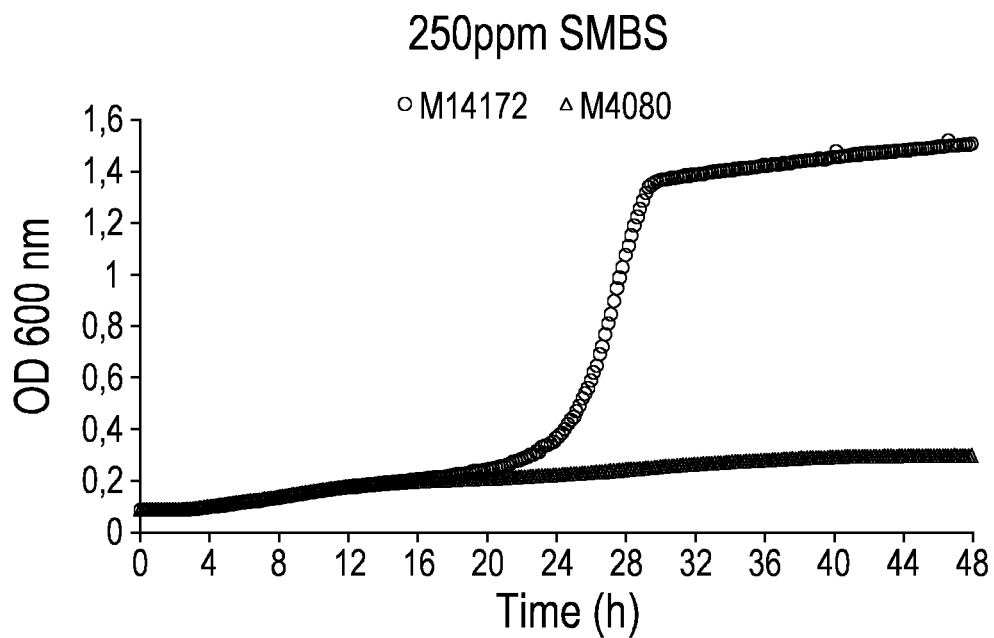
Figure 5F:
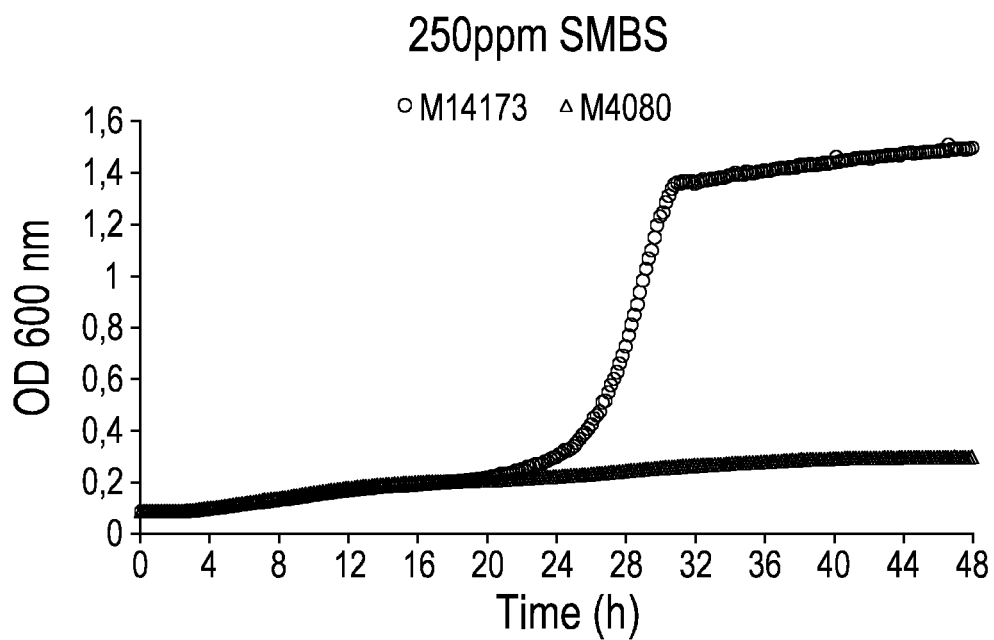
Figure 6A:
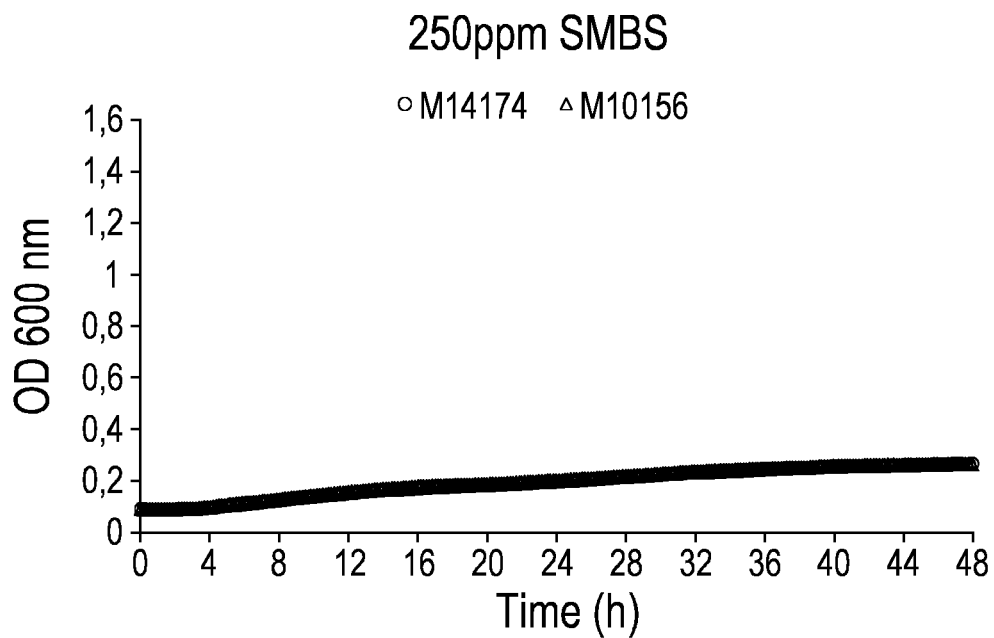
FIGS. 6A to 6F compare the growth profiles of the (A) M14174, (B) M14175, (C) M14176, (D) M14177, (E) M14178 and (F) M14179 (all identified as ○) with the reference strain M10156 (identified as Δ). Results are provided as the optical density (measured at 600 nm (OD 600 nm)) in function of time (hours). The different strains are described in Table 1.
Figure 6B:
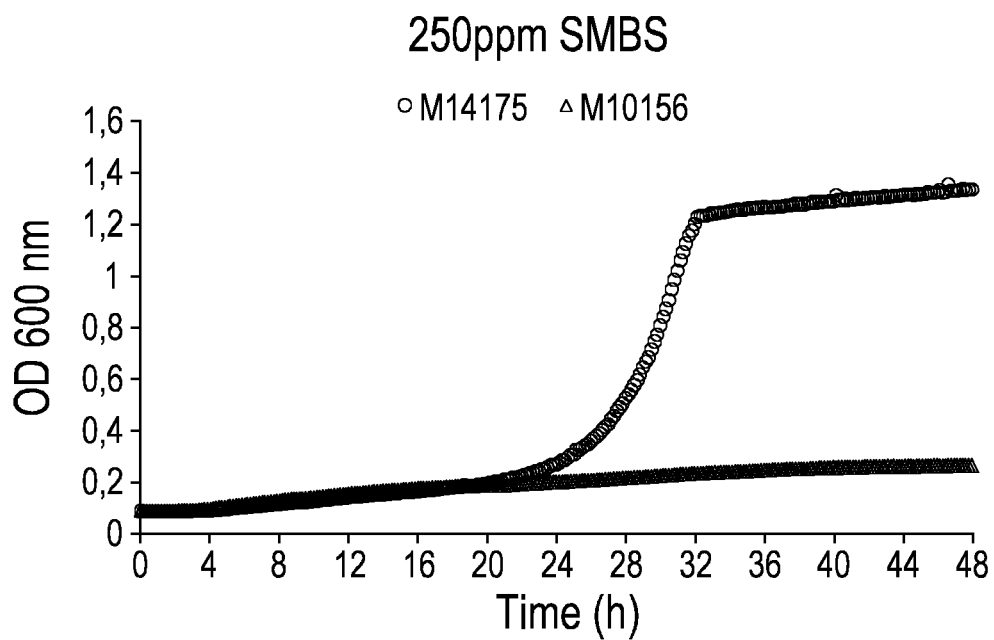
Figure 6C:
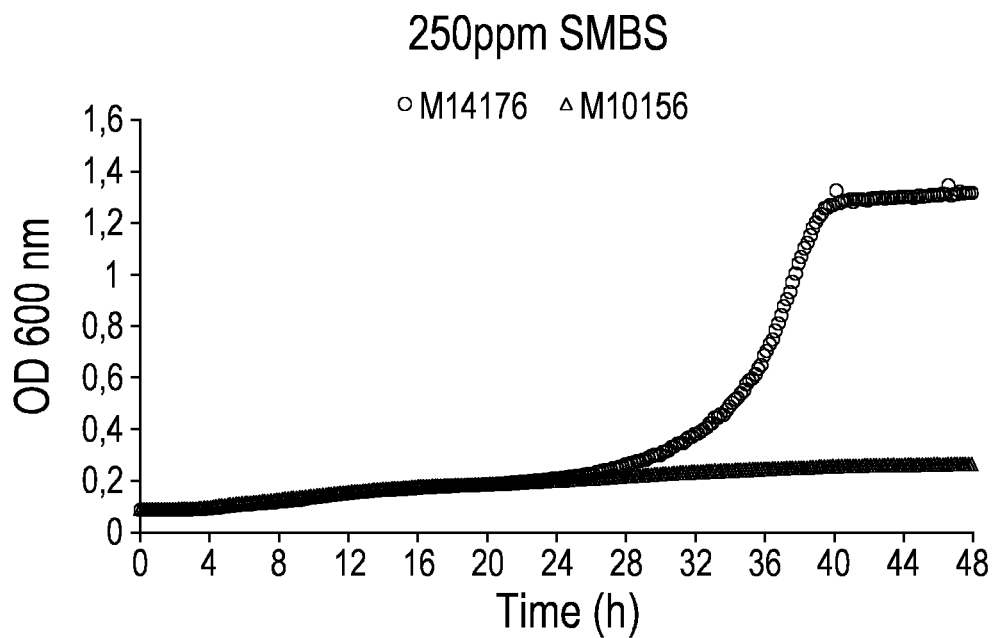
Figure 6D:
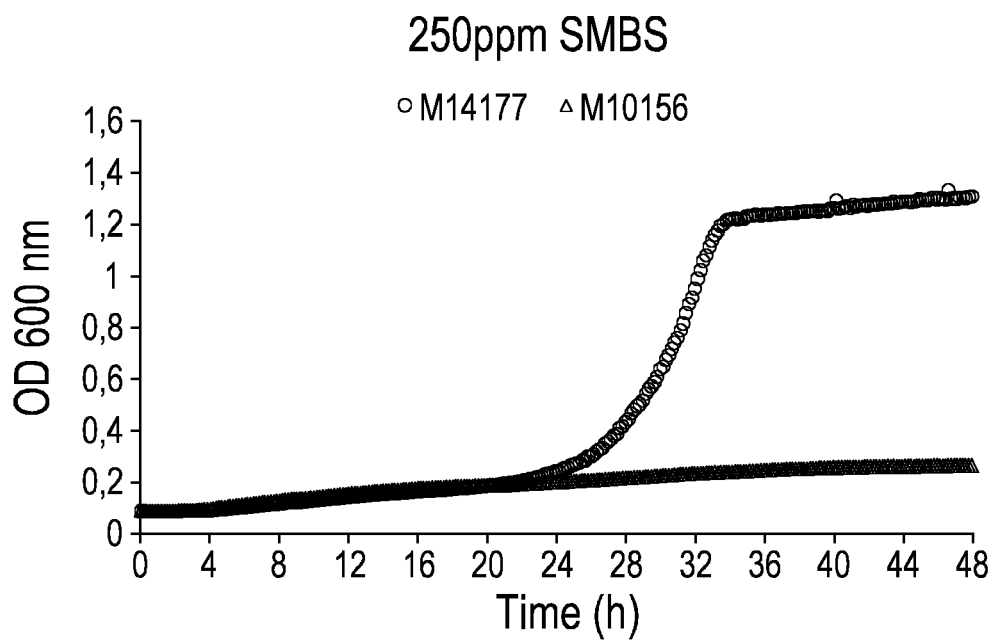
Figure 6E:
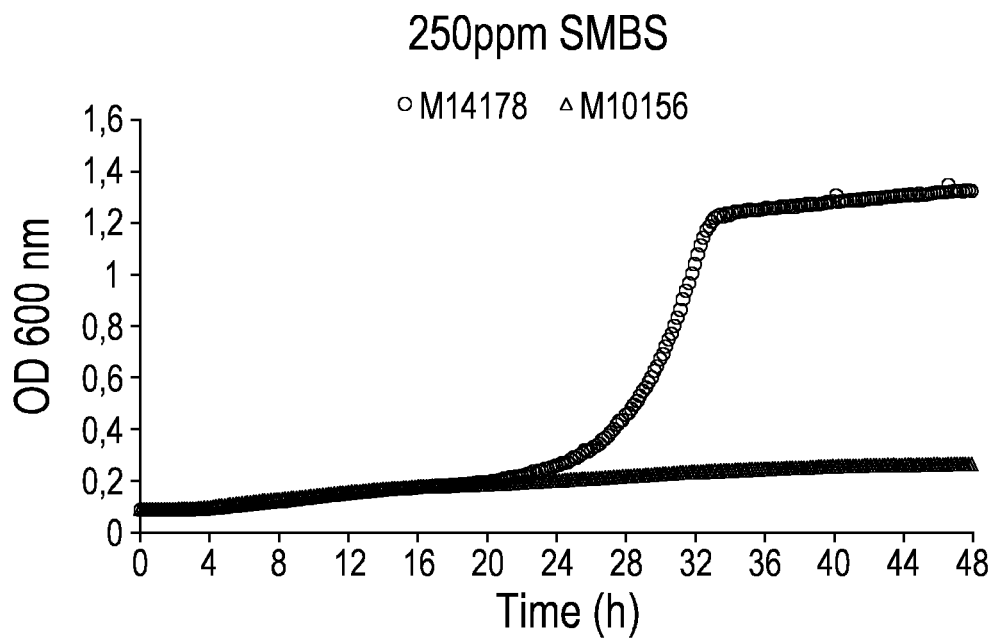
Figure 6F:
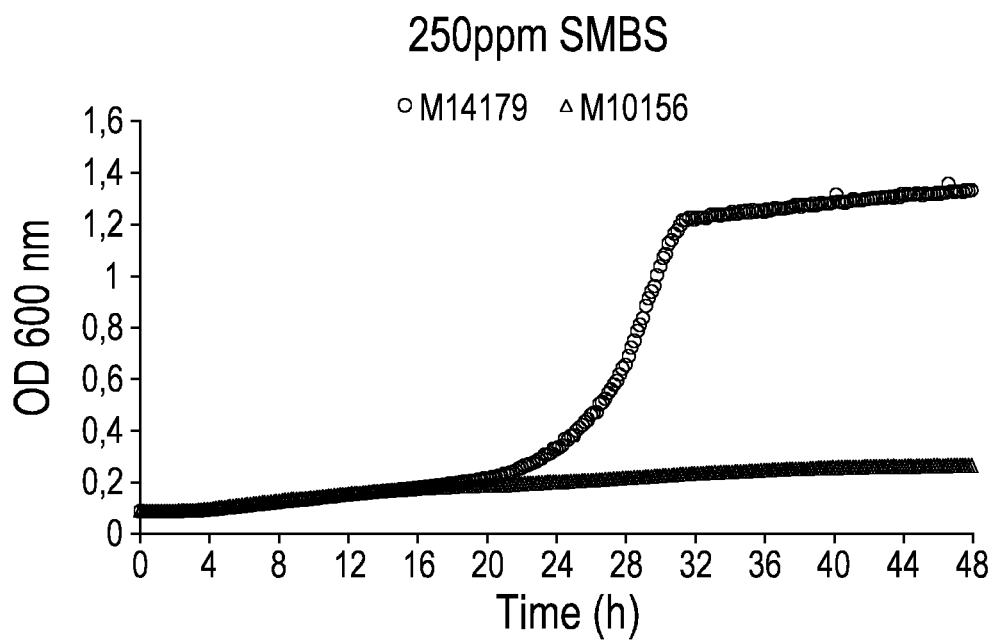

In order to improve sulfite tolerance, expression cassettes for various *Saccharomyces* SSU1 or FZF1 genes were fused to the *Saccharomyces cerevisiae* HOR7 promoter and expressed in *S. cerevisiae* (see Table 1 for a description of the strains). These strains were grown in a defined medium containing sulfites (see Example I for conditions). The growth rate and lag time were measured for each strain tested. As shown in FIGS. 2 and 3, the overexpression of FZF1 or SSU1 derived from *Saccharomyces* gene donor species improved the growth rate and shortened the lag time of the M10156-derived strains grown in the presence of sulfites.

As shown in FIGS. 2 and 3, the *S. paradoxus* fzf1 gene was identified as improving sulfite tolerance to the host yeast strains when constitutively expressed (under the expression of the HOR7 promoter (hor7p)). In order to further optimize expression and therefore improve sulfite tolerance, the *S. paradoxus* fzf1 gene was fused to a number of native *S. cerevisiae* promoters. As shown in FIGS. 4 to 6, the gpd2p and ssu1-rp promoters provided, under the conditions tested, the best improvement in sulfite tolerance when compared to the parent strain.

Example IV—FZF1 and SSU1 Overexpression in Glycerol Reduction Background

Figure 8A:
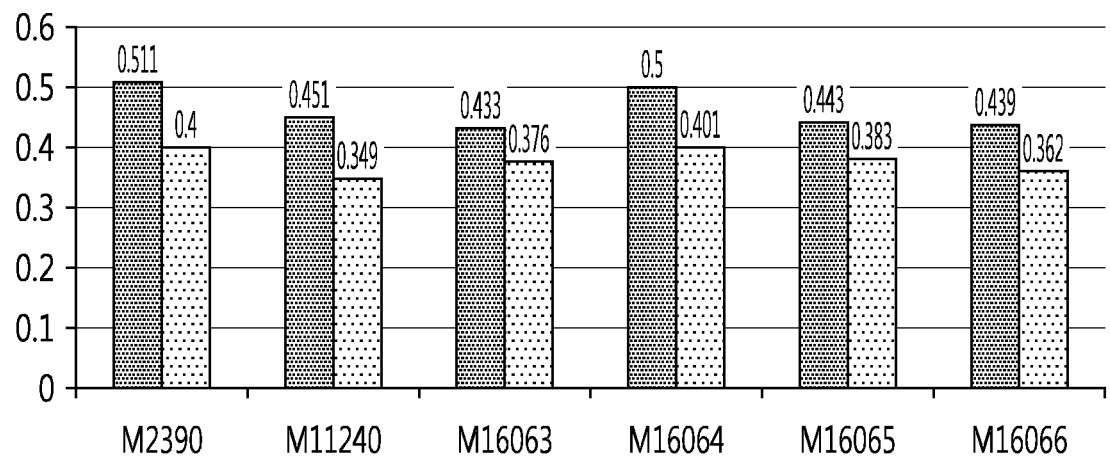
Figure 8B:
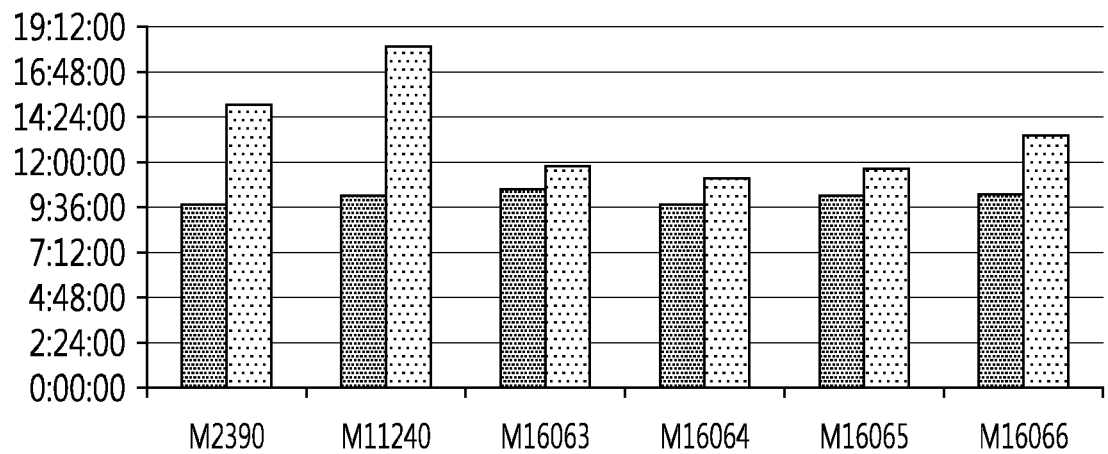
Figure 8C:
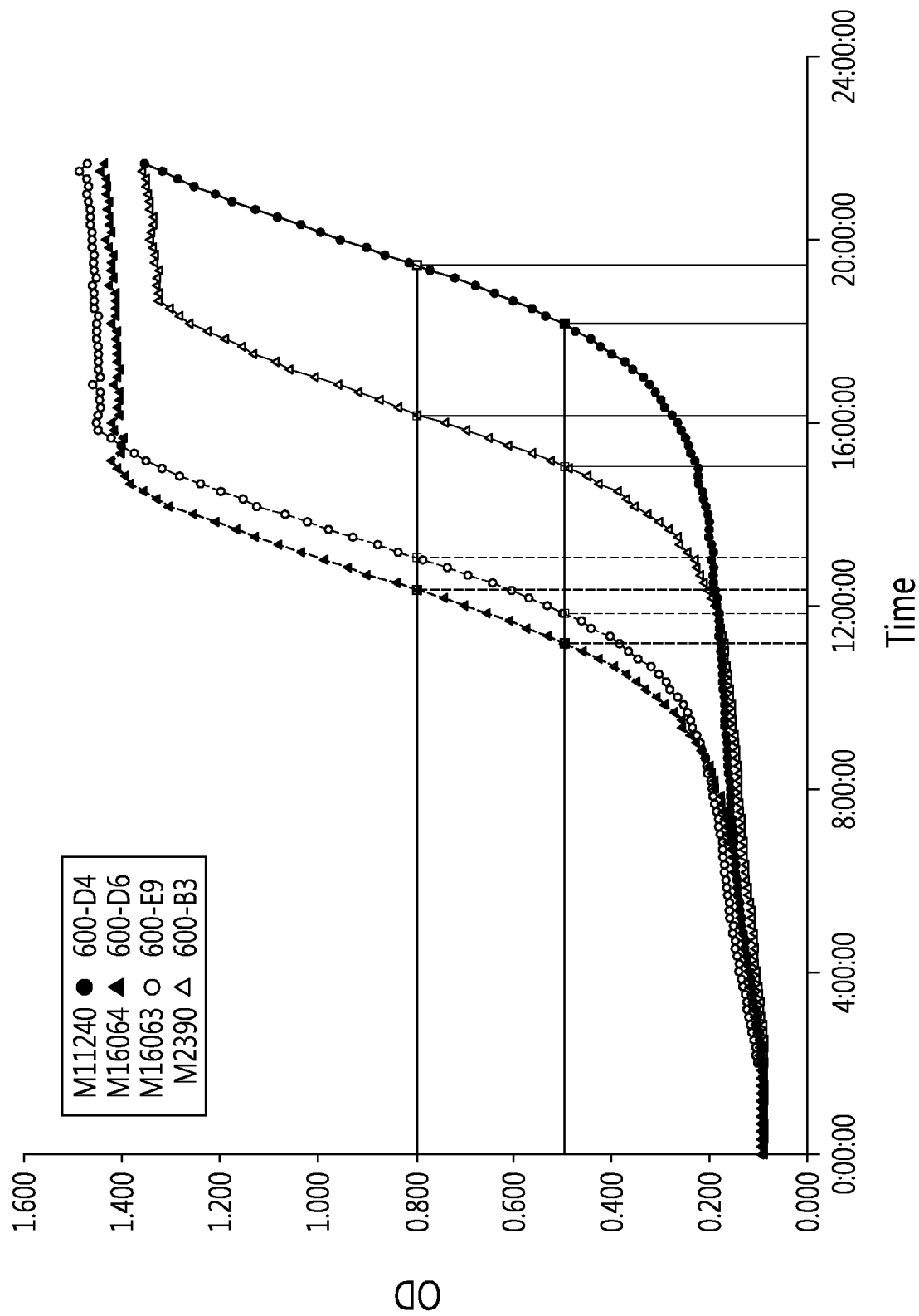

Two copies of overexpression cassettes of the FZF1 or SSU1 genes from *S. paradoxus* or *S. cerevisiae* were transformed into the M11240 strain as described in table 1. Eight single colonies together with wild-type control M2390 and parent strain M11240 were subjected to plate reader studies in YPD or YPD containing 250 ppm sodium metabisulfite (SMBS) at pH 4.5. Growth rates (MaxV log) and lag times (onset time OD 0.5) were calculated for each isolate and data below represents the best performer (each referred to as in M16063, M16064, M16065 and M16066 as indicated in table 1). Both the *S. paradoxus* and *S. cerevisiae* FZF1 and SSU1 genes improved growth rates (FIG. 8A) and lag times (FIG. 8B) over M11240 in the presence of YPD containing 250 ppm SMBS. The growth profiles of these isolates is also shown in FIGS. 8C and 8D.

While the invention has been described in connection with specific embodiments thereof, it will be understood that the scope of the claims should not be limited by the preferred embodiments set forth in the examples, but should be given the broadest interpretation consistent with the description as a whole.

REFERENCES

U.S. Pat. No. 8,956,851
WO/2015/023989
WO/2017/037614
WO 2012/138942
WO 2011/153516
Tiziana Nardi, Viviana Corich, Alessio Giacomini and Bruno Blondin, A sulphite-inducible form of the sulphite efflux gene SSU1 in a *Saccharomyces cerevisiae* wine yeast, Microbiology (2010), 156, 1686-1696.

---

What is claimed is:

1. A recombinant yeast host cell comprising:
   (i) at least one first genetic modification selected from the group consisting of:
      a heterologous nucleic acid molecule encoding a heterologous STL1 polypeptide, and
      a heterologous nucleic acid molecule encoding a heterologous glucoamylase, wherein the heterologous glucoamylase comprises:
         (i) the amino acid sequence of any one of SEQ ID NO: 13, 14, 15, 16, 17, 18, and 19,
         (ii) a variant having at least 70% identity with the amino acid sequence of any one of SEQ ID NO: 13, 14, 15, 16, 17, 18, and 19, or
         (iii) a fragment of (i) or (ii) having at least 70% identity with the amino acid sequence of any one of SEQ ID NO: 13, 14, 15, 16, 17, 18, and 19,
      wherein the variant or the fragment has glucoamylase activity; and
   (ii) at least one second genetic modification selected from the group consisting of:
      a heterologous nucleic acid molecule encoding a heterologous transcription factor FZF1 polypeptide, wherein the heterologous transcription factor FZF1 polypeptide comprises:
         (i) the amino acid sequence of any one of SEQ ID NO: 1 to 6, 21 and 22, (ii) a variant having at least 70% identity with the amino acid sequence of any one of SEQ ID NO: 1 to 6, 21 and 22, or
(iii) a fragment of (i) or (ii) having at least 70% identity with the amino acid sequence of any one of SEQ ID NO: 1 to 6, 21 and 22,
wherein the variant or the fragment of the heterologous transcription factor FZF1 polypeptide favors the expression of a native SSU1 polypeptide, the heterologous SSU1 polypeptide, or both the native SSU1 polypeptide and the heterologous SSU1 polypeptide; and
a heterologous nucleic acid molecule encoding a heterologous SSU1 polypeptide, wherein the heterologous SSU1 polypeptide comprises:
(i) the amino acid sequence of any one of SEQ ID NO: 7 to 12, 23, 24, and 25,
(ii) a variant having at least 70% identity with the amino acid sequence of any one of SEQ ID NO: 7 to 12, 23, 24, and 25, or
(iii) a fragment of (i) or (ii) having at least 70% identity with the amino acid sequence of any one of SEQ ID NO: 7 to 12, 23, and 24,
wherein the variant or the fragment has sulfite efflux activity.

2. The recombinant yeast host cell of claim 1 having the heterologous nucleic acid molecule encoding the heterologous transcription factor FZF1 polypeptide.

3. The recombinant yeast host cell of claim 2, wherein the heterologous transcription factor FZF1 polypeptide is expressed under the control of a constitutive, a glucose-regulated or a sulfite-regulated promoter.

4. The recombinant yeast host cell of claim 3, wherein the promoter is (i) the glucose-regulated promoter, wherein the glucose-regulated promoter is the promoter of a hxt7 gene (hxt7p) or (ii) the sulfite-regulated promoter, wherein the sulfite-regulated promoter is the promoter of a gpd2 gene (gpd2p), the promoter of a fzf1 gene (fzf1p), the promoter of a ssu1 gene (ssu1p) or the promoter of a ssu1-r gene (ssur1-rp).

5. The recombinant yeast host cell of claim 2, wherein the heterologous transcription factor FZF1 polypeptide is from a species of genus *Saccharomyces*.

6. The recombinant yeast host cell of claim 1 having the heterologous nucleic acid molecule encoding the heterologous SSU1 polypeptide.

7. The recombinant yeast host cell of claim 6, wherein the heterologous SSU1 polypeptide is (i) a polypeptide encoded by a ssu1 gene ortholog, and/or (ii) expressed under control of a constitutive, a glucose-regulated or a sulfite-regulated promoter.

8. The recombinant yeast host cell of claim 6, wherein the heterologous SSU1 polypeptide is from a species of genus *Saccharomyces*.

9. The recombinant yeast host cell of claim 1, having the heterologous nucleic acid molecule encoding the heterologous STL1 polypeptide.

10. The recombinant yeast host cell of claim 1 having the heterologous nucleic acid molecule encoding the heterologous glucoamylase.

11. The recombinant yeast host cell of claim 1, further comprising a third genetic modification for reducing the production of the one or more native enzymes that function to catabolize formate.

12. The recombinant yeast host cell of claim 1 being from a species of genus *Saccharomyces*.

13. The recombinant yeast host cell of claim 12 being from the species *Saccharomyces cerevisiae*.

14. A method of improving a growth property of a recombinant yeast host cell, said method comprising:
(i) providing a first recombinant yeast host cell having the first genetic modification defined in claim 1; and
(ii) introducing the second genetic modification defined in claim 1 in the first recombinant yeast host cell to provide a second recombinant yeast host cell,
wherein the growth property of the second recombinant yeast host cell is improved with respect to the growth property of the first recombinant yeast host cell.

* * * * *

SEQUENCE LISTING

<160> NUMBER OF SEQ ID NOS: 25

<210> SEQ ID NO 1
<211> LENGTH: 299
<212> TYPE: PRT
<213> ORGANISM: Saccharomyces cerevisiae

<400> SEQUENCE: 1

```
Met Thr Asp Ile Gly Arg Thr Lys Ser Arg Asn Tyr Lys Cys Ser Phe
1               5                   10                  15

Asp Gly Cys Glu Lys Val Tyr Asn Arg Pro Ser Leu Leu Gln Gln His
            20                  25                  30

Gln Asn Ser His Thr Asn Gln Lys Pro Tyr His Cys Asp Glu Pro Gly
        35                  40                  45

Cys Gly Lys Lys Phe Ile Arg Pro Cys His Leu Arg Val His Lys Trp
    50                  55                  60

Thr His Ser Gln Ile Lys Pro Lys Ala Cys Thr Leu Cys Gln Lys Arg
65                  70                  75                  80

Phe Val Thr Asn Gln Gln Leu Arg Arg His Leu Asn Ser His Glu Arg
                85                  90                  95

Lys Ser Lys Leu Ala Ser Arg Ile Asp Arg Lys His Glu Gly Val Asn
            100                 105                 110

Ala Asn Val Lys Ala Glu Leu Asn Gly Lys Glu Gly Gly Phe Asp Pro
        115                 120                 125

Lys Leu Pro Ser Gly Ser Pro Met Cys Gly Glu Glu Phe Ser Gln Gly
    130                 135                 140

His Leu Pro Gly Tyr Asp Asp Met Gln Val Leu Gln Cys Pro Tyr Lys
145                 150                 155                 160
```

```
Ser Cys Gln Lys Val Thr Ser Phe Asn Asp Asp Leu Ile Asn His Met
            165                 170                 175

Leu Gln His His Ile Ala Ser Lys Leu Val Val Pro Ser Gly Asp Pro
        180                 185                 190

Ser Leu Lys Glu Ser Leu Pro Thr Ser Glu Lys Ser Ser Ser Thr Asp
        195                 200                 205

Thr Thr Ser Ile Pro Gln Leu Ser Phe Ser Thr Thr Gly Thr Ser Ser
    210                 215                 220

Ser Glu Ser Val Asp Ser Thr Thr Ala Gln Thr Pro Thr Asp Pro Glu
225                 230                 235                 240

Ser Tyr Trp Ser Asp Asn Arg Cys Lys His Ser Asp Cys Gln Glu Leu
                245                 250                 255

Ser Pro Phe Ala Ser Val Phe Asp Leu Ile Asp His Tyr Asp His Thr
            260                 265                 270

His Ala Phe Ile Pro Glu Thr Leu Val Lys Tyr Ser Tyr Ile His Leu
        275                 280                 285

Tyr Lys Pro Ser Val Trp Asp Leu Phe Glu Tyr
    290                 295

<210> SEQ ID NO 2
<211> LENGTH: 311
<212> TYPE: PRT
<213> ORGANISM: Saccharomyces paradoxus

<400> SEQUENCE: 2

Met Val Ala Ala Arg Val Asp Phe Gly Ile Gly Gly Met Thr Asn Thr
1               5                   10                  15

Gly Lys Pro Lys Ser Arg Cys Tyr Lys Cys Pro Phe Asn Gly Cys Glu
            20                  25                  30

Lys Glu Tyr Asn Arg Pro Ser Leu Leu Gln Arg His Leu Asn Ser His
        35                  40                  45

Thr Asn Gln Arg Pro Tyr Pro Cys Asp Glu Pro Gly Cys Gly Lys Lys
    50                  55                  60

Phe Ile Arg Pro Cys His Leu Arg Val His Lys Trp Thr His Ser Gln
65                  70                  75                  80

Ile Lys Pro Lys Pro Cys Thr Leu Cys Lys Lys Arg Phe Val Thr Asn
                85                  90                  95

Gln Gln Leu Lys Arg His Leu Asn Ser His Lys Arg Lys Asn Arg Val
            100                 105                 110

Ala Ser Lys Asn Asn Tyr Lys His Glu Gly Pro Cys Ser Asn Ile Lys
        115                 120                 125

Ala Glu Leu Ser Gly Val Asp Gly Gly Leu Asp Pro Ala Leu Thr Ser
    130                 135                 140

Gly Ser Val Met Tyr Asp Glu Glu Ser Leu Gln Gly His Leu Pro Gly
145                 150                 155                 160

Ser Asp Asp Met Arg Val Leu Gln Cys Pro Tyr Lys Ser Cys Gln Lys
                165                 170                 175

Val Thr Ser Phe Asn Asp Asp Leu Ile Asn His Met Leu Gln His His
            180                 185                 190

Ile Ala Ser Lys Leu Val Val Pro Ser Glu Glu Ser Arg Leu Lys Lys
        195                 200                 205

Ser Thr Pro Thr Ser Val Glu Ser Ser Thr Asp Ile Thr Ser Ile
    210                 215                 220

Pro Gln Leu Ser Leu Ser Thr Thr Gly Thr Ser Ser Asp Ser Ser
225                 230                 235                 240
```

```
Asn Glu Thr Met Ala Arg Ser Pro Asn Asp Pro Glu Asn Tyr Trp Ser
            245                 250                 255

Asp Asn Arg Cys Lys Gln Thr Glu Cys Gln Glu Leu Ser Pro Phe Ala
        260                 265                 270

Ser Val Phe Asp Leu Ile Glu His Tyr Asp Arg Thr His Ala Phe Ile
        275                 280                 285

Pro Glu Thr Leu Val Lys Tyr Ser Tyr Ile Phe Leu Tyr Lys Pro Ser
        290                 295                 300

Val Arg Gly Leu Phe Glu Tyr
305                 310
```

<210> SEQ ID NO 3
<211> LENGTH: 310
<212> TYPE: PRT
<213> ORGANISM: Saccharomyces mikatea

<400> SEQUENCE: 3

```
Met Ala Ala Arg Thr Asp Ser Gly Val Gly Thr Met Thr Asn Arg Glu
1               5                   10                  15

Arg Ser Lys Ser Arg Lys Tyr Lys Cys Pro Phe Asp Ser Cys Glu Lys
            20                  25                  30

Glu Tyr Asn Arg Pro Ser Leu Leu Gln Gln His Gln Asn Ser His Thr
        35                  40                  45

Asn Arg Lys Pro Tyr His Cys Asp Glu Pro Gly Cys Gly Lys Lys Phe
    50                  55                  60

Ile Arg Pro Cys His Leu Arg Val His Lys Trp Thr His Ser Gln Ile
65                  70                  75                  80

Lys Pro Lys Pro Cys Pro Leu Cys Glu Lys Arg Phe Val Thr Asn Gln
                85                  90                  95

Gln Leu Arg Arg His Leu Ser Ser His Glu Arg Lys Ser Lys Leu Ala
            100                 105                 110

Ser Ile Asn His Arg Arg His Glu Glu Pro Asp Pro Asn Thr Lys Ala
        115                 120                 125

Glu Leu Asn Asp Gly Glu Gly Ser Ile Asp Ser Ile Leu Ser Ser Gly
    130                 135                 140

Ser Leu Ile His Gly Glu Glu Ser Ser Gln Gly His Leu Pro Gly Ser
145                 150                 155                 160

Asp Asp Met Pro Val Leu Gln Cys Pro Tyr Arg Ser Cys Gln Lys Ala
                165                 170                 175

Thr Ser Phe Asn Asp Asp Leu Ile Asn His Met Leu Gln Tyr His Ile
            180                 185                 190

Ser Ser Met Leu Val Val Pro Ser Glu Gly Pro His Leu Lys Lys Cys
        195                 200                 205

Thr Pro Asn Ser Ala Arg Ser Ser Asn Thr Asp Phe Thr Pro Ile Pro
    210                 215                 220

Leu Leu Ser Pro Ser Thr Thr Ala Thr Thr Ser Ser Asp Ser Ser Lys
225                 230                 235                 240

Ser Ile Thr Met Gln Ser Pro Asp Asp Pro Glu Thr Tyr Trp Ser Asp
                245                 250                 255

Asn Gln Cys Lys His Ile Asp Cys Gln Glu Leu Ile Pro Phe Pro Ser
            260                 265                 270

Val Phe Asp Leu Ile Glu His Tyr Asp His Ile His Ala Phe Ile Pro
        275                 280                 285

Glu Thr Leu Val Lys Tyr Ser Tyr Ile His Leu Tyr Glu Pro Ser Val
```

```
                    290                 295                 300

Trp Gly Leu Phe Glu Tyr
305                 310

<210> SEQ ID NO 4
<211> LENGTH: 297
<212> TYPE: PRT
<213> ORGANISM: Saccharomyces uvarum

<400> SEQUENCE: 4

Met Ala Asn Lys Lys Leu His Ser Arg Arg Tyr Lys Cys Ser Phe
1               5                   10                  15

Glu Gly Cys Gly Lys Asp Tyr Asn Arg Pro Ser Leu Leu Glu Gln His
                20                  25                  30

Glu Asn Ser His Phe Asn Gln Lys Pro Tyr Leu Cys Asp Glu Pro Gly
            35                  40                  45

Cys Gly Lys Lys Phe Ile Arg Pro Cys His Leu Arg Val His Lys Trp
        50                  55                  60

Thr His Ser Gln Ile Lys Pro Lys Pro Cys Thr Leu Cys Glu Lys Arg
65                  70                  75                  80

Phe Val Thr Asn Gln Gln Leu Asn Arg His Leu Ser Ser His Glu Arg
                85                  90                  95

Lys Asp Lys Leu Lys Ser Lys Ile Ile Thr Lys Asn Glu Glu Pro Gly
            100                 105                 110

Pro Asn Ile Lys Ser Asp Tyr Gly Gly Asn Glu Leu Asn Leu Gly Thr
        115                 120                 125

Thr Leu Pro Asp Gln Leu Leu Pro Leu Asp Asp Asn Leu Pro Gln Asp
130                 135                 140

Tyr Leu Leu Arg Ala Asp Asp Met Asn Ala Val Arg Cys Pro Tyr Val
145                 150                 155                 160

Leu Cys Gln Val Leu Thr Thr Phe Asp Asp Leu Ile Asn His Met
                165                 170                 175

Leu Gln His His Ile Ala Ser Lys Leu Thr Leu Pro Pro Glu Glu Leu
            180                 185                 190

His Leu Asn Asn Gln Ala Pro Val Ser Pro Cys Ser Ser Ser Thr Asp
        195                 200                 205

Asp Ala Ser Ile Pro Gln Leu Ser Ala Ala Ser Ser Asp Ser Ser
210                 215                 220

Tyr Ser Thr Gly Thr Ile Val Glu Ser Leu Asp Asp Pro Glu Ser Tyr
225                 230                 235                 240

Trp Ser Asp His Arg Cys Lys His Ile His Cys Gln Glu Leu Asp Arg
                245                 250                 255

Phe Ala Ser Val Phe Asp Leu Ile Asp His Tyr Asp His Ala His Ala
            260                 265                 270

Tyr Ile Pro Glu Thr Leu Val Lys Tyr Ser Tyr Ile His Leu Tyr Lys
        275                 280                 285

Pro Asn Val Arg Ser Leu Phe Glu Tyr
    290                 295

<210> SEQ ID NO 5
<211> LENGTH: 296
<212> TYPE: PRT
<213> ORGANISM: Saccharomyces kudriazevi

<400> SEQUENCE: 5

Met Ala Asn Thr Lys Lys Pro Lys Ala Arg Ser Tyr Lys Cys Ser Leu
```

```
              1               5                  10                 15
            Glu Gly Cys Glu Lys Glu Tyr Asn Arg Pro Ser Leu Leu Gln Gln His
                        20                  25                 30

Gln Asn Ser His Thr Asn Gln Lys Pro Tyr Arg Cys Asp Glu Pro Ser
                        35                  40                 45

Cys Gly Lys Lys Phe Ile Arg Pro Cys His Leu Arg Val His Lys Trp
                        50                  55                 60

Thr His Ser Gln Ile Lys Pro Lys Pro Cys Pro Leu Cys Glu Lys Arg
            65                      70                  75                 80

Phe Val Thr Asn Gln Gln Leu Lys Arg His Leu Gly Ser His Glu Arg
                        85                  90                 95

Lys Asn Lys Leu Ala Ser Lys Ile Asn Asp Lys Asn Glu Glu Pro Asn
                        100                 105                110

Pro Gly Ile Ser Ala Asn Ser Lys Gly Ser Lys Ser Ser Leu Asp Pro
                        115                 120                125

Ser Leu Pro Pro Leu His Asp Glu Ala Leu Leu Gln Asp His Leu Pro
                        130                 135                140

Gly Phe Asp Asp Met Gln Val Leu Gln Cys Pro Tyr Lys Ser Cys Gln
            145                     150                 155                160

Arg Val Thr Ser Phe Ser Asp Asp Leu Val Asn His Met Leu Gln Gln
                        165                 170                175

His Ile Thr Ser Lys Leu Thr Val Pro Tyr Glu Glu Leu Pro Leu Gly
                        180                 185                190

Lys Pro Leu Ser Ile Ser Ala Lys Ser Ser Thr Asp Ile Thr Ser
                        195                 200                205

Ile Pro Gln Leu Ser Leu Ser Ile Asp Gly Thr Ser Ser Ser Asp Ser
            210                     215                 220

Gly His Ser Thr Val Leu Gln Ser Pro Glu Asp Pro Glu Ser Tyr Trp
            225                     230                 235                240

Ser Asp Asn Arg Cys Lys His Thr Asp Cys Gln Asp Leu Ser Pro Leu
                        245                 250                255

Thr Ser Val Phe Asp Leu Ile Asp His Tyr Asp His Thr His Ala Phe
                        260                 265                270

Ile Pro Glu Thr Leu Val Lys Tyr Ser Tyr Ile His Leu Tyr Lys Pro
                        275                 280                285

Asn Val Trp Gly Leu Phe Glu Tyr
                        290                 295

<210> SEQ ID NO 6
<211> LENGTH: 327
<212> TYPE: PRT
<213> ORGANISM: Saccharomyces castellii

<400> SEQUENCE: 6

Met Val Ala Thr Glu Lys Arg Ser Lys Lys Val Tyr Lys Cys Gln
            1               5                  10                 15

Phe Glu Gly Cys His Arg Glu Phe Thr Arg Pro Cys Leu Leu Gln Gln
                        20                  25                 30

His Arg Tyr Ser His Thr Asn Glu Arg Pro Tyr Ile Cys Asp Val Glu
                        35                  40                 45

Gly Cys Gly Lys Arg Phe Met Arg Pro Cys His Leu Lys Val His Lys
                        50                  55                 60

Trp Thr His Ser Lys Val Lys Pro Leu Lys Cys Ala Phe Cys Glu Lys
            65                      70                  75                 80
```

```
Gly Phe Ile Thr Asn Gln Gln Leu Lys Arg His Leu Asn Thr His Ala
                85                  90                  95

Lys Lys Ser Arg Lys Ala Leu Leu Ala Ile Thr Pro Pro Asn Glu Ser
            100                 105                 110

Glu Thr Asn Glu Lys Lys Gln Gln Lys Lys Ala Asn Ser Lys Pro Asn
        115                 120                 125

Asp Ile Ser Asp Val Thr Thr Ser Ile Ser Asn Met Lys Met Glu Asn
    130                 135                 140

Gly Asn Gly His Glu Asn Gly Lys Asp Pro Leu Ser Leu Gln Asn Val
145                 150                 155                 160

Pro Leu Pro Asp Val Ile Lys Cys Ala Tyr Glu Asp Cys Gly Glu Ile
                165                 170                 175

Leu Ala Pro Gly Glu Asp Leu Ile Asn His Leu Leu Glu Ser His Leu
            180                 185                 190

Val Ser Lys Leu Val Tyr Glu Asp Glu Asp Glu Ser Pro Leu Pro
        195                 200                 205

Ser Pro Leu Lys Glu Ala Ser Asp Asp Gln Lys Ser Asp Thr Leu Leu
    210                 215                 220

Gln Gln Ile Gln Asp Lys Pro Val Leu Val Gln Pro Gln Pro Val Pro
225                 230                 235                 240

Lys Ser His Pro Ser Leu Pro Pro His His His Tyr Thr Asp Tyr
                245                 250                 255

Ser Asn Cys Pro Asp Leu Gly Pro Asp Gly Tyr Ser Glu Trp Thr Asp
            260                 265                 270

Leu Ser Cys Arg Asp Cys Thr Tyr Lys Cys Leu Pro Tyr Thr Glu Thr
        275                 280                 285

Val Phe Asp Leu Ile Glu His Tyr Asp Gln Asp His Gly Phe Ile Pro
    290                 295                 300

Glu Thr Leu Val Lys Tyr Gly Tyr Ile Asn Leu Tyr Asp Thr Asn Ile
305                 310                 315                 320

Ser Asp Leu Thr Thr Ile Pro
                325

<210> SEQ ID NO 7
<211> LENGTH: 458
<212> TYPE: PRT
<213> ORGANISM: Saccharomyces cerevisiae

<400> SEQUENCE: 7

Met Val Ala Asn Trp Val Leu Ala Leu Thr Arg Gln Phe Asp Pro Phe
1               5                   10                  15

Met Phe Val Met Val Met Gly Val Gly Ile Ser Ser Asn Ile Leu Tyr
            20                  25                  30

Ser Phe Pro Tyr Pro Ala Arg Trp Leu Arg Ile Cys Ser Tyr Ile Met
        35                  40                  45

Phe Ala Ile Thr Cys Leu Ile Phe Ile Ala Val Gln Ala Leu Gln Ile
    50                  55                  60

Leu His Leu Ile Val Tyr Ile Lys Glu Lys Ser Phe Arg Glu Tyr Phe
65                  70                  75                  80

Asn Asp Phe Phe Arg Asn Met Lys His Asn Leu Phe Trp Gly Thr Tyr
                85                  90                  95

Pro Met Gly Leu Val Thr Ile Ile Asn Phe Leu Gly Ala Leu Ser Lys
            100                 105                 110

Ala Asn Thr Thr Lys Ser Pro Thr Asn Ala Arg Asn Leu Met Ile Phe
        115                 120                 125
```

Val Tyr Val Leu Trp Trp Tyr Asp Leu Ala Val Cys Leu Val Ile Ala
    130                 135                 140

Trp Gly Ile Ser Phe Leu Ile Trp His Asp Tyr Ser Leu Glu Gly
145                 150                 155                 160

Ile Gly Asn Tyr Pro Ser Tyr Asn Ile Lys Met Ala Ser Glu Asn Met
                165                 170                 175

Lys Ser Val Leu Leu Leu Asp Ile Ile Pro Leu Val Val Ala Ser
                180                 185                 190

Ser Cys Gly Thr Phe Thr Met Ser Glu Ile Phe Phe His Ala Phe Asn
                195                 200                 205

Arg Asn Ile Gln Leu Ile Thr Leu Val Ile Cys Ala Leu Thr Trp Leu
    210                 215                 220

His Ala Ile Ile Phe Val Phe Ile Leu Ile Ala Ile Tyr Phe Trp Ser
225                 230                 235                 240

Leu Tyr Ile Asn Lys Ile Pro Pro Met Thr Gln Val Phe Thr Leu Phe
                245                 250                 255

Leu Leu Leu Gly Pro Met Gly Gln Gly Ser Phe Gly Val Leu Leu Leu
                260                 265                 270

Thr Asp Asn Ile Lys Lys Tyr Ala Gly Lys Tyr Tyr Pro Thr Asp Asn
    275                 280                 285

Ile Thr Arg Glu Gln Glu Ile Leu Thr Ile Ala Val Pro Trp Cys Phe
290                 295                 300

Lys Ile Leu Gly Met Val Ser Ala Met Ala Leu Leu Ala Met Gly Tyr
305                 310                 315                 320

Phe Phe Thr Val Ile Ser Val Val Ser Ile Leu Ser Tyr Tyr Asn Lys
                325                 330                 335

Lys Glu Ile Glu Asn Glu Thr Gly Lys Val Lys Arg Val Tyr Thr Phe
                340                 345                 350

His Lys Gly Phe Trp Gly Met Thr Phe Pro Met Gly Thr Met Ser Leu
    355                 360                 365

Gly Asn Glu Glu Leu Tyr Val Gln Tyr Asn Gln Tyr Val Pro Leu Tyr
370                 375                 380

Ala Phe Arg Val Leu Gly Thr Ile Tyr Gly Gly Val Cys Val Cys Trp
385                 390                 395                 400

Ser Ile Leu Cys Leu Leu Cys Thr Leu His Glu Tyr Ser Lys Lys Met
                405                 410                 415

Leu His Ala Ala Arg Lys Ser Ser Leu Phe Ser Glu Ser Gly Thr Glu
                420                 425                 430

Lys Thr Thr Val Ser Pro Tyr Asn Ser Ile Glu Ser Val Glu Glu Ser
                435                 440                 445

Asn Ser Ala Leu Asp Phe Thr Arg Leu Ala
    450                 455

<210> SEQ ID NO 8
<211> LENGTH: 458
<212> TYPE: PRT
<213> ORGANISM: Saccharomyces paradoxus

<400> SEQUENCE: 8

Met Val Ala Asn Trp Val Leu Ala Val Thr Arg Gln Phe Asp Pro Phe
1               5                   10                  15

Met Phe Val Met Val Met Gly Val Gly Ile Ser Ser Asn Ile Leu Tyr
                20                  25                  30

Asn Phe Pro Tyr Pro Ala Arg Trp Leu Arg Ile Cys Ser Tyr Ile Met

```
                35                  40                  45
        Phe Ala Ile Thr Cys Leu Ile Phe Ile Ala Val Gln Ala Leu Gln Leu
        50                  55                  60
        Leu His Leu Ile Ile Tyr Ile Lys Glu Lys Ser Phe Arg Glu Tyr Phe
        65                  70                  75                  80
        Asn Asp Phe Phe Arg Asn Met Lys His Asn Leu Phe Trp Gly Thr Tyr
                            85                  90                  95
        Pro Met Gly Leu Val Thr Ile Ile Asn Phe Leu Gly Ala Leu Ser Lys
                        100                 105                 110
        Glu Tyr Thr Thr Lys Ser Pro Thr Asn Ala Arg Asn Leu Met Ile Phe
                        115                 120                 125
        Val Tyr Val Leu Trp Trp Tyr Asp Leu Ala Val Ser Leu Val Ile Ala
                    130                 135                 140
        Trp Gly Ile Ser Phe Leu Ile Trp His Asp Tyr Tyr Ser Leu Glu Gly
        145                 150                 155                 160
        Ile Gly Asn Tyr Pro Ser Tyr Asn Ile Arg Met Ala Ser Glu Asn Met
                        165                 170                 175
        Lys Ser Val Leu Leu Leu Asp Ile Ile Pro Leu Val Val Ala Ser
                    180                 185                 190
        Ser Cys Gly Thr Phe Thr Met Ser Glu Ile Phe Gly His Ala Phe Asn
                        195                 200                 205
        Arg Asn Ile Gln Leu Ile Thr Leu Val Ile Cys Ala Leu Thr Trp Leu
        210                 215                 220
        His Ala Ile Ile Phe Val Phe Ile Leu Ile Ala Ile Tyr Phe Trp Ser
        225                 230                 235                 240
        Leu Tyr Ile Asn Lys Ile Pro Pro Met Thr Gln Val Phe Thr Leu Phe
                        245                 250                 255
        Leu Leu Leu Gly Pro Met Gly Gln Gly Ser Phe Gly Val Leu Leu Leu
                        260                 265                 270
        Thr Asp Asn Ile Lys Lys Tyr Val Ser Lys Tyr Tyr Gln Thr Asp Asn
                    275                 280                 285
        Val Thr Arg Glu Gln Glu Ile Leu Thr Ile Ala Val Pro Trp Cys Phe
                    290                 295                 300
        Lys Val Leu Gly Ile Ile Ser Ala Met Ala Leu Leu Ala Met Gly Tyr
        305                 310                 315                 320
        Phe Phe Thr Val Ile Ser Val Ile Ser Ile Leu Ser Tyr Tyr Asn Lys
                        325                 330                 335
        Lys Glu Ile Glu Ser Glu Thr Gly Lys Val Lys Arg Val Tyr Thr Phe
                        340                 345                 350
        His Lys Gly Phe Trp Gly Met Thr Phe Pro Met Gly Thr Met Ser Leu
                    355                 360                 365
        Gly Asn Glu Glu Leu Tyr Val Gln Tyr Asp Gln Tyr Val Pro Leu Tyr
            370                 375                 380
        Ala Phe Arg Val Leu Gly Thr Ile Tyr Gly Ile Cys Ile Cys Trp
        385                 390                 395                 400
        Ser Ile Leu Cys Leu Leu Cys Thr Leu His Glu Tyr Ser Lys Lys Ile
                        405                 410                 415
        Leu His Ala Ala Arg Lys Ser Ser Leu Phe Ser Glu Ser Asn Thr Glu
                    420                 425                 430
        Lys Thr Thr Val Ser Pro Tyr Asn Ser Ile Glu Ser Val Glu Glu Ser
                    435                 440                 445
        Asn Ser Ala Leu Asp Phe Thr Arg Leu Ala
                    450                 455
```

<210> SEQ ID NO 9
<211> LENGTH: 458
<212> TYPE: PRT
<213> ORGANISM: Saccharomyces mikatae

<400> SEQUENCE: 9

```
Met Val Ala Ser Trp Met Phe Ala Ala Thr Arg Gln Phe Asp Pro Phe
1               5                   10                  15

Met Phe Val Met Val Met Gly Val Gly Ile Ser Ala Asn Ile Leu Tyr
                20                  25                  30

Ser Phe Pro Tyr Pro Ala Arg Trp Leu Arg Ile Cys Ser Tyr Ile Met
            35                  40                  45

Phe Ala Ile Thr Cys Leu Ile Phe Ile Ala Val Gln Ala Leu Gln Leu
        50                  55                  60

Leu His Leu Ile Val Tyr Ile Lys Glu Lys Ser Phe Arg Glu Tyr Phe
65                  70                  75                  80

Asn Asp Phe Phe Arg Asn Met Lys His Asn Leu Phe Trp Gly Thr Tyr
                85                  90                  95

Pro Met Gly Leu Val Thr Ile Ile Asn Phe Leu Ala Thr Leu Ser Lys
            100                 105                 110

Glu Tyr Thr Lys Ser Ser Pro Met Ala Ser Arg Asn Leu Met Ile Phe
        115                 120                 125

Val Tyr Val Leu Trp Trp Tyr Asp Leu Ala Val Cys Leu Val Thr Ala
    130                 135                 140

Trp Gly Ile Ser Phe Leu Ile Trp His Asp Tyr Tyr Ser Leu Glu Gly
145                 150                 155                 160

Ile Gly Asn Tyr Pro Ser Tyr Asn Ile Arg Met Ala Ser Glu Asn Met
                165                 170                 175

Lys Ser Ile Leu Leu Leu Asp Ile Ile Pro Leu Val Val Val Ala Ser
            180                 185                 190

Ser Cys Gly Thr Phe Thr Met Ser Glu Ile Phe Gly Ile Thr Phe Asn
        195                 200                 205

Arg Asn Ile Gln Leu Ile Thr Leu Ile Ile Cys Ala Leu Thr Trp Leu
    210                 215                 220

His Ala Ile Ile Phe Val Phe Ile Leu Ile Thr Ile Tyr Phe Trp Ser
225                 230                 235                 240

Leu Tyr Ile Asn Lys Ile Pro Pro Met Thr Gln Val Phe Thr Leu Phe
                245                 250                 255

Leu Leu Leu Gly Pro Met Gly Gln Gly Ser Phe Gly Val Leu Leu Leu
            260                 265                 270

Ser Asp Asn Ile Lys Glu Tyr Val Gly Lys Tyr Tyr Pro Thr Asp Asn
        275                 280                 285

Ile Thr Arg Glu Glu Glu Ile Leu Thr Ile Val Val Pro Trp Cys Phe
    290                 295                 300

Lys Val Leu Gly Met Ile Ser Ala Met Ala Leu Leu Ala Met Gly Tyr
305                 310                 315                 320

Phe Phe Thr Val Ile Ser Ile Val Ser Ile Leu Ser Tyr Tyr Asn Glu
                325                 330                 335

Arg Glu Thr Glu Asn Glu Thr Gly Lys Val Arg Arg Val Tyr Thr Phe
            340                 345                 350

His Lys Gly Phe Trp Gly Met Thr Phe Pro Met Gly Thr Met Ser Leu
        355                 360                 365

Gly Asn Glu Glu Leu Tyr Val Gln Tyr Asn Gln Tyr Val Pro Leu Tyr
```

```
                370             375             380
Ala Phe Arg Val Leu Ala Thr Ile Tyr Gly Gly Ile Cys Val Cys Trp
385                 390                 395                 400

Thr Ile Leu Cys Leu Ser Cys Thr Leu Tyr Glu Tyr Thr Lys Lys Ala
                405                 410                 415

Leu His Ala Ala His Lys Ser Ser Leu Phe Ser Glu Ala Gly Thr Glu
                420                 425                 430

Lys Thr Phe Thr Ser Pro Tyr Asn Ser Thr Glu Ser Val Glu Glu Ser
                435                 440                 445

Asn Ser Ala Leu Asp Phe Thr Arg Leu Ala
            450                 455

<210> SEQ ID NO 10
<211> LENGTH: 458
<212> TYPE: PRT
<213> ORGANISM: Saccharomyce uvarum

<400> SEQUENCE: 10

Met Val Ala Ser Trp Met Leu Thr Ala Thr Arg Gln Phe Asn Pro Phe
1               5                   10                  15

Met Phe Val Met Val Met Gly Val Gly Ile Ser Ser Asn Ile Leu Tyr
                20                  25                  30

Asn Phe Pro Tyr Pro Ala Arg Trp Leu Arg Ile Cys Ser Tyr Ile Met
            35                  40                  45

Phe Ala Ile Thr Cys Leu Ile Phe Ile Ala Val Gln Ala Leu Gln Leu
        50                  55                  60

Leu His Met Phe Val Tyr Ile Lys Glu Lys Ser Phe Lys Asp Tyr Phe
65                  70                  75                  80

Asn Asp Tyr Phe Arg Ser Leu Lys Phe Asn Leu Phe Trp Gly Thr Tyr
                85                  90                  95

Pro Met Gly Leu Val Thr Ile Ile Asn Phe Leu Gly Ala Leu Ser Gln
            100                 105                 110

Lys Phe Thr Thr Ser Ser Pro Thr Asn Ala Lys Asn Leu Met Ile Phe
        115                 120                 125

Val Tyr Val Leu Trp Trp Tyr Asp Leu Ala Ile Cys Leu Leu Thr Ala
        130                 135                 140

Trp Gly Ile Ser Phe Leu Ile Trp Gln Asp Tyr Tyr Phe Ala Asp Gly
145                 150                 155                 160

Val Gly Asn Tyr Ser Ser Tyr Ser Ser Arg Met Ala Ser Asp His Met
                165                 170                 175

Lys Ser Val Leu Leu Leu Asp Val Ile Pro Leu Val Val Val Ala Ser
            180                 185                 190

Ser Gly Gly Thr Phe Thr Met Ser Gln Ile Phe Gly Thr Thr Phe Asp
        195                 200                 205

Arg Asn Ile Gln Leu Leu Thr Leu Val Ile Cys Ala Leu Val Trp Leu
    210                 215                 220

His Ala Leu Ile Phe Val Phe Ile Leu Ile Thr Ile Tyr Phe Trp Asn
225                 230                 235                 240

Leu Tyr Ile Asn Lys Ile Pro Pro Met Thr Gln Val Phe Thr Leu Phe
                245                 250                 255

Leu Val Leu Gly Pro Leu Gly Gln Gly Ser Phe Gly Ile Leu Leu Leu
            260                 265                 270

Thr Asp Asn Ile Arg Lys Tyr Val Glu Lys Tyr Tyr Pro Arg Glu Asn
        275                 280                 285
```

```
Ile Thr Met Glu Gln Glu Ile Leu Thr Thr Met Val Pro Trp Cys Phe
    290                 295                 300

Lys Val Leu Gly Met Thr Ala Ala Leu Ala Leu Leu Ala Met Gly Tyr
305                 310                 315                 320

Phe Phe Thr Val Ile Cys Val Val Ser Ile Leu Ser Tyr Tyr Asn Glu
                325                 330                 335

Arg Ile Val Asp Glu Glu Thr Gly Lys Val Lys Arg Val Tyr Thr Phe
                340                 345                 350

His Lys Gly Phe Trp Gly Met Thr Phe Pro Met Gly Thr Met Ser Leu
                355                 360                 365

Gly Asn Glu Glu Leu Tyr Leu Gln Tyr Asn Gln Tyr Val Pro Leu Tyr
370                 375                 380

Ala Phe Arg Val Ile Gly Thr Ile Tyr Gly Gly Ile Cys Val Cys Trp
385                 390                 395                 400

Ser Ile Leu Cys Leu Ser Cys Thr Leu Tyr Gly Tyr Leu Lys Thr Ala
                405                 410                 415

Leu Arg Ala Ala Arg Lys Pro Ser Phe Ile Ser Glu Glu Gly Thr Glu
                420                 425                 430

Lys Thr Ala Ser Ser Pro Phe Asn Ser Ile Glu Ser Val Glu Glu Ser
                435                 440                 445

Asn Ser Ala Ile Asp Ser Thr Tyr Leu Ala
                450                 455

<210> SEQ ID NO 11
<211> LENGTH: 457
<212> TYPE: PRT
<213> ORGANISM: Saccharomyce kudriazevi

<400> SEQUENCE: 11

Met Val Ser Ser Trp Ala Leu Ala Val Thr Arg Gln Phe Asp Pro Phe
1               5                   10                  15

Met Phe Val Met Val Met Gly Val Gly Ile Ser Ser Asn Ile Leu Tyr
                20                  25                  30

Asn Phe Pro Tyr Pro Ala Arg Trp Leu Arg Ile Cys Ser Tyr Ile Met
                35                  40                  45

Phe Ala Ile Thr Cys Leu Ile Phe Ile Ala Val Gln Ala Leu Gln Leu
50                  55                  60

Leu His Leu Val Val Tyr Ile Lys Glu Lys Ser Phe Lys Glu Tyr Phe
65                  70                  75                  80

Asn Asp Phe Phe Arg Asn Met Lys His Ser Leu Phe Trp Gly Thr Tyr
                85                  90                  95

Pro Met Gly Leu Val Thr Ile Ile Asn Phe Leu Gly Ala Leu Ser Lys
                100                 105                 110

Lys Tyr Thr Thr Arg Ser Pro Thr Asn Ala Arg Asn Leu Met Ile Leu
                115                 120                 125

Val Tyr Ala Leu Trp Trp Tyr Asp Leu Ala Val Cys Leu Val Ile Ala
                130                 135                 140

Trp Gly Ile Ser Phe Leu Ile Trp His Asp Tyr Tyr Ser Leu Asp Gly
145                 150                 155                 160

Val Gly Ser Tyr Pro Ser Tyr Asn Ile Arg Met Ala Ser Glu Asn Met
                165                 170                 175

Lys Ser Val Leu Leu Leu Asp Ile Ile Pro Leu Val Val Val Ala Ser
                180                 185                 190

Ser Cys Gly Thr Phe Thr Met Ser Asp Ile Phe Ala Arg Ala Phe Asn
                195                 200                 205
```

```
Arg Asn Ile Gln Leu Ile Thr Leu Val Ile Cys Ala Leu Thr Trp Leu
            210                 215                 220

His Ala Ile Ile Phe Val Ser Ile Leu Ile Thr Ile Tyr Phe Trp Ser
225                 230                 235                 240

Leu Tyr Ile Asn Lys Ile Pro Pro Met Ser Gln Val Phe Thr Leu Phe
                245                 250                 255

Leu Leu Leu Gly Pro Met Gly Gln Gly Ser Phe Gly Val Leu Leu Leu
            260                 265                 270

Thr Asp Asn Ile Lys Lys Tyr Val Asp Lys Tyr Tyr Pro Thr Asp Asn
        275                 280                 285

Ile Thr Arg Glu Gln Glu Ile Leu Thr Ile Met Val Pro Trp Cys Phe
290                 295                 300

Lys Val Leu Gly Ile Ile Ser Ala Met Ala Met Leu Ala Met Gly Tyr
305                 310                 315                 320

Phe Phe Thr Val Ile Ser Ile Ala Ser Ile Val Ser His Tyr Asp Thr
                325                 330                 335

Arg Glu Thr Glu Asn Glu Thr Gly Lys Val Lys Arg Val Tyr Thr Phe
            340                 345                 350

His Lys Gly Phe Trp Gly Met Thr Phe Pro Met Gly Thr Met Ser Leu
        355                 360                 365

Gly Asn Glu Glu Leu Tyr Val Gln Tyr Asn Gln Tyr Val Pro Leu Tyr
370                 375                 380

Ala Phe Arg Val Leu Gly Thr Ile Tyr Gly Ser Ile Cys Val Cys Trp
385                 390                 395                 400

Ser Ile Leu Cys Leu Ser Phe Thr Leu Tyr Glu Tyr Leu Lys Lys Val
                405                 410                 415

Trp His Ala Ala Arg Lys Ser Ser Phe Phe Ser Glu Ala Ala Ala Glu
            420                 425                 430

Lys Thr Ile Thr Ser Pro Tyr Ser Thr Glu Ser Val Glu Glu Ser Asn
        435                 440                 445

Ser Ala Leu Asp Phe Thr Arg Leu Ala
450                 455

<210> SEQ ID NO 12
<211> LENGTH: 464
<212> TYPE: PRT
<213> ORGANISM: Saccharomyce castelli

<400> SEQUENCE: 12

Met Leu Ser Leu Ser Phe Asp Pro His Arg Val Ile Arg His Phe Glu
1               5                   10                  15

Pro Tyr Leu Phe Val Met Val Met Gly Thr Gly Ile Ser Ala Asp Ile
                20                  25                  30

Leu Tyr Ser Phe Pro Tyr Pro Ala Gln Trp Leu Lys Ile Cys Ser Tyr
            35                  40                  45

Ile Met Phe Ala Ile Ala Ser Leu Leu Phe Ile Phe Leu Gln Ile Phe
        50                  55                  60

Cys Ile Ile His Leu Ile Trp Tyr Ile Lys Lys Lys Ser Phe Lys Glu
65                  70                  75                  80

Tyr Tyr Asp Phe Tyr Phe Arg Asn Met Ser His Asn Val Phe Trp Gly
                85                  90                  95

Thr Tyr Pro Met Gly Ile Ile Thr Leu Leu Asn Tyr Leu His Asn Leu
            100                 105                 110

Ala Glu Asn Glu Leu Ser His Thr Ala His Ser Arg Arg Ile Met Ile
```

```
            115                 120                 125
Phe Val Tyr Ala Ile Trp Trp Tyr Asp Leu Phe Ile Ser Leu Leu Ile
130                 135                 140

Ala Trp Gly Ile Thr Phe Leu Ile Trp Gln Ser Tyr Tyr Ser Lys Asn
145                 150                 155                 160

Asp Asn Asp Asn Thr Glu Asp Leu Leu Leu Thr Thr Ala Ser Thr Asn
                165                 170                 175

Leu Lys Ser Val Leu Ile Leu Ala Val Val Pro Leu Val Val Ala Ala
            180                 185                 190

Ser Ser Ala Gly Leu Phe Thr Met Lys Asp Leu Phe Ala Arg Thr Phe
        195                 200                 205

Asn Arg Asn Ile Gln Leu Leu Thr Leu Val Ile Thr Ala Leu Leu Trp
    210                 215                 220

Leu His Ala Leu Ile Phe Val Phe Ile Leu Ile Thr Ile Tyr Phe Trp
225                 230                 235                 240

Ser Leu Tyr Val Asn Lys Leu Pro Ala Met Ser Gln Val Phe Thr Leu
                245                 250                 255

Phe Leu Val Leu Gly Pro Leu Gly Gln Gly Ser Phe Gly Ile Leu Leu
            260                 265                 270

Leu Thr Asp Asn Ile Lys Val Tyr Val Glu Lys Tyr Tyr Pro Gln Pro
        275                 280                 285

Thr Gly Gln Asn Leu Gln Gln Ala Ile Leu Leu Thr Ala Ile Pro Trp
    290                 295                 300

Ser Phe Lys Ile Ile Gly Leu Ser Leu Ala Leu Ala Leu Gln Ser Met
305                 310                 315                 320

Gly Tyr Phe Phe Thr Ile Ile Cys Phe Val Ser Ile Cys Ser Tyr Cys
                325                 330                 335

Thr Thr Glu Ile Gln Asp Asp Thr Gly Lys Lys Ser Arg Ile Tyr
            340                 345                 350

Ser Phe His Lys Gly Phe Trp Ala Val Thr Phe Pro Met Gly Thr Met
        355                 360                 365

Ser Leu Gly Ser Thr Glu Ile His Val Gln Tyr Glu Gln Phe Val Pro
    370                 375                 380

Leu Ser Ala Phe Arg Val Ile Gly Thr Ile Tyr Ala Ala Val Cys Ile
385                 390                 395                 400

Leu Trp Thr Ile Leu Cys Leu Leu Gly Thr Thr Tyr Leu Tyr Ile Trp
                405                 410                 415

Pro Pro Ile Gln Arg Tyr Arg His Arg Lys Leu Leu Lys Gly Asp Cys
            420                 425                 430

Asp Ile Asp Ser Glu Ser Ile Leu Pro Thr Thr Asn Lys Asn Glu Leu
        435                 440                 445

Pro Ser Thr Thr Asn Ser Thr Ser Met Gln Thr Arg Phe Glu Ser His
    450                 455                 460

<210> SEQ ID NO 13
<211> LENGTH: 515
<212> TYPE: PRT
<213> ORGANISM: Saccharomycopsis fibuligera

<400> SEQUENCE: 13

Met Ile Arg Leu Thr Val Phe Leu Thr Ala Val Phe Ala Ala Val Ala
1               5                   10                  15

Ser Cys Val Pro Val Glu Leu Asp Lys Arg Asn Thr Gly His Phe Gln
            20                  25                  30
```

Ala Tyr Ser Gly Tyr Thr Val Ala Arg Ser Asn Phe Thr Gln Trp Ile
            35                  40                  45

His Glu Gln Pro Ala Val Ser Trp Tyr Leu Leu Gln Asn Ile Asp
 50                  55                  60

Tyr Pro Glu Gly Gln Phe Lys Ser Ala Lys Pro Gly Val Val Ala
 65                  70                  75                  80

Ser Pro Ser Thr Ser Glu Pro Asp Tyr Phe Gln Trp Thr Arg Asp
                 85                  90                  95

Thr Ala Ile Thr Phe Leu Ser Leu Ile Ala Glu Val Glu Asp His Ser
             100                 105                 110

Phe Ser Asn Thr Thr Leu Ala Lys Val Val Glu Tyr Tyr Ile Ser Asn
             115                 120                 125

Thr Tyr Thr Leu Gln Arg Val Ser Asn Pro Ser Gly Asn Phe Asp Ser
 130                 135                 140

Pro Asn His Asp Gly Leu Gly Glu Pro Lys Phe Asn Val Asp Asp Thr
 145                 150                 155                 160

Ala Tyr Thr Ala Ser Trp Gly Arg Pro Gln Asn Asp Gly Pro Ala Leu
                 165                 170                 175

Arg Ala Tyr Ala Ile Ser Arg Tyr Leu Asn Ala Val Ala Lys His Asn
             180                 185                 190

Asn Gly Lys Leu Leu Leu Ala Gly Gln Asn Gly Ile Pro Tyr Ser Ser
             195                 200                 205

Ala Ser Asp Ile Tyr Trp Lys Ile Ile Lys Pro Asp Leu Gln His Val
 210                 215                 220

Ser Thr His Trp Ser Thr Ser Gly Phe Asp Leu Trp Glu Glu Asn Gln
 225                 230                 235                 240

Gly Thr His Phe Phe Thr Ala Leu Val Gln Leu Lys Ala Leu Ser Tyr
                 245                 250                 255

Gly Ile Pro Leu Ser Lys Thr Tyr Asn Asp Pro Gly Phe Thr Ser Trp
             260                 265                 270

Leu Glu Lys Gln Lys Asp Ala Leu Asn Ser Tyr Ile Asn Ser Ser Gly
             275                 280                 285

Phe Val Asn Ser Gly Lys Lys His Ile Val Glu Ser Pro Gln Leu Ser
 290                 295                 300

Ser Arg Gly Gly Leu Asp Ser Ala Thr Tyr Ile Ala Ala Leu Ile Thr
 305                 310                 315                 320

His Asp Ile Gly Asp Asp Thr Tyr Thr Pro Phe Asn Val Asp Asn
                 325                 330                 335

Ser Tyr Val Leu Asn Ser Leu Tyr Tyr Leu Val Asp Asn Lys Asn
             340                 345                 350

Arg Tyr Lys Ile Asn Gly Asn Tyr Lys Ala Gly Ala Ala Val Gly Arg
             355                 360                 365

Tyr Pro Glu Asp Val Tyr Asn Gly Val Gly Thr Ser Glu Gly Asn Pro
 370                 375                 380

Trp Gln Leu Ala Thr Ala Tyr Ala Gly Gln Thr Phe Tyr Thr Leu Ala
 385                 390                 395                 400

Tyr Asn Ser Leu Lys Asn Lys Asn Leu Val Ile Glu Lys Leu Asn
             405                 410                 415

Tyr Asp Leu Tyr Asn Ser Phe Ile Ala Asp Leu Ser Lys Ile Asp Ser
             420                 425                 430

Ser Tyr Ala Ser Lys Asp Ser Leu Thr Leu Thr Tyr Gly Ser Asp Asn
             435                 440                 445

Tyr Lys Asn Val Ile Lys Ser Leu Leu Gln Phe Gly Asp Ser Phe Leu

-continued

```
                450                 455                 460
Lys Val Leu Leu Asp His Ile Asp Asp Asn Gly Gln Leu Thr Glu Glu
465                 470                 475                 480

Ile Asn Arg Tyr Thr Gly Phe Gln Ala Gly Ala Val Ser Leu Thr Trp
                485                 490                 495

Ser Ser Gly Ser Leu Leu Ser Ala Asn Arg Ala Arg Asn Lys Leu Ile
                500                 505                 510

Glu Leu Leu
        515

<210> SEQ ID NO 14
<211> LENGTH: 515
<212> TYPE: PRT
<213> ORGANISM: Artificial Sequence
<220> FEATURE:
<223> OTHER INFORMATION: Variant of GLU0111 of Saccharomycopsis
      fibuligera

<400> SEQUENCE: 14

Met Ile Arg Leu Thr Val Phe Leu Thr Ala Val Phe Ala Ala Val Ala
1               5                   10                  15

Ser Cys Val Pro Val Glu Leu Asp Lys Arg Asn Thr Gly His Phe Gln
                20                  25                  30

Ala Tyr Ser Gly Tyr Thr Val Asn Arg Ser Asn Phe Thr Gln Trp Ile
            35                  40                  45

His Glu Gln Pro Ala Val Ser Trp Tyr Tyr Leu Leu Gln Asn Ile Asp
        50                  55                  60

Tyr Pro Glu Gly Gln Phe Lys Ser Ala Lys Pro Gly Val Val Val Ala
65                  70                  75                  80

Ser Pro Ser Thr Ser Glu Pro Asp Tyr Phe Tyr Gln Trp Thr Arg Asp
                85                  90                  95

Thr Ala Ile Thr Phe Leu Ser Leu Ile Ala Glu Val Glu Asp His Ser
                100                 105                 110

Phe Ser Asn Thr Thr Leu Ala Lys Val Val Glu Tyr Tyr Ile Ser Asn
            115                 120                 125

Thr Tyr Thr Leu Gln Arg Val Ser Asn Pro Ser Gly Asn Phe Asp Ser
        130                 135                 140

Pro Asn His Asp Gly Leu Gly Glu Pro Lys Phe Asn Val Asp Asp Thr
145                 150                 155                 160

Ala Tyr Thr Ala Ser Trp Gly Arg Pro Gln Asn Asp Gly Pro Ala Leu
                165                 170                 175

Arg Ala Tyr Ala Ile Ser Arg Tyr Leu Asn Ala Val Ala Lys His Asn
            180                 185                 190

Asn Gly Lys Leu Leu Leu Ala Gly Gln Asn Gly Ile Pro Tyr Ser Ser
        195                 200                 205

Ala Ser Asp Ile Tyr Trp Lys Ile Ile Lys Pro Asp Leu Gln His Val
210                 215                 220

Ser Thr His Trp Ser Thr Ser Gly Phe Asp Leu Trp Glu Glu Asn Gln
225                 230                 235                 240

Gly Thr His Phe Phe Thr Ala Leu Val Gln Leu Lys Ala Leu Ser Tyr
                245                 250                 255

Gly Ile Pro Leu Ser Lys Thr Tyr Asn Asp Pro Gly Phe Thr Ser Trp
            260                 265                 270

Leu Glu Lys Gln Lys Asp Ala Leu Asn Ser Tyr Ile Asn Ser Ser Gly
        275                 280                 285
```

```
Phe Val Asn Ser Gly Lys Lys His Ile Val Glu Ser Pro Gln Leu Ser
    290                 295                 300

Ser Arg Gly Gly Leu Asp Ser Ala Thr Tyr Ile Ala Ala Leu Ile Thr
305                 310                 315                 320

His Asp Ile Gly Asp Asp Asp Thr Tyr Thr Pro Phe Asn Val Asp Asn
                325                 330                 335

Ser Tyr Val Leu Asn Ser Leu Tyr Tyr Leu Val Asp Asn Lys Asn
            340                 345                 350

Arg Tyr Lys Ile Asn Gly Asn Tyr Lys Ala Gly Ala Val Gly Arg
            355                 360                 365

Tyr Pro Glu Asp Val Tyr Asn Gly Val Gly Thr Ser Glu Gly Asn Pro
    370                 375                 380

Trp Gln Leu Ala Thr Ala Tyr Ala Gly Gln Thr Phe Tyr Thr Leu Ala
385                 390                 395                 400

Tyr Asn Ser Leu Lys Asn Lys Asn Leu Val Ile Glu Lys Leu Asn
                405                 410                 415

Tyr Asp Leu Tyr Asn Ser Phe Ile Ala Asp Leu Ser Lys Ile Asp Ser
                420                 425                 430

Ser Tyr Ala Ser Lys Asp Ser Leu Thr Leu Thr Tyr Gly Ser Asp Asn
            435                 440                 445

Tyr Lys Asn Val Ile Lys Ser Leu Leu Gln Phe Gly Asp Ser Phe Leu
    450                 455                 460

Lys Val Leu Leu Asp His Ile Asp Asp Asn Gly Gln Leu Thr Glu Glu
465                 470                 475                 480

Ile Asn Arg Tyr Thr Gly Phe Gln Ala Gly Ala Val Ser Leu Thr Trp
                485                 490                 495

Ser Ser Gly Ser Leu Leu Ser Ala Asn Arg Ala Arg Asn Lys Leu Ile
            500                 505                 510

Glu Leu Leu
        515

<210> SEQ ID NO 15
<211> LENGTH: 652
<212> TYPE: PRT
<213> ORGANISM: Bacillus amyloliquefaciens

<400> SEQUENCE: 15

Met Leu Leu Gln Ala Phe Leu Phe Leu Leu Ala Gly Phe Ala Ala Lys
1               5                   10                  15

Ile Ser Ala Gly Pro Ala Ala Ala Asn Ala Glu Thr Ala Asn Lys Ser
            20                  25                  30

Asn Asn Val Thr Ala Ser Ser Val Lys Asn Gly Thr Ile Leu His Ala
            35                  40                  45

Trp Asn Trp Ser Phe Asn Thr Leu Thr Gln Asn Met Lys Asp Ile Arg
    50                  55                  60

Asp Ala Gly Tyr Ala Ala Ile Gln Thr Ser Pro Ile Asn Gln Val Lys
65                  70                  75                  80

Glu Gly Asn Gln Gly Asp Lys Ser Met Arg Asn Trp Tyr Trp Leu Tyr
                85                  90                  95

Gln Pro Thr Ser Tyr Gln Ile Gly Asn Arg Tyr Leu Gly Thr Glu Gln
            100                 105                 110

Glu Phe Lys Asp Met Cys Ala Ala Ala Glu Lys Tyr Gly Val Lys Val
        115                 120                 125

Ile Val Asp Ala Val Ile Asn His Thr Thr Ser Asp Tyr Gly Ala Ile
    130                 135                 140
```

```
Ser Asp Glu Ile Lys Arg Ile Pro Asn Trp Thr His Gly Asn Thr Gln
145                 150                 155                 160

Ile Lys Asn Trp Ser Asp Arg Trp Asp Val Thr Gln Asn Ser Leu Leu
            165                 170                 175

Gly Leu Tyr Asp Trp Asn Thr Gln Asn Thr Glu Val Gln Val Tyr Leu
        180                 185                 190

Lys Arg Phe Leu Glu Arg Ala Leu Asn Asp Gly Ala Asp Gly Phe Arg
    195                 200                 205

Tyr Asp Ala Ala Lys His Ile Glu Leu Pro Asp Asp Gly Asn Tyr Gly
210                 215                 220

Ser Gln Phe Trp Pro Asn Ile Thr Asn Thr Ser Ala Glu Phe Gln Tyr
225                 230                 235                 240

Gly Glu Ile Leu Gln Asp Ser Ala Ser Arg Asp Thr Ala Tyr Ala Asn
            245                 250                 255

Tyr Met Asn Val Thr Ala Ser Asn Tyr Gly His Ser Ile Arg Ser Ala
        260                 265                 270

Leu Lys Asn Arg Asn Leu Ser Val Ser Asn Ile Ser His Tyr Ala Ser
    275                 280                 285

Asp Val Ser Ala Asp Lys Leu Val Thr Trp Val Glu Ser His Asp Thr
290                 295                 300

Tyr Ala Asn Asp Asp Glu Glu Ser Thr Trp Met Ser Asp Asp Asp Ile
305                 310                 315                 320

Arg Leu Gly Trp Ala Val Ile Gly Ser Arg Ser Gly Ser Thr Pro Leu
            325                 330                 335

Phe Phe Ser Arg Pro Glu Gly Gly Gly Asn Gly Val Arg Phe Pro Gly
        340                 345                 350

Lys Ser Gln Ile Gly Asp Arg Gly Ser Ala Leu Phe Lys Asp Gln Ala
    355                 360                 365

Ile Thr Ala Val Asn Thr Phe His Asn Val Met Ala Gly Gln Pro Glu
370                 375                 380

Glu Leu Ser Asn Pro Asn Gly Asn Asn Gln Val Phe Met Asn Gln Arg
385                 390                 395                 400

Gly Ser Lys Gly Val Val Leu Ala Asn Ala Gly Ser Ser Ser Val Thr
            405                 410                 415

Ile Asn Thr Ser Ala Lys Leu Pro Asp Gly Arg Tyr Asp Asn Arg Ala
        420                 425                 430

Gly Ala Gly Ser Phe Gln Val Ala Asn Gly Lys Leu Thr Gly Thr Ile
    435                 440                 445

Asn Ala Arg Ser Ala Ala Val Leu Tyr Pro Asp Asp Ile Gly Asn Ala
450                 455                 460

Pro His Val Phe Leu Glu Asn Tyr Gln Thr Gly Ala Val His Ser Phe
465                 470                 475                 480

Asn Asp Gln Leu Thr Val Thr Leu Arg Ala Asn Ala Lys Thr Thr Lys
            485                 490                 495

Ala Val Tyr Gln Ile Asn Asn Gly Gln Gln Thr Ala Phe Lys Asp Gly
        500                 505                 510

Asp Arg Leu Thr Ile Gly Lys Gly Asp Pro Ile Gly Thr Thr Tyr Asn
    515                 520                 525

Ile Lys Leu Thr Gly Thr Asn Gly Glu Gly Ala Ala Arg Thr Gln Glu
530                 535                 540

Tyr Thr Phe Val Lys Lys Asp Pro Ser Gln Thr Asn Ile Ile Gly Tyr
545                 550                 555                 560
```

```
Gln Asn Pro Asp His Trp Gly Gln Val Asn Ala Tyr Ile Tyr Lys His
                565                 570                 575

Asp Gly Gly Arg Ala Ile Glu Leu Thr Gly Ser Trp Pro Gly Lys Ala
            580                 585                 590

Met Thr Lys Asn Ala Asn Gly Met Tyr Thr Leu Thr Leu Pro Glu Asn
        595                 600                 605

Thr Asp Thr Ala Asn Ala Lys Val Ile Phe Asn Asn Gly Ser Ala Gln
    610                 615                 620

Val Pro Gly Gln Asn Gln Pro Gly Phe Asp Tyr Val Gln Asn Gly Leu
625                 630                 635                 640

Tyr Asn Asn Ser Gly Leu Asn Gly Tyr Leu Pro His
                645                 650
```

<210> SEQ ID NO 16
<211> LENGTH: 515
<212> TYPE: PRT
<213> ORGANISM: Artificial Sequence
<220> FEATURE:
<223> OTHER INFORMATION: Polypeptide variant
<220> FEATURE:
<221> NAME/KEY: VARIANT
<222> LOCATION: (8)..(8)
<223> OTHER INFORMATION: Any amino acid except L, preferably S
<220> FEATURE:
<221> NAME/KEY: VARIANT
<222> LOCATION: (11)..(11)
<223> OTHER INFORMATION: Any amino acid except F, preferably I
<220> FEATURE:
<221> NAME/KEY: VARIANT
<222> LOCATION: (12)..(12)
<223> OTHER INFORMATION: Xaa can be any naturally occurring amino acid
<220> FEATURE:
<221> NAME/KEY: VARIANT
<222> LOCATION: (36)..(36)
<223> OTHER INFORMATION: Any amino acid except G, preferably N, S, T, Y,
      K, P, W
<220> FEATURE:
<221> NAME/KEY: VARIANT
<222> LOCATION: (40)..(40)
<223> OTHER INFORMATION: Any amino acid except A, preferably N, S, T, Y,
      K, P, W
<220> FEATURE:
<221> NAME/KEY: VARIANT
<222> LOCATION: (101)..(101)
<223> OTHER INFORMATION: Any amino acid except F, preferably L
<220> FEATURE:
<221> NAME/KEY: VARIANT
<222> LOCATION: (277)..(277)
<223> OTHER INFORMATION: Any amino acid except F, preferably L
<220> FEATURE:
<221> NAME/KEY: VARIANT
<222> LOCATION: (487)..(487)
<223> OTHER INFORMATION: Any amino acid except F, preferably I

<400> SEQUENCE: 16

```
Met Ile Arg Leu Thr Val Phe Xaa Thr Ala Val Xaa Ala Ala Val Ala
1               5                   10                  15

Ser Cys Val Pro Val Glu Leu Asp Lys Arg Asn Thr Gly His Phe Gln
            20                  25                  30

Ala Tyr Ser Xaa Tyr Thr Val Xaa Arg Ser Asn Phe Thr Gln Trp Ile
        35                  40                  45

His Glu Gln Pro Ala Val Ser Trp Tyr Leu Leu Gln Asn Ile Asp
    50                  55                  60

Tyr Pro Glu Gly Gln Phe Lys Ser Ala Lys Pro Gly Val Val Ala
65                  70                  75                  80

Ser Pro Ser Thr Ser Glu Pro Asp Tyr Phe Tyr Gln Trp Thr Arg Asp
                85                  90                  95
```

```
Thr Ala Ile Thr Xaa Leu Ser Leu Ile Ala Glu Val Glu Asp His Ser
            100                 105                 110

Phe Ser Asn Thr Thr Leu Ala Lys Val Val Glu Tyr Tyr Ile Ser Asn
            115                 120                 125

Thr Tyr Thr Leu Gln Arg Val Ser Asn Pro Ser Gly Asn Phe Asp Ser
            130                 135                 140

Pro Asn His Asp Gly Leu Gly Glu Pro Lys Phe Asn Val Asp Asp Thr
145                 150                 155                 160

Ala Tyr Thr Ala Ser Trp Gly Arg Pro Gln Asn Asp Gly Pro Ala Leu
                165                 170                 175

Arg Ala Tyr Ala Ile Ser Arg Tyr Leu Asn Ala Val Ala Lys His Asn
                180                 185                 190

Asn Gly Lys Leu Leu Leu Ala Gly Gln Asn Gly Ile Pro Tyr Ser Ser
            195                 200                 205

Ala Ser Asp Ile Tyr Trp Lys Ile Lys Pro Asp Leu Gln His Val
            210                 215                 220

Ser Thr His Trp Ser Thr Ser Gly Phe Asp Leu Trp Glu Glu Asn Gln
225                 230                 235                 240

Gly Thr His Phe Phe Thr Ala Leu Val Gln Leu Lys Ala Leu Ser Tyr
                245                 250                 255

Gly Ile Pro Leu Ser Lys Thr Tyr Asn Asp Pro Gly Phe Thr Ser Trp
                260                 265                 270

Leu Glu Lys Gln Xaa Asp Ala Leu Asn Ser Tyr Ile Asn Ser Ser Gly
            275                 280                 285

Phe Val Asn Ser Gly Lys Lys His Ile Val Glu Ser Pro Gln Leu Ser
            290                 295                 300

Ser Arg Gly Gly Leu Asp Ser Ala Thr Tyr Ile Ala Ala Leu Ile Thr
305                 310                 315                 320

His Asp Ile Gly Asp Asp Thr Tyr Thr Pro Phe Asn Val Asp Asn
                325                 330                 335

Ser Tyr Val Leu Asn Ser Leu Tyr Tyr Leu Val Asp Asn Lys Asn
                340                 345                 350

Arg Tyr Lys Ile Asn Gly Asn Tyr Lys Ala Gly Ala Ala Val Gly Arg
                355                 360                 365

Tyr Pro Glu Asp Val Tyr Asn Gly Val Gly Thr Ser Glu Gly Asn Pro
            370                 375                 380

Trp Gln Leu Ala Thr Ala Tyr Ala Gly Gln Thr Phe Tyr Thr Leu Ala
385                 390                 395                 400

Tyr Asn Ser Leu Lys Asn Lys Asn Leu Val Ile Glu Lys Leu Asn
                405                 410                 415

Tyr Asp Leu Tyr Asn Ser Phe Ile Ala Asp Leu Ser Lys Ile Asp Ser
            420                 425                 430

Ser Tyr Ala Ser Lys Asp Ser Leu Thr Leu Thr Tyr Gly Ser Asp Asn
            435                 440                 445

Tyr Lys Asn Val Ile Lys Ser Leu Leu Gln Phe Gly Asp Ser Phe Leu
            450                 455                 460

Lys Val Leu Leu Asp His Ile Asp Asp Asn Gly Gln Leu Thr Glu Glu
465                 470                 475                 480

Ile Asn Arg Tyr Thr Gly Xaa Gln Ala Gly Ala Val Ser Leu Thr Trp
                485                 490                 495

Ser Ser Gly Ser Leu Leu Ser Ala Asn Arg Ala Arg Asn Lys Leu Ile
            500                 505                 510
```

```
Glu Leu Leu
        515

<210> SEQ ID NO 17
<211> LENGTH: 515
<212> TYPE: PRT
<213> ORGANISM: Artificial Sequence
<220> FEATURE:
<223> OTHER INFORMATION: Variant polypeptide

<400> SEQUENCE: 17

Met Ile Arg Leu Thr Val Phe Ser Thr Ala Val Ile Ala Ala Val Ala
1               5                   10                  15

Ser Cys Val Pro Val Glu Leu Asp Lys Arg Asn Thr Gly His Phe Gln
            20                  25                  30

Ala Tyr Ser Asn Tyr Thr Val Ala Arg Ser Asn Phe Thr Gln Trp Ile
        35                  40                  45

His Glu Gln Pro Ala Val Ser Trp Tyr Tyr Leu Leu Gln Asn Ile Asp
    50                  55                  60

Tyr Pro Glu Gly Gln Phe Lys Ser Ala Lys Pro Gly Val Val Val Ala
65                  70                  75                  80

Ser Pro Ser Thr Ser Glu Pro Asp Tyr Phe Tyr Gln Trp Thr Arg Asp
                85                  90                  95

Thr Ala Ile Thr Leu Leu Ser Leu Ile Ala Glu Val Glu Asp His Ser
            100                 105                 110

Phe Ser Asn Thr Thr Leu Ala Lys Val Val Glu Tyr Tyr Ile Ser Asn
        115                 120                 125

Thr Tyr Thr Leu Gln Arg Val Ser Asn Pro Ser Gly Asn Phe Asp Ser
    130                 135                 140

Pro Asn His Asp Gly Leu Gly Glu Pro Lys Phe Asn Val Asp Asp Thr
145                 150                 155                 160

Ala Tyr Thr Ala Ser Trp Gly Arg Pro Gln Asn Asp Gly Pro Ala Leu
                165                 170                 175

Arg Ala Tyr Ala Ile Ser Arg Tyr Leu Asn Ala Val Ala Lys His Asn
            180                 185                 190

Asn Gly Lys Leu Leu Leu Ala Gly Gln Asn Gly Ile Pro Tyr Ser Ser
        195                 200                 205

Ala Ser Asp Ile Tyr Trp Lys Ile Ile Lys Pro Asp Leu Gln His Val
    210                 215                 220

Ser Thr His Trp Ser Thr Ser Gly Phe Asp Leu Trp Glu Glu Asn Gln
225                 230                 235                 240

Gly Thr His Phe Phe Thr Ala Leu Val Gln Leu Lys Ala Leu Ser Tyr
                245                 250                 255

Gly Ile Pro Leu Ser Lys Thr Tyr Asn Asp Pro Gly Phe Thr Ser Trp
            260                 265                 270

Leu Glu Lys Gln Glu Asp Ala Leu Asn Ser Tyr Ile Asn Ser Ser Gly
        275                 280                 285

Phe Val Asn Ser Gly Lys Lys His Ile Val Glu Ser Pro Gln Leu Ser
    290                 295                 300

Ser Arg Gly Gly Leu Asp Ser Ala Thr Tyr Ile Ala Ala Leu Ile Thr
305                 310                 315                 320

His Asp Ile Gly Asp Asp Asp Thr Tyr Thr Pro Phe Asn Val Asp Asn
                325                 330                 335

Ser Tyr Val Leu Asn Ser Leu Tyr Tyr Leu Leu Val Asp Asn Lys Asn
            340                 345                 350
```

-continued

Arg Tyr Lys Ile Asn Gly Asn Tyr Lys Ala Gly Ala Ala Val Gly Arg
            355                 360                 365

Tyr Pro Glu Asp Val Tyr Asn Gly Val Gly Thr Ser Glu Gly Asn Pro
370                 375                 380

Trp Gln Leu Ala Thr Ala Tyr Ala Gly Gln Thr Phe Tyr Thr Leu Ala
385                 390                 395                 400

Tyr Asn Ser Leu Lys Asn Lys Asn Leu Val Ile Glu Lys Leu Asn
            405                 410                 415

Tyr Asp Leu Tyr Asn Ser Phe Ile Ala Asp Leu Ser Lys Ile Asp Ser
            420                 425                 430

Ser Tyr Ala Ser Lys Asp Ser Leu Thr Leu Thr Tyr Gly Ser Asp Asn
            435                 440                 445

Tyr Lys Asn Val Ile Lys Ser Leu Leu Gln Phe Gly Asp Ser Phe Leu
            450                 455                 460

Lys Val Leu Leu Asp His Ile Asp Asp Asn Gly Gln Leu Thr Glu Glu
465                 470                 475                 480

Ile Asn Arg Tyr Thr Gly Ile Gln Ala Gly Ala Val Ser Leu Thr Trp
            485                 490                 495

Ser Ser Gly Ser Leu Leu Ser Ala Asn Arg Ala Arg Asn Lys Leu Ile
            500                 505                 510

Glu Leu Leu
        515

<210> SEQ ID NO 18
<211> LENGTH: 515
<212> TYPE: PRT
<213> ORGANISM: Artificial Sequence
<220> FEATURE:
<223> OTHER INFORMATION: Variant polypeptide

<400> SEQUENCE: 18

Met Ile Arg Leu Thr Val Phe Leu Thr Ala Val Phe Ala Ala Val Ala
1               5                   10                  15

Ser Cys Val Pro Val Glu Leu Asp Lys Arg Asn Thr Gly His Phe Gln
            20                  25                  30

Ala Tyr Ser Gly Tyr Thr Val Asn Arg Ser Asn Phe Thr Gln Trp Ile
            35                  40                  45

His Glu Gln Pro Ala Val Ser Trp Tyr Tyr Leu Leu Gln Asn Ile Asp
    50                  55                  60

Tyr Pro Glu Gly Gln Phe Lys Ser Ala Lys Pro Gly Val Val Ala
65                  70                  75                  80

Ser Pro Ser Thr Ser Glu Pro Asp Tyr Phe Tyr Gln Trp Thr Arg Asp
                85                  90                  95

Thr Ala Ile Thr Phe Leu Ser Leu Ile Ala Glu Val Glu Asp His Ser
            100                 105                 110

Phe Ser Asn Thr Thr Leu Ala Lys Val Val Glu Tyr Tyr Ile Ser Asn
        115                 120                 125

Thr Tyr Thr Leu Gln Arg Val Ser Asn Pro Ser Gly Asn Phe Asp Ser
    130                 135                 140

Pro Asn His Asp Gly Leu Gly Glu Pro Lys Phe Asn Val Asp Asp Thr
145                 150                 155                 160

Ala Tyr Thr Ala Ser Trp Gly Arg Pro Gln Asn Asp Gly Pro Ala Leu
                165                 170                 175

Arg Ala Tyr Ala Ile Ser Arg Tyr Leu Asn Ala Val Ala Lys His Asn
            180                 185                 190

```
Asn Gly Lys Leu Leu Ala Gly Gln Asn Gly Ile Pro Tyr Ser Ser
            195                 200                 205

Ala Ser Asp Ile Tyr Trp Lys Ile Ile Lys Pro Asp Leu Gln His Val
210                 215                 220

Ser Thr His Trp Ser Thr Ser Gly Phe Asp Leu Trp Glu Glu Asn Gln
225                 230                 235                 240

Gly Thr His Phe Phe Thr Ala Leu Val Gln Leu Lys Ala Leu Ser Tyr
                245                 250                 255

Gly Ile Pro Leu Ser Lys Thr Tyr Asn Asp Pro Gly Phe Thr Ser Trp
            260                 265                 270

Leu Glu Lys Gln Lys Asp Ala Leu Asn Ser Tyr Ile Asn Ser Ser Gly
        275                 280                 285

Phe Val Asn Ser Gly Lys Lys His Ile Val Glu Ser Pro Gln Leu Ser
290                 295                 300

Ser Arg Gly Gly Leu Asp Ser Ala Thr Tyr Ile Ala Ala Leu Ile Thr
305                 310                 315                 320

His Asp Ile Gly Asp Asp Thr Tyr Thr Pro Phe Asn Val Asp Asn
                325                 330                 335

Ser Tyr Val Leu Asn Ser Leu Tyr Tyr Leu Val Asp Asn Lys Asn
            340                 345                 350

Arg Tyr Lys Ile Asn Gly Asn Tyr Lys Ala Gly Ala Ala Val Gly Arg
        355                 360                 365

Tyr Pro Glu Asp Val Tyr Asn Gly Val Gly Thr Ser Glu Gly Asn Pro
    370                 375                 380

Trp Gln Leu Ala Thr Ala Tyr Ala Gly Gln Thr Phe Tyr Thr Leu Ala
385                 390                 395                 400

Tyr Asn Ser Leu Lys Asn Lys Asn Leu Val Ile Glu Lys Leu Asn
                405                 410                 415

Tyr Asp Leu Tyr Asn Ser Phe Ile Ala Asp Leu Ser Lys Ile Asp Ser
            420                 425                 430

Ser Tyr Ala Ser Lys Asp Ser Leu Thr Leu Thr Tyr Gly Ser Asp Asn
        435                 440                 445

Tyr Lys Asn Val Ile Lys Ser Leu Leu Gln Phe Gly Asp Ser Phe Leu
    450                 455                 460

Lys Val Leu Leu Asp His Ile Asp Asp Asn Gly Gln Leu Thr Glu Glu
465                 470                 475                 480

Ile Asn Arg Tyr Thr Gly Phe Gln Ala Gly Ala Val Ser Leu Thr Trp
                485                 490                 495

Ser Ser Gly Ser Leu Leu Ser Ala Asn Arg Ala Arg Asn Lys Leu Ile
            500                 505                 510

Glu Leu Leu
        515

<210> SEQ ID NO 19
<211> LENGTH: 652
<212> TYPE: PRT
<213> ORGANISM: Artificial Sequence
<220> FEATURE:
<223> OTHER INFORMATION: MP775

<400> SEQUENCE: 19

Met Leu Leu Gln Ala Phe Leu Phe Leu Leu Ala Gly Phe Ala Ala Lys
1               5                   10                  15

Ile Ser Ala Gly Pro Ala Ala Asn Ala Glu Thr Ala Asn Lys Ser
            20                  25                  30
```

```
Asn Asn Val Thr Ala Ser Ser Val Lys Asn Gly Thr Ile Leu His Ala
         35                  40                  45

Trp Asn Trp Ser Phe Asn Thr Leu Thr Gln Asn Met Lys Asp Ile Arg
 50                  55                  60

Asp Ala Gly Tyr Ala Ala Ile Gln Thr Ser Pro Ile Asn Gln Val Lys
 65                  70                  75                  80

Glu Gly Asn Gln Gly Asp Lys Ser Met Arg Asn Trp Tyr Trp Leu Tyr
                 85                  90                  95

Gln Pro Thr Ser Tyr Gln Ile Gly Asn Arg Tyr Leu Gly Thr Glu Gln
                100                 105                 110

Glu Phe Lys Asp Met Cys Ala Ala Glu Lys Tyr Gly Val Lys Val
            115                 120                 125

Ile Val Asp Ala Val Ile Asn His Thr Thr Ser Asp Tyr Gly Ala Ile
        130                 135                 140

Ser Asp Glu Ile Lys Arg Ile Pro Asn Trp Thr His Gly Asn Thr Gln
145                 150                 155                 160

Ile Lys Asn Trp Ser Asp Arg Trp Asp Val Thr Gln Asn Ser Leu Leu
                165                 170                 175

Gly Leu Tyr Asp Trp Asn Thr Gln Asn Thr Glu Val Gln Val Tyr Leu
            180                 185                 190

Lys Arg Phe Leu Glu Arg Ala Leu Asn Asp Gly Ala Asp Gly Phe Arg
        195                 200                 205

Tyr Asp Ala Ala Lys His Ile Glu Leu Pro Asp Asp Gly Asn Tyr Gly
        210                 215                 220

Ser Gln Phe Trp Pro Asn Ile Thr Asn Thr Ser Ala Glu Phe Gln Tyr
225                 230                 235                 240

Gly Glu Ile Leu Gln Asp Ser Ala Ser Arg Asp Thr Ala Tyr Ala Asn
                245                 250                 255

Tyr Met Asn Val Thr Ala Ser Asn Tyr Gly His Ser Ile Arg Ser Ala
            260                 265                 270

Leu Lys Asn Arg Asn Leu Ser Val Ser Asn Ile Ser His Tyr Ala Ser
        275                 280                 285

Asp Val Ser Ala Asp Lys Leu Val Thr Trp Val Glu Ser His Asp Thr
290                 295                 300

Tyr Ala Asn Asp Asp Glu Glu Ser Thr Trp Met Ser Asp Asp Asp Ile
305                 310                 315                 320

Arg Leu Gly Trp Ala Val Ile Gly Ser Arg Ser Gly Ser Thr Pro Leu
                325                 330                 335

Phe Phe Ser Arg Pro Glu Gly Gly Asn Gly Val Arg Phe Pro Gly
            340                 345                 350

Lys Ser Gln Ile Gly Asp Arg Gly Ser Ala Leu Phe Lys Asp Gln Ala
                355                 360                 365

Ile Thr Ala Val Asn Thr Phe His Asn Val Met Ala Gly Gln Pro Glu
        370                 375                 380

Glu Leu Ser Asn Pro Asn Gly Asn Asn Gln Val Phe Met Asn Gln Arg
385                 390                 395                 400

Gly Ser Lys Gly Val Val Leu Ala Asn Ala Gly Ser Ser Ser Val Thr
                405                 410                 415

Ile Asn Thr Ser Ala Lys Leu Pro Asp Gly Arg Tyr Asp Asn Arg Ala
            420                 425                 430

Gly Ala Gly Ser Phe Gln Val Ala Asn Gly Lys Leu Thr Gly Thr Ile
        435                 440                 445

Asn Ala Arg Ser Ala Ala Val Leu Tyr Pro Asp Asp Ile Gly Asn Ala
```

```
                    450                 455                 460
Pro His Val Phe Leu Glu Asn Tyr Gln Thr Gly Ala Val His Ser Phe
465                 470                 475                 480

Asn Asp Gln Leu Thr Val Thr Leu Arg Ala Asn Ala Lys Thr Thr Lys
                485                 490                 495

Ala Val Tyr Gln Ile Asn Asn Gly Gln Gln Thr Ala Phe Lys Asp Gly
                500                 505                 510

Asp Arg Leu Thr Ile Gly Lys Gly Asp Pro Ile Gly Thr Thr Tyr Asn
                515                 520                 525

Ile Lys Leu Thr Gly Thr Asn Gly Glu Gly Ala Ala Arg Thr Gln Glu
                530                 535                 540

Tyr Thr Phe Val Lys Lys Asp Pro Ser Gln Thr Asn Ile Ile Gly Tyr
545                 550                 555                 560

Gln Asn Pro Asp His Trp Gly Gln Val Asn Ala Tyr Ile Tyr Lys His
                565                 570                 575

Asp Gly Gly Arg Ala Ile Glu Leu Thr Gly Ser Trp Pro Gly Lys Ala
                580                 585                 590

Met Thr Lys Asn Ala Asn Gly Met Tyr Thr Leu Thr Leu Pro Glu Asn
                595                 600                 605

Thr Asp Thr Ala Asn Ala Lys Val Ile Phe Asn Asn Gly Ser Ala Gln
                610                 615                 620

Val Pro Gly Gln Asn Gln Pro Gly Phe Asp Tyr Val Gln Asn Gly Leu
625                 630                 635                 640

Tyr Asn Asn Ser Gly Leu Asn Gly Tyr Leu Pro His
                645                 650

<210> SEQ ID NO 20
<211> LENGTH: 338
<212> TYPE: PRT
<213> ORGANISM: Artificial Sequence
<220> FEATURE:
<223> OTHER INFORMATION: Consensus sequence of Figure 7A
<220> FEATURE:
<221> NAME/KEY: VARIANT
<222> LOCATION: (1)..(1)
<223> OTHER INFORMATION: Xaa can be present or absent, when present any
      naturally occurring amino acid, preferably M
<220> FEATURE:
<221> NAME/KEY: VARIANT
<222> LOCATION: (2)..(2)
<223> OTHER INFORMATION: Xaa can be present or absent, when present any
      naturally occurring amino acid, preferably M or V
<220> FEATURE:
<221> NAME/KEY: VARIANT
<222> LOCATION: (3)..(3)
<223> OTHER INFORMATION: Xaa can be present or absent, when present any
      naturally occurring amino acid, preferably A
<220> FEATURE:
<221> NAME/KEY: VARIANT
<222> LOCATION: (4)..(4)
<223> OTHER INFORMATION: Xaa can be present or absent, when present any
      naturally occurring amino acid, preferably A
<220> FEATURE:
<221> NAME/KEY: VARIANT
<222> LOCATION: (5)..(5)
<223> OTHER INFORMATION: Xaa can be present or absent, when present any
      naturally occurring amino acid, preferably R
<220> FEATURE:
<221> NAME/KEY: VARIANT
<222> LOCATION: (6)..(6)
<223> OTHER INFORMATION: Xaa can be present or absent, when present any
      naturally occurring amino acid, preferably V or T
<220> FEATURE:
<221> NAME/KEY: VARIANT
<222> LOCATION: (7)..(7)
<223> OTHER INFORMATION: Xaa can be present or absent, when present any
``` naturally occurring amino acid, preferably D
<220> FEATURE:
<221> NAME/KEY: VARIANT
<222> LOCATION: (8)..(8)
<223> OTHER INFORMATION: Xaa can be present or absent, when present any
      naturally occurring amino acid, preferably F or S
<220> FEATURE:
<221> NAME/KEY: VARIANT
<222> LOCATION: (9)..(9)
<223> OTHER INFORMATION: Xaa can be present or absent, when present any
      naturally occurring amino acid, preferably G
<220> FEATURE:
<221> NAME/KEY: VARIANT
<222> LOCATION: (10)..(10)
<223> OTHER INFORMATION: Xaa can be present or absent, when present any
      naturally occurring amino acid, preferably I or V
<220> FEATURE:
<221> NAME/KEY: VARIANT
<222> LOCATION: (11)..(11)
<223> OTHER INFORMATION: Xaa can be present or absent, when present any
      naturally occurring amino acid, preferably G
<220> FEATURE:
<221> NAME/KEY: VARIANT
<222> LOCATION: (12)..(12)
<223> OTHER INFORMATION: Xaa can be present or absent, when present any
      naturally occurring amino acid, preferably G or T
<220> FEATURE:
<221> NAME/KEY: VARIANT
<222> LOCATION: (14)..(14)
<223> OTHER INFORMATION: Xaa can be any naturally occurring amino acid,
      preferably T or A
<220> FEATURE:
<221> NAME/KEY: VARIANT
<222> LOCATION: (18)..(18)
<223> OTHER INFORMATION: Xaa can be any naturally occurring amino acid,
      preferably R or K
<220> FEATURE:
<221> NAME/KEY: VARIANT
<222> LOCATION: (19)..(19)
<223> OTHER INFORMATION: Xaa can be any naturally occurring amino acid,
      preferably T, P, S or L
<220> FEATURE:
<221> NAME/KEY: VARIANT
<222> LOCATION: (23)..(23)
<223> OTHER INFORMATION: Xaa can be any naturally occurring amino acid,
      preferably N, C, K, R or V
<220> FEATURE:
<221> NAME/KEY: VARIANT
<222> LOCATION: (117)..(117)
<223> OTHER INFORMATION: Xaa can be any naturally occurring amino acid,
      preferably D, N, H, I or N
<220> FEATURE:
<221> NAME/KEY: VARIANT
<222> LOCATION: (118)..(118)
<223> OTHER INFORMATION: Xaa can be any naturally occurring amino acid,
      preferably R, Y, T or D
<220> FEATURE:
<221> NAME/KEY: VARIANT
<222> LOCATION: (132)..(132)
<223> OTHER INFORMATION: Xaa can be any naturally occurring amino acid,
      preferably N, S, G or K
<220> FEATURE:
<221> NAME/KEY: VARIANT
<222> LOCATION: (134)..(134)
<223> OTHER INFORMATION: Xaa can be any naturally occurring amino acid,
      preferably K, V, G, N, S or A
<220> FEATURE:
<221> NAME/KEY: VARIANT
<222> LOCATION: (137)..(137)
<223> OTHER INFORMATION: Xaa can be any naturally occurring amino acid,
      preferably G, S, N or K
<220> FEATURE:
<221> NAME/KEY: VARIANT
<222> LOCATION: (140)..(140)
<223> OTHER INFORMATION: Xaa can be present or absent, when present any
      naturally occurring amino acid, preferably D
<220> FEATURE:
<221> NAME/KEY: VARIANT
<222> LOCATION: (141)..(141)

```
<223> OTHER INFORMATION: Xaa can be present or absent, when present any
      naturally occurring amino acid, preferably I
<220> FEATURE:
<221> NAME/KEY: VARIANT
<222> LOCATION: (143)..(143)
<223> OTHER INFORMATION: Xaa can be any naturally occurring amino acid,
      preferably K, A, I, T, S or D
<220> FEATURE:
<221> NAME/KEY: VARIANT
<222> LOCATION: (149)..(149)
<223> OTHER INFORMATION: Xaa can be any naturally occurring amino acid,
      preferably P, V, L or S
<220> FEATURE:
<221> NAME/KEY: VARIANT
<222> LOCATION: (155)..(155)
<223> OTHER INFORMATION: Xaa can be any naturally occurring amino acid,
      preferably F, S, L or N
<220> FEATURE:
<221> NAME/KEY: VARIANT
<222> LOCATION: (156)..(156)
<223> OTHER INFORMATION: Xaa can be any naturally occurring amino acid,
      preferably S, L, P or G
<220> FEATURE:
<221> NAME/KEY: VARIANT
<222> LOCATION: (165)..(165)
<223> OTHER INFORMATION: Xaa can be present or absent, when present any
      naturally occurring amino acid, preferably P
<220> FEATURE:
<221> NAME/KEY: VARIANT
<222> LOCATION: (166)..(166)
<223> OTHER INFORMATION: Xaa can be present or absent, when present any
      naturally occurring amino acid, preferably L
<220> FEATURE:
<221> NAME/KEY: VARIANT
<222> LOCATION: (170)..(170)
<223> OTHER INFORMATION: Xaa can be present or absent, when present any
      naturally occurring amino acid, preferably N
<220> FEATURE:
<221> NAME/KEY: VARIANT
<222> LOCATION: (171)..(171)
<223> OTHER INFORMATION: Xaa can be present or absent, when present any
      naturally occurring amino acid, preferably V
<220> FEATURE:
<221> NAME/KEY: VARIANT
<222> LOCATION: (172)..(172)
<223> OTHER INFORMATION: Xaa can be present or absent, when present any
      naturally occurring amino acid, preferably P
<220> FEATURE:
<221> NAME/KEY: VARIANT
<222> LOCATION: (173)..(173)
<223> OTHER INFORMATION: Xaa can be present or absent, when present any
      naturally occurring amino acid, preferably L
<220> FEATURE:
<221> NAME/KEY: VARIANT
<222> LOCATION: (174)..(174)
<223> OTHER INFORMATION: Xaa can be present or absent, when present any
      naturally occurring amino acid, preferably P
<220> FEATURE:
<221> NAME/KEY: VARIANT
<222> LOCATION: (175)..(175)
<223> OTHER INFORMATION: Xaa can be present or absent, when present any
      naturally occurring amino acid, preferably D
<220> FEATURE:
<221> NAME/KEY: VARIANT
<222> LOCATION: (214)..(214)
<223> OTHER INFORMATION: Xaa can be any naturally occurring amino acid,
      preferably P, S, L or D
<220> FEATURE:
<221> NAME/KEY: VARIANT
<222> LOCATION: (219)..(219)
<223> OTHER INFORMATION: Xaa can be any naturally occurring amino acid,
      preferably S, C, Q or P
<220> FEATURE:
<221> NAME/KEY: VARIANT
<222> LOCATION: (220)..(220)
<223> OTHER INFORMATION: Xaa can be any naturally occurring amino acid,
      preferably L, T, A or S
<220> FEATURE:
<221> NAME/KEY: VARIANT
```

```
<222> LOCATION: (224)..(224)
<223> OTHER INFORMATION: Xaa can be any naturally occurring amino acid,
      preferably E, V, A or P
<220> FEATURE:
<221> NAME/KEY: VARIANT
<222> LOCATION: (229)..(229)
<223> OTHER INFORMATION: Xaa can be present or absent, when present any
      naturally occurring amino acid, preferably Q
<220> FEATURE:
<221> NAME/KEY: VARIANT
<222> LOCATION: (230)..(230)
<223> OTHER INFORMATION: Xaa can be present or absent, when present any
      naturally occurring amino acid, preferably K
<220> FEATURE:
<221> NAME/KEY: VARIANT
<222> LOCATION: (231)..(231)
<223> OTHER INFORMATION: Xaa can be present or absent, when present any
      naturally occurring amino acid, preferably S
<220> FEATURE:
<221> NAME/KEY: VARIANT
<222> LOCATION: (232)..(232)
<223> OTHER INFORMATION: Xaa can be present or absent, when present any
      naturally occurring amino acid, preferably D
<220> FEATURE:
<221> NAME/KEY: VARIANT
<222> LOCATION: (233)..(233)
<223> OTHER INFORMATION: Xaa can be present or absent, when present any
      naturally occurring amino acid, preferably T
<220> FEATURE:
<221> NAME/KEY: VARIANT
<222> LOCATION: (234)..(234)
<223> OTHER INFORMATION: Xaa can be present or absent, when present any
      naturally occurring amino acid, preferably L
<220> FEATURE:
<221> NAME/KEY: VARIANT
<222> LOCATION: (235)..(235)
<223> OTHER INFORMATION: Xaa can be present or absent, when present any
      naturally occurring amino acid, preferably L
<220> FEATURE:
<221> NAME/KEY: VARIANT
<222> LOCATION: (236)..(236)
<223> OTHER INFORMATION: Xaa can be present or absent, when present any
      naturally occurring amino acid, preferably Q
<220> FEATURE:
<221> NAME/KEY: VARIANT
<222> LOCATION: (237)..(237)
<223> OTHER INFORMATION: Xaa can be present or absent, when present any
      naturally occurring amino acid, preferably Q
<220> FEATURE:
<221> NAME/KEY: VARIANT
<222> LOCATION: (238)..(238)
<223> OTHER INFORMATION: Xaa can be present or absent, when present any
      naturally occurring amino acid, preferably I
<220> FEATURE:
<221> NAME/KEY: VARIANT
<222> LOCATION: (239)..(239)
<223> OTHER INFORMATION: Xaa can be present or absent, when present any
      naturally occurring amino acid, preferably Q
<220> FEATURE:
<221> NAME/KEY: VARIANT
<222> LOCATION: (240)..(240)
<223> OTHER INFORMATION: Xaa can be present or absent, when present any
      naturally occurring amino acid, preferably D
<220> FEATURE:
<221> NAME/KEY: VARIANT
<222> LOCATION: (241)..(241)
<223> OTHER INFORMATION: Xaa can be present or absent, when present any
      naturally occurring amino acid, preferably K
<220> FEATURE:
<221> NAME/KEY: VARIANT
<222> LOCATION: (242)..(242)
<223> OTHER INFORMATION: Xaa can be present or absent, when present any
      naturally occurring amino acid, preferably P
<220> FEATURE:
<221> NAME/KEY: VARIANT
<222> LOCATION: (243)..(243)
<223> OTHER INFORMATION: Xaa can be present or absent, when present any
      naturally occurring amino acid, preferably V
<220> FEATURE:
```

-continued

```
<221> NAME/KEY: VARIANT
<222> LOCATION: (244)..(244)
<223> OTHER INFORMATION: Xaa can be present or absent, when present any
      naturally occurring amino acid, preferably L
<220> FEATURE:
<221> NAME/KEY: VARIANT
<222> LOCATION: (255)..(255)
<223> OTHER INFORMATION: Xaa can be any naturally occurring amino acid,
      preferably F, L, P or A
<220> FEATURE:
<221> NAME/KEY: VARIANT
<222> LOCATION: (266)..(266)
<223> OTHER INFORMATION: Xaa can be any naturally occurring amino acid,
      preferably V, S, G or D
<220> FEATURE:
<221> NAME/KEY: VARIANT
<222> LOCATION: (267)..(267)
<223> OTHER INFORMATION: Xaa can be present or absent, when present any
      naturally occurring amino acid, preferably D, N, K, H or Y
<220> FEATURE:
<221> NAME/KEY: VARIANT
<222> LOCATION: (289)..(289)
<223> OTHER INFORMATION: Xaa can be any naturally occurring amino acid,
      preferably S, T, I or C
<220> FEATURE:
<221> NAME/KEY: VARIANT
<222> LOCATION: (305)..(305)
<223> OTHER INFORMATION: Xaa can be any naturally occurring amino acid,
      preferably D or E
<220> FEATURE:
<221> NAME/KEY: VARIANT
<222> LOCATION: (330)..(330)
<223> OTHER INFORMATION: Xaa can be any naturally occurring amino acid,
      preferably S or N
<220> FEATURE:
<221> NAME/KEY: VARIANT
<222> LOCATION: (338)..(338)
<223> OTHER INFORMATION: Xaa can be present or absent, when any
      naturally occurring amino acid, preferably P

<400> SEQUENCE: 20

Xaa Xaa Xaa Xaa Xaa Xaa Xaa Xaa Xaa Xaa Xaa Xaa Met Xaa Asn Thr
 1               5                  10                  15

Lys Xaa Xaa Lys Ser Arg Xaa Tyr Lys Cys Ser Phe Glu Gly Cys Glu
            20                  25                  30

Lys Glu Tyr Asn Arg Pro Ser Leu Leu Gln Gln His Gln Asn Ser His
        35                  40                  45

Thr Asn Gln Lys Pro Tyr His Cys Asp Glu Pro Gly Cys Gly Lys Lys
    50                  55                  60

Phe Ile Arg Pro Cys His Leu Arg Val His Lys Trp Thr His Ser Gln
65                  70                  75                  80

Ile Lys Pro Lys Pro Cys Thr Leu Cys Glu Lys Arg Phe Val Thr Asn
                85                  90                  95

Gln Gln Leu Lys Arg His Leu Asn Ser His Glu Arg Lys Ser Lys Leu
            100                 105                 110

Ala Ser Lys Ile Xaa Xaa Lys His Glu Glu Pro Asn Pro Asn Ile Lys
        115                 120                 125

Ala Glu Leu Xaa Gly Xaa Glu Gly Xaa Leu Asp Xaa Xaa Pro Xaa Leu
    130                 135                 140

Pro Ser Gly Ser Xaa Met His Asp Glu Xaa Xaa Gln Gly His Leu
145                 150                 155                 160

Pro Gly Ser Asp Xaa Xaa Asp Met Gln Xaa Xaa Xaa Xaa Xaa Xaa Val
                165                 170                 175

Leu Gln Cys Pro Tyr Lys Ser Cys Gln Lys Val Thr Ser Phe Asn Asp
            180                 185                 190

Asp Leu Ile Asn His Met Leu Gln His His Ile Ala Ser Lys Leu Val
```

```
                195                 200                 205
Val Pro Ser Glu Glu Xaa His Leu Lys Lys Xaa Xaa Pro Thr Ser Xaa
210                 215                 220
Lys Ser Ser Ser Xaa Xaa Xaa Xaa Xaa Xaa Xaa Xaa Xaa Xaa Xaa Xaa
225                 230                 235                 240
Xaa Xaa Xaa Xaa Thr Asp Ile Thr Ser Ile Pro Gln Leu Ser Xaa Ser
                245                 250                 255
Thr Thr Gly Thr Ser Ser Asp Ser Xaa Xaa Ser Thr Thr Ala Gln
            260                 265                 270
Ser Pro Asp Asp Pro Glu Ser Tyr Trp Ser Asp Asn Arg Cys Lys His
            275                 280                 285
Xaa Asp Cys Gln Glu Leu Ser Pro Phe Ala Ser Val Phe Asp Leu Ile
290                 295                 300
Xaa His Tyr Asp His Thr His Ala Phe Ile Pro Glu Thr Leu Val Lys
305                 310                 315                 320
Tyr Ser Tyr Ile His Leu Tyr Lys Pro Xaa Val Trp Gly Leu Phe Glu
                325                 330                 335
Tyr Xaa

<210> SEQ ID NO 21
<211> LENGTH: 480
<212> TYPE: PRT
<213> ORGANISM: Candida glabrata

<400> SEQUENCE: 21

Met Ser Tyr Asn Gln Gly Lys Glu Phe Ile Thr Glu Leu Gly Lys Thr
1               5                   10                  15
Pro Met Lys Tyr Ile Ile Glu Pro Thr Val Gly Leu Ala Asn Asn Leu
            20                  25                  30
Thr Pro His Gly Asp Thr Val Val Asp Glu Ala Lys Lys Ala Lys Lys
        35                  40                  45
Gly Arg Thr Lys Ser Gly Arg Lys Tyr Val Cys Gln Ile Asp Gly Cys
    50                  55                  60
Lys Arg Glu Phe Ser Val Pro Ser Leu Leu Ala Gln His Arg Asn Ala
65                  70                  75                  80
His Thr Asp Glu Arg Pro Tyr Val Cys Asp Glu Pro Asn Cys Gly Lys
                85                  90                  95
Arg Phe Leu Arg Pro Cys His Leu Arg Val His Lys Trp Thr His Ala
            100                 105                 110
Gln Val Lys Pro Leu Lys Cys Ser Tyr Cys Glu Arg Arg Phe Ile Thr
        115                 120                 125
Asn Gln Gln Leu Lys Arg His Thr Asn Thr His Glu Arg Arg Ile Ala
    130                 135                 140
Ala Ser Lys Lys Lys Glu Thr Glu Ala Ala Met Arg Met Met Val Gly
145                 150                 155                 160
Leu Pro Pro Lys Asn Asn Lys Pro Lys Lys Ser Pro Thr Thr Thr Leu
                165                 170                 175
Leu Asn Glu Ala Asn Glu Thr Asn Gly Thr Val Asn Gly Ala Ala Asn
            180                 185                 190
Gly Thr Thr Asn Gly Val Ile Asn Gly Thr Asp Gly Val Ala Asn Gly
        195                 200                 205
Thr Ala Asn Asp Thr Ala Asn Gly Val Thr Asn Gly Val Thr Asn Gly
    210                 215                 220
Val Thr Asn Gly Val Thr Asn Gly Val Ala Asn Gly Val Thr Asn Ser
```

```
                225                 230                 235                 240
Ile Thr Asn Gly Asn Asp Ile Val Asn Gly Asn Asn Tyr Asn Thr Asp
                245                 250                 255

Lys Phe Asp Asp Asn Gly Leu Asn Gly Leu Ala Thr Gly Ile His Thr
            260                 265                 270

Ile Asn Leu Gln Asp Leu Gly Phe Ser Asp Ile Asn Gly Tyr Arg Leu
        275                 280                 285

Asn Asn Thr Ser Leu Leu Ser Asp Pro Val Ile Asp Val Asp Gly Asn
    290                 295                 300

Gly Leu Arg Phe Arg Ile Lys Cys Pro Tyr Phe Asp Cys Asp Ala Ile
305                 310                 315                 320

Leu Gly Pro Asn Glu Asp Ile Met Asn His Leu Leu Glu Met His Leu
                325                 330                 335

Val Ser Arg Leu Glu Lys Asp Pro Thr Val Asp Gly Glu Leu Phe Tyr
            340                 345                 350

Ser Pro Asn Ser Val Val Asn Asn Ser Leu Ser Leu Ser Asp Thr Ala
        355                 360                 365

Thr Ser Pro Ser Ser Asp Gly Lys Ser Asp Thr Ser Tyr Leu Leu Asp
    370                 375                 380

Gly Arg Ile Gln Asp Lys Thr Asp Lys Cys Phe Ser Glu Thr Ile
385                 390                 395                 400

Pro Asn Asp Ile Ser Tyr Tyr Arg Asn Asn Glu Thr Val Leu Asn Ile
                405                 410                 415

Ser Asp His Glu Glu Ala Ser Ser Trp Asn Asp Leu Arg Cys Arg Glu
            420                 425                 430

Ala His Cys Lys Asp Leu Pro Lys Phe Asn Asn Val Phe Val Leu Ile
        435                 440                 445

Glu His Tyr Asp Gln Asp His Ala Phe Ile Pro Glu Ser Leu Val Lys
    450                 455                 460

Phe Gly Tyr Leu His Leu Tyr Ala Pro Asp Val Gln Asp Gly Val Leu
465                 470                 475                 480

<210> SEQ ID NO 22
<211> LENGTH: 449
<212> TYPE: PRT
<213> ORGANISM: Scheffersomyces stipitis

<400> SEQUENCE: 22

Met Ser Ser Asp Thr Ala Ser Val Thr Ser Thr Gly Ser Ser Ala Leu
1               5                   10                  15

Pro Lys Lys Tyr Leu Cys Asp Phe Glu Gly Cys Thr Lys Ala Tyr Ala
            20                  25                  30

Lys Pro Ser Leu Leu Glu Gln His Lys Arg Ser His Thr Asn Glu Arg
        35                  40                  45

Pro Tyr Lys Cys Ser Ser Pro Asp Cys Gly Lys Ser Phe Met Arg Gln
    50                  55                  60

Ser His Leu Asp Ala His Leu Leu Ser His Ala Asp Asn Gly Thr Lys
65                  70                  75                  80

Pro Tyr His Cys Ser Val Cys Gly Lys Gly Val Asn Ser Leu Gln His
                85                  90                  95

Leu Lys Arg His Glu Ile Thr His Thr Lys Ser Phe Val Cys Thr His
            100                 105                 110

Glu Gly Cys Ser Glu Ser Phe Tyr Lys His Gln Ser Leu Arg His His
        115                 120                 125
```

```
Ile Leu Ser Val His Glu Arg Thr Leu Ser Cys Ser Ile Cys Asn Lys
    130                 135                 140

Asn Phe Ser Arg Pro Tyr Arg Leu Ala Gln His Asn Leu Lys Tyr His
145                 150                 155                 160

Ser Asp Ser Pro Ala Tyr Gln Cys Asp His Ala Gly Cys Phe Ser Asn
                165                 170                 175

Phe Lys Thr Trp Ser Ala Leu Gln Leu His Ile Lys Thr Glu His Pro
            180                 185                 190

Lys Leu Lys Cys Pro Val Cys Gly Lys Gly Val Gly Arg Lys Gly
                195                 200                 205

Leu Arg Ser His Met Ile Ser His Asp Glu Glu Lys Met Ile Lys Leu
    210                 215                 220

Trp Asn Cys Asn Tyr Cys Asn Ile Gly Lys Phe Ser Lys Lys Ile Asp
225                 230                 235                 240

Leu Val Glu His Tyr Asn Ser Leu His Asp Gly Asn Ile Pro Glu Asp
                245                 250                 255

Leu Leu Lys Pro Asn Glu Lys Met Arg Leu Glu Leu Leu Ser Glu
            260                 265                 270

Thr Asp Asp Val Thr Asn Leu Ala Asp Leu Lys Ser Leu Pro Gly Ser
    275                 280                 285

Arg Tyr Glu Phe Leu Asp Glu Glu Asp Glu Gln Glu Leu Val
                290                 295                 300

Leu Glu Asn Arg Phe Glu Ala Pro Asn Ser Ile Lys Ser Met Asp Ser
305                 310                 315                 320

Phe Glu Asn Ser Leu Arg Arg Ile Ser Val Ile Gly Leu Ile Ser Asn
                325                 330                 335

Asn Phe Ser Ser Lys Thr Ile Lys Cys Pro Lys Lys Asn Cys Ala Arg
            340                 345                 350

Ala Phe Ser Arg Glu Tyr Asp Leu Thr Arg His Leu Lys Trp His Glu
                355                 360                 365

Glu His Met Lys Lys Ile Glu Asp Phe Leu Asn Ser Val Glu Lys Glu
    370                 375                 380

Glu Thr Ile Ser Pro Ser Lys Ile Glu Asp Asp Glu Tyr Asp Ser Ala
385                 390                 395                 400

Ser Glu Pro Pro Ser Lys Arg Gln Lys Leu Pro Ala Arg Tyr Glu Thr
                405                 410                 415

Leu Thr Asn Asp Asn Asp Asn Asp Asn Asp Asn Asp Asp Leu Asp
            420                 425                 430

Ala Leu Ile Asp Val Glu Leu Arg Ser Ile Lys Ala Gly Asp Ser Ser
    435                 440                 445

Phe
```

```
<210> SEQ ID NO 23
<211> LENGTH: 465
<212> TYPE: PRT
<213> ORGANISM: Artificial Sequence
<220> FEATURE:
<223> OTHER INFORMATION: Consensus sequence of Figure 7C
<220> FEATURE:
<221> NAME/KEY: VARIANT
<222> LOCATION: (1)..(1)
<223> OTHER INFORMATION: Xaa can be present or absent, when present any
      naturally occurring amino acid, preferably M
<220> FEATURE:
<221> NAME/KEY: VARIANT
<222> LOCATION: (2)..(2)
<223> OTHER INFORMATION: Xaa can be present or absent, when present any
      naturally occurring amino acid, preferably L
```

```
<220> FEATURE:
<221> NAME/KEY: VARIANT
<222> LOCATION: (8)..(8)
<223> OTHER INFORMATION: Xaa can be any naturally occurring amino acid,
      preferably V, M, A or P
<220> FEATURE:
<221> NAME/KEY: VARIANT
<222> LOCATION: (35)..(35)
<223> OTHER INFORMATION: Xaa can be any naturally occurring amino acid,
      preferably S or N
<220> FEATURE:
<221> NAME/KEY: VARIANT
<222> LOCATION: (79)..(79)
<223> OTHER INFORMATION: Xaa can be any naturally occurring amino acid,
      preferably R or K
<220> FEATURE:
<221> NAME/KEY: VARIANT
<222> LOCATION: (115)..(115)
<223> OTHER INFORMATION: Xaa can be any naturally occurring amino acid,
      preferably A, E, K or N
<220> FEATURE:
<221> NAME/KEY: VARIANT
<222> LOCATION: (119)..(119)
<223> OTHER INFORMATION: Xaa can be any naturally occurring amino acid,
      preferably K, S, R or H
<220> FEATURE:
<221> NAME/KEY: VARIANT
<222> LOCATION: (207)..(207)
<223> OTHER INFORMATION: Xaa can be any naturally occurring amino acid,
      preferably F, G or A
<220> FEATURE:
<221> NAME/KEY: VARIANT
<222> LOCATION: (208)..(208)
<223> OTHER INFORMATION: Xaa can be any naturally occurring amino acid,
      preferably H, I, T or R
<220> FEATURE:
<221> NAME/KEY: VARIANT
<222> LOCATION: (283)..(283)
<223> OTHER INFORMATION: Xaa can be any naturally occurring amino acid,
      preferably G, S, E or D
<220> FEATURE:
<221> NAME/KEY: VARIANT
<222> LOCATION: (291)..(291)
<223> OTHER INFORMATION: Xaa can be present or absent, when present any
      naturally occurring amino acid, preferably G
<220> FEATURE:
<221> NAME/KEY: VARIANT
<222> LOCATION: (339)..(339)
<223> OTHER INFORMATION: Xaa can be any naturally occurring amino acid,
      preferably K, E or T
<220> FEATURE:
<221> NAME/KEY: VARIANT
<222> LOCATION: (342)..(342)
<223> OTHER INFORMATION: Xaa can be any naturally occurring amino acid,
      preferably I, T, V or Q
<220> FEATURE:
<221> NAME/KEY: VARIANT
<222> LOCATION: (409)..(409)
<223> OTHER INFORMATION: Xaa can be any naturally occurring amino acid,
      preferably L or S
<220> FEATURE:
<221> NAME/KEY: VARIANT
<222> LOCATION: (416)..(416)
<223> OTHER INFORMATION: Xaa can be any naturally occurring amino acid,
      preferably S, T or L
<220> FEATURE:
<221> NAME/KEY: VARIANT
<222> LOCATION: (431)..(431)
<223> OTHER INFORMATION: Xaa can be any naturally occurring amino acid,
      preferably E or G
<220> FEATURE:
<221> NAME/KEY: VARIANT
<222> LOCATION: (433)..(433)
<223> OTHER INFORMATION: Xaa can be any naturally occurring amino acid,
      preferably G, N, A or C
<220> FEATURE:
<221> NAME/KEY: VARIANT
<222> LOCATION: (440)..(440)
<223> OTHER INFORMATION: Xaa can be any naturally occurring amino acid,
```

-continued

```
        preferably T, F, A, I or L
<220> FEATURE:
<221> NAME/KEY: VARIANT
<222> LOCATION: (445)..(445)
<223> OTHER INFORMATION: Xaa can be present or absent, when present any
      naturally occurring amino acid, preferably N
<220> FEATURE:
<221> NAME/KEY: VARIANT
<222> LOCATION: (464)..(464)
<223> OTHER INFORMATION: Xaa can be any naturally occurring amino acid,
      preferably S
<220> FEATURE:
<221> NAME/KEY: VARIANT
<222> LOCATION: (465)..(465)
<223> OTHER INFORMATION: Xaa can be any naturally occurring amino acid,
      preferably H

<400> SEQUENCE: 23

Xaa Xaa Met Val Ala Ser Trp Xaa Leu Ala Val Thr Arg Gln Phe Asp
 1               5                  10                  15

Pro Phe Met Phe Val Met Val Met Gly Val Gly Ile Ser Ser Asn Ile
            20                  25                  30

Leu Tyr Xaa Phe Pro Tyr Pro Ala Arg Trp Leu Arg Ile Cys Ser Tyr
        35                  40                  45

Ile Met Phe Ala Ile Thr Cys Leu Ile Phe Ile Ala Val Gln Ala Leu
 50                  55                  60

Gln Leu Leu His Leu Ile Val Tyr Ile Lys Glu Lys Ser Phe Xaa Glu
 65                  70                  75                  80

Tyr Phe Asn Asp Phe Phe Arg Asn Met Lys His Asn Leu Phe Trp Gly
                85                  90                  95

Thr Tyr Pro Met Gly Leu Val Thr Ile Ile Asn Phe Leu Gly Ala Leu
            100                 105                 110

Ser Lys Xaa Tyr Thr Thr Xaa Ser Pro Thr Asn Ala Arg Asn Leu Met
        115                 120                 125

Ile Phe Val Tyr Val Leu Trp Trp Tyr Asp Leu Ala Val Cys Leu Val
130                 135                 140

Ile Ala Trp Gly Ile Ser Phe Leu Ile Trp His Asp Tyr Tyr Ser Leu
145                 150                 155                 160

Glu Gly Ile Gly Asn Tyr Pro Ser Tyr Asn Ile Arg Met Ala Ser Glu
                165                 170                 175

Asn Met Lys Ser Val Leu Leu Leu Asp Ile Ile Pro Leu Val Val Val
            180                 185                 190

Ala Ser Ser Cys Gly Thr Phe Thr Met Ser Glu Ile Phe Gly Xaa Xaa
        195                 200                 205

Phe Asn Arg Asn Ile Gln Leu Ile Thr Leu Val Ile Cys Ala Leu Thr
210                 215                 220

Trp Leu His Ala Ile Ile Phe Val Phe Ile Leu Ile Thr Ile Tyr Phe
225                 230                 235                 240

Trp Ser Leu Tyr Ile Asn Lys Ile Pro Pro Met Thr Gln Val Phe Thr
                245                 250                 255

Leu Phe Leu Leu Leu Gly Pro Met Gly Gln Gly Ser Phe Gly Val Leu
            260                 265                 270

Leu Leu Thr Asp Asn Ile Lys Lys Tyr Val Xaa Lys Tyr Tyr Pro Thr
        275                 280                 285

Asp Asn Xaa Ile Thr Arg Glu Gln Glu Ile Leu Thr Ile Ala Val Pro
290                 295                 300

Trp Cys Phe Lys Val Leu Gly Met Ile Ser Ala Met Ala Leu Leu Ala
305                 310                 315                 320
```

```
Met Gly Tyr Phe Phe Thr Val Ile Ser Val Ser Ile Leu Ser Tyr
                325                 330                 335

Tyr Asn Xaa Arg Glu Xaa Glu Asn Glu Thr Gly Lys Val Lys Arg Val
            340                 345                 350

Tyr Thr Phe His Lys Gly Phe Trp Gly Met Thr Phe Pro Met Gly Thr
        355                 360                 365

Met Ser Leu Gly Asn Glu Glu Leu Tyr Val Gln Tyr Asn Gln Tyr Val
    370                 375                 380

Pro Leu Tyr Ala Phe Arg Val Leu Gly Thr Ile Tyr Gly Gly Ile Cys
385                 390                 395                 400

Val Cys Trp Ser Ile Leu Cys Leu Xaa Cys Thr Leu Tyr Glu Tyr Xaa
                405                 410                 415

Lys Lys Ala Leu His Ala Ala Arg Lys Ser Ser Leu Phe Ser Xaa Glu
            420                 425                 430

Xaa Gly Thr Glu Lys Thr Thr Xaa Ser Pro Tyr Asn Xaa Ser Ile Glu
        435                 440                 445

Ser Val Glu Glu Ser Asn Ser Ala Leu Asp Phe Thr Arg Leu Ala Xaa
    450                 455                 460

Xaa
465

<210> SEQ ID NO 24
<211> LENGTH: 451
<212> TYPE: PRT
<213> ORGANISM: Candida glabrata

<400> SEQUENCE: 24

Met Arg Arg Leu Met Lys Gln Leu Val Arg Asp Phe Glu Pro Phe Met
1               5                   10                  15

Phe Val Met Val Met Ala Ser Gly Ile Ser Ser Asn Leu Leu Tyr Asp
                20                  25                  30

Phe Ala Phe Pro Ser His Trp Met Arg Val Cys Ser Tyr Ile Met Phe
            35                  40                  45

Gly Ile Ala Cys Ala Ile Phe Ile Val Leu Gln Ile Tyr Val Phe Val
        50                  55                  60

His Ala Tyr Tyr Ser Ile Lys Lys Asp Ser Phe Lys Val Tyr Phe Lys
65                  70                  75                  80

Arg Tyr Tyr Ala Gly Val Thr Tyr Gly Pro Phe Trp Gly Ala Tyr Pro
                85                  90                  95

Met Gly Leu Ala Thr Ile Ile Asn Tyr Ile Ser Phe Leu Ala Asn Asn
            100                 105                 110

Glu Ala Ala Gly Thr Gly Asn Ala Lys Arg Leu Ile Val Leu Ala Tyr
        115                 120                 125

Ala Leu Trp Trp Tyr Asp Gln Leu Ile Ser Leu Thr Ala Trp Gly
    130                 135                 140

Val Ser Phe Leu Ile Trp Gln Lys Tyr Asp Phe Asp Lys Asn Asp Ile
145                 150                 155                 160

Ser Pro His Val Thr Pro Asn Gln Lys Ser Ala Ala Glu Thr Leu Lys
                165                 170                 175

Ser Val Leu Leu Leu Gly Val Ile Pro Leu Val Val Ala Ser Ser Ser
            180                 185                 190

Leu Gly Gly Phe Thr Met Ser Pro Ile Phe Ile Lys Tyr Phe Gly Arg
        195                 200                 205

His Ile Gln Leu Leu Asn Ile Phe Val Cys Ala Leu Ser Leu Phe His
    210                 215                 220
```

```
Ala Leu Ile Phe Val Phe Ile Ile Thr Ile Tyr Ile Trp Ser Leu
225                 230                 235                 240

Tyr Val Asn Lys Ile Pro Pro Met Gly Gln Val Phe Ser Met Phe Leu
            245                 250                 255

Ile Leu Gly Pro Leu Gly Gln Gly Ser Tyr Ser Phe Leu Leu Ile Gly
            260                 265                 270

Glu Asn Val Glu Lys Tyr Thr His Leu Tyr Tyr Arg Pro Gly His Pro
            275                 280                 285

Tyr Tyr Asn Glu Leu Leu Val Glu Ile Ile Pro Trp Cys Phe Lys Ile
290                 295                 300

Ile Phe Leu Leu Leu Val Leu Ala Leu Val Ser Leu Gly Tyr Phe Phe
305                 310                 315                 320

Thr Phe Leu Cys Phe Ile Ser Ile Leu Ser Tyr Ser Lys Thr Lys Asp
                325                 330                 335

Ala Thr Gly Pro Lys Val Lys Arg Ile Tyr Thr Phe His Lys Gly Trp
            340                 345                 350

Leu Gly Met Thr Phe Pro Met Gly Thr Met Ser Leu Ala Asn Lys Glu
            355                 360                 365

Ile Tyr Val Ile Tyr Asn Asn Tyr Val Pro Val Lys Thr Phe Arg Tyr
370                 375                 380

Ile Gly Ala Ile Tyr Gly Gly Val Cys Ile Cys Trp Thr Ile Ile Cys
385                 390                 395                 400

Leu Thr Leu Thr Leu Leu Gln Ser Ile Ile Lys Pro Val Tyr Phe Arg
                405                 410                 415

Tyr Ser Lys Trp Lys Glu Thr Glu Glu Asn Thr Ser Thr Glu Lys Ser
            420                 425                 430

Leu Glu Ser Ser Asn Asp Ile Gln Glu Ser Cys Gln Asp Asp Phe Thr
            435                 440                 445

Arg Leu Leu
    450

<210> SEQ ID NO 25
<211> LENGTH: 458
<212> TYPE: PRT
<213> ORGANISM: Zygosaccharomyces bailii

<400> SEQUENCE: 25

Met Val Leu Asn Lys Glu Ile Arg Ile Phe Ala Ser Trp Phe His Pro
1               5                   10                  15

Phe Leu Phe Val Met Val Met Gly Thr Gly Ile Ala Ser Asn Leu Leu
                20                  25                  30

Phe Asn Phe Pro Tyr Glu Ala Arg Trp Leu Arg Ile Cys Ser Tyr Pro
            35                  40                  45

Met Phe Gly Leu Ala Val Leu Leu Leu Tyr Phe His Leu Leu His
50                  55                  60

Leu Val His Leu Ile Val Phe Val Lys Asp Asn Ser Trp Lys Ala Tyr
65                  70                  75                  80

Met Asp Lys Tyr Phe Arg Asp Thr Thr Ile Asn Gly Cys Trp Gly Thr
                85                  90                  95

Tyr Pro Met Gly Phe Ile Thr Ile Asn Tyr Ile Phe Gln Leu Ala
            100                 105                 110

Arg Asn Arg Val Glu Ser Arg Val Arg Ala Lys His Met Ile Arg Leu
            115                 120                 125

Ala Tyr Val Met Trp Trp Tyr Ile Leu Thr Ile Ser Leu Leu Cys Thr
```

-continued

```
                130                 135                 140
Trp Gly Ile Thr Tyr Ala Val Trp Gln Lys Gln Tyr Lys Lys Gly Gly
145                 150                 155                 160

Lys Asp Ser Tyr Lys Ser Tyr Glu Glu Lys Val Ile Phe Glu Gln Leu
                165                 170                 175

Asn Thr Ser Leu Leu Leu Ile Val Ile Pro Leu Val Val Ala Cys Ser
                180                 185                 190

Cys Gly Gly Leu Leu Thr Ser Ala Asp Leu Phe Pro Glu Ala Phe Asn
                195                 200                 205

Arg Asn Ile His Leu Met Thr Ile Val Ile Thr Met Leu Thr Trp Leu
                210                 215                 220

His Ser Leu Gly Phe Val Ala Leu Leu Phe Ala Ile Asn Phe Trp Asn
225                 230                 235                 240

Leu Tyr Val Asn Lys Leu Pro Ser Met Leu Lys Val Phe Thr Ile Phe
                245                 250                 255

Leu Phe Leu Gly Pro Met Gly Gln Gly Ala Tyr Gly Ile Asn Leu Ile
                260                 265                 270

Thr Glu Asn Ile Arg Leu Tyr Val Glu Arg Asn Tyr Pro Thr Ser Gly
                275                 280                 285

Ser Asp Phe Gln Arg Asp Val Leu Leu Ala Val Pro Trp Cys Phe
290                 295                 300

Lys Ile Ile Gly Leu Ile Leu Ala Leu Leu Leu Ala Phe Gly Tyr
305                 310                 315                 320

Phe Phe Thr Val Ile Gly Phe Val Ser Ile Ala Ser Tyr Leu Ser Thr
                325                 330                 335

Ser Val Glu Thr Thr Val Gly Glu Asp Val Lys Arg Arg Arg Ile Tyr
                340                 345                 350

Asn Phe His Arg Gly Trp Phe Ala Met Thr Phe Pro Met Gly Thr Met
                355                 360                 365

Ser Leu Gly Ser Thr Ser Ile Trp Asp Leu Tyr Asn Asp Tyr Val Pro
370                 375                 380

Met Lys Thr Phe Arg Val Leu Gly Ala Ile Tyr Ala Val Ile Ser Ile
385                 390                 395                 400

Phe Trp Thr Leu Val Cys Met Thr Gly Thr Val Tyr Gln Ser Val Leu
                405                 410                 415

Pro Arg Ile Lys Thr Phe Cys Thr Gln Ala His Asp Lys Gly Gln Glu
                420                 425                 430

Thr Asp Ala Thr Gly Arg Thr Ser Lys Glu Leu Pro Ile Thr Thr Ser
                435                 440                 445

Gln Pro Leu Glu Ser Tyr Ile Ser Thr Pro
450                 455
```